US011882830B2

(12) United States Patent
Sikuljak et al.

(10) Patent No.: US 11,882,830 B2
(45) Date of Patent: Jan. 30, 2024

(54) PESTICIDAL MIXTURE COMPRISING A CARBOXAMIDE COMPOUND AND A BIOPESTICIDE

(71) Applicant: BASF AGROCHEMICAL PRODUCTS B.V., Arnhem (NL)

(72) Inventors: Tatjana Sikuljak, Limburgerhof (DE); Florent Mazuir, Limburgerhof (DE); Alejandro Arevalo, Cary, NC (US); Anil Menon, Durham, NC (US)

(73) Assignee: BASF AGROCHEMICAL PRODUCTS B.V., Arnhem (NL)

( * ) Notice: Subject to any disclaimer, the term of this patent is extended or adjusted under 35 U.S.C. 154(b) by 83 days.

(21) Appl. No.: 17/553,097

(22) Filed: Dec. 16, 2021

(65) Prior Publication Data

US 2022/0104485 A1 Apr. 7, 2022

Related U.S. Application Data

(63) Continuation of application No. 15/557,334, filed as application No. PCT/EP2016/055105 on Mar. 10, 2016, now Pat. No. 11,219,211.

(60) Provisional application No. 62/131,291, filed on Mar. 11, 2015.

(30) Foreign Application Priority Data

Dec. 18, 2015 (EP) ..................... 15201359

(51) Int. Cl.
| A01N 37/46 | (2006.01) |
| A01N 63/23 | (2020.01) |
| A01N 63/20 | (2020.01) |
| A01N 63/30 | (2020.01) |
| A01N 43/82 | (2006.01) |
| A01N 43/90 | (2006.01) |

(52) U.S. Cl.
CPC ............ *A01N 37/46* (2013.01); *A01N 43/82* (2013.01); *A01N 43/90* (2013.01); *A01N 63/20* (2020.01); *A01N 63/30* (2020.01)

(58) Field of Classification Search
CPC ................. A01N 37/46; A01N 63/23
See application file for complete search history.

(56) References Cited

U.S. PATENT DOCUMENTS

| 4,863,734 | A  | 9/1989  | Pommer et al. |
| 5,026,417 | A  | 6/1991  | Kucey |
| 5,413,784 | A  | 5/1995  | Wright et al. |
| 6,406,690 | B1 | 6/2002  | Peleg et al. |
| 6,776,996 | B2 | 8/2004  | Sun et al. |
| 6,994,849 | B2 | 2/2006  | Droby |
| 8,445,255 | B2 | 5/2013  | Kloepper et al. |
| 8,686,044 | B2 | 4/2014  | Kobayashi et al. |
| 11,219,211 | B2 | 1/2022  | Sikuljak et al. |
| 2008/0269905 | A1 | 10/2008 | Link |
| 2009/0018015 | A1 | 1/2009  | Wachendorff-Neumann et al. |
| 2010/0260735 | A1 | 10/2010 | Bais et al. |
| 2011/0006482 | A1 | 1/2011  | Jones et al. |
| 2011/0137068 | A1 | 6/2011  | Aoki et al. |
| 2012/0149571 | A1 | 6/2012  | Kloepper et al. |
| 2013/0236522 | A1 | 9/2013  | Misumi |
| 2015/0305331 | A1 | 10/2015 | Gewehr |
| 2015/0335028 | A1* | 11/2015 | Hellwege ............... A01N 47/34 424/93.46 |

FOREIGN PATENT DOCUMENTS

| CA | 2471555 A1 | 12/2005 |
| EP | 1714958 A1 | 10/2006 |
| EP | 3307510 A1 | 4/2018 |
| EP | 3585215 A1 | 1/2020 |
| JP | 2011-157294 A | 8/2011 |
| JP | 2011-157295 A | 8/2011 |
| JP | 2011-157296 A | 8/2011 |
| WO | WO-9102051 A1 | 2/1991 |
| WO | WO-9107481 A1 | 5/1991 |
| WO | WO-9517806 A1 | 7/1995 |
| WO | WO-9621358 A1 | 7/1996 |
| WO | WO-2005/073165 A1 | 8/2005 |
| WO | WO-2007/013150 A1 | 2/2007 |
| WO | WO-2009/126473 A1 | 10/2009 |
| WO | WO-2010/018714 A1 | 2/2010 |
| WO | WO-2010/018857 A1 | 2/2010 |
| WO | WO-2011/109395 A2 | 9/2011 |
| WO | WO-2013032693 A2 | 3/2013 |
| WO | WO-2013/186325 A1 | 12/2013 |
| WO | WO-2014/029697 A1 | 2/2014 |
| WO | WO-2014/079719 A1 | 5/2014 |

(Continued)

OTHER PUBLICATIONS

Machine translation of JP 2011-157294 (Aug. 2011).

(Continued)

*Primary Examiner* — John Pak
(74) *Attorney, Agent, or Firm* — MARSHALL, GERSTEIN & BORUN LLP

(57) ABSTRACT

The present invention relates to pesticidal mixtures comprising as active components at least one active compound selected from compounds of formula I, formula Ia, and mixtures thereof and at least one biopesticide II. Furthermore, the present invention relates to seed treatment compositions comprising said mixtures, to methods and uses comprising the application of these mixtures and to seeds comprising the mixtures of the invention or a seed treatment composition thereof.

5 Claims, No Drawings

(56) References Cited

FOREIGN PATENT DOCUMENTS

| | | |
|---|---|---|
| WO | WO-2014/095675 A1 | 6/2014 |
| WO | WO-2014124369 A1 | 8/2014 |
| WO | WO-2015/055752 A1 | 4/2015 |
| WO | WO-2015/055755 A1 | 4/2015 |
| WO | WO-2015/055757 A1 | 4/2015 |
| WO | WO-2015067800 A1 | 5/2015 |
| WO | WO-2016162371 A1 | 10/2016 |
| WO | WO-2016166252 A1 | 10/2016 |

OTHER PUBLICATIONS

International Search Report and Written Opinion for International Application No. PCT/EP2016/055105, dated Jun. 23, 2016, 18 pages.
International Search Report and Written Opinion for International Application No. PCT/EP2016/055105, dated Mar. 10, 2016, 16 pages.
Oda, et al., "Quantitative structure-activity relationships of 2-chloropyridine-3-carboxamide fungicides", Journal of Pesticide Science, vol. 18, Issue 1, 1993, pp. 49-57.

* cited by examiner

PESTICIDAL MIXTURE COMPRISING A CARBOXAMIDE COMPOUND AND A BIOPESTICIDE

CROSS-REFERENCE TO RELATED APPLICATIONS

This application is a continuation of U.S. patent application Ser. No. 15/557,334, which is the U.S. National Phase Application of PCT/EP2016/055105, filed Mar. 10, 2016, which claims the benefit of U.S. Provisional Application No. 62/131,291, filed Mar. 11, 2015, and claims priority to EP Application No. 15201359.5, filed Dec. 18, 2015; the contents of all of the aforementioned applications are hereby expressly incorporated by reference in their entirety herein.

DESCRIPTION

The present invention relates to mixtures of pesticidal active compounds having synergistically enhanced action and to methods and uses comprising applying said mixtures.

One typical problem arising in the field of pest control lies in the need to reduce the dosage rates of the active ingredient in order to reduce or avoid unfavorable environmental or toxicological effects whilst still allowing effective pest control.

Another problem encountered concerns the need to have available pest control agents which are effective against a broad spectrum of pests.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests which have developed natural or adapted resistance against the active compound in question.

Therefore there is a need for pest control agents that help prevent or overcome resistance induced by pesticides.

Furthermore, there is a desire for pesticide compounds or combinations of compounds, which—when applied—improve plants and which may result in "plant health", "vitality of plant propagation material" or "increased plant yield".

It is therefore an object of the present invention to provide pesticidal mixtures, which solve one or more than one of the discussed problems such as reducing the dosage rate, enhancing the spectrum of activity, combining knock-down activity with prolonged control, improving resistance management, improving plant health, improving vitality of plant propagation material, also termed seed vitality, increasing plant yield.

It has been found that this object is in part or in whole achieved by the combination of active compounds defined below.

The present invention relates to pesticidal mixtures comprising as active components
1) at least one pesticidal active carboxamide compound I selected from
i) compound i) of formula (I):

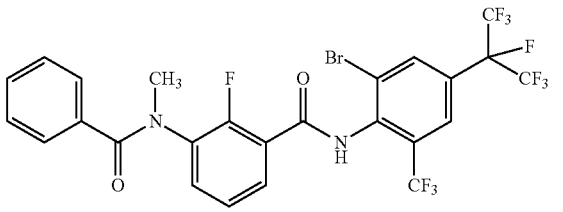

ii) compound ii) of formula (Ia)

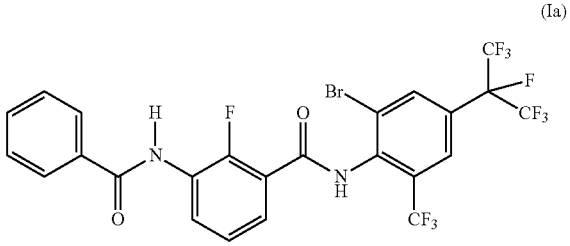 [SMILES: O=C(Nc1cccc(C(=O)Nc2c(Br)cc(C(F)(C(F)(F)F)C(F)(F)F)cc2C(F)(F)F)c1F)c1ccccc1]

iii) mixtures comprising i) and ii)
or the tautomers, enantiomers, diastereomers or salts thereof,
and
2) at least one biopesticide II selected from the groups L1 to L5:
L1) Microbial pesticides with fungicidal, bactericidal, viricidal and/or plant defense activator activity: *Ampelomyces quisqualis, Aspergillus flavus, Aureobasidium pullulans, Bacillus altitudinis, B. amyloliquefaciens, B. megaterium, B. mojavensis, B. mycoides, B. pumilus, B. simplex, B. solisalsi, B. subtilis, B. subtilis* var. *amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea* F. *catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus alvei, Paenibacillus polymyxa, Pantoea vagans, Penicillium bilaiae, P. steckii, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Ulocladium oudemansii, Verticillium dahlia, zucchini yellow mosaic virus* (avirulent strain);
L2) Biochemical pesticides with fungicidal, bactericidal, viricidal and/or plant defense activator activity: harpin protein, *Reynoutria sachalinensis* extract;

L3) Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. t.* ssp. *israelensis, B. t.* ssp. *galleriae, B. t.* ssp. *kurstaki, B. t.* ssp. *tenebrionis, Beauveria bassiana, B. brongniartii, Burkholderia* sp., *Chromobacterium subtsugae, Cydia pomonella granulovirus* (CpGV), *Cryptophlebia leucotreta* granulovirus (CrleGV), *Flavobacterium* sp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, Metarhizium anisopliae* var. *anisopliae, M. anisopliae* var. *acridum, Nomuraea rileyi, Paecilomyces fumosoroseus, P. lilacinus, Paenibacillus popilliae, Pasteuria* sp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus, S. microflavus;*

L4) Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, cis-jasmone, 2-methyl 1-butanol, methyl eugenol, methyl jasmonate, jasmonic acid or salts or derivatives thereof, (E,Z)-2,13-octadecadien-1-ol, (E,Z)-2,13-octadecadien-1-ol acetate, (E,Z)-3,13-octadecadien-1-ol, R-1-octen-3-ol, pentatermanone, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, extract of *Chenopodium ambrosiodes,* Neem oil, Quillay extract;

L5) Microbial pesticides with plant stress reducing, plant growth regulator, plant growth promoting and/or yield enhancing activity: *A. lipoferum, A. irakense, A. halopraeferens, B. liaoningense, B. lupini, Delftia acidovorans, Glomus intraradices, Mesorhizobium* sp., *Rhizobium leguminosarum* bv. *phaseoli, R. l.* bv. *trifolii, R. l.* bv. *viciae, Sinorhizobium meliloti;* in synergistically effective amounts.

In a preferred embodiment of this invention compound I is compound i) of formula (I).

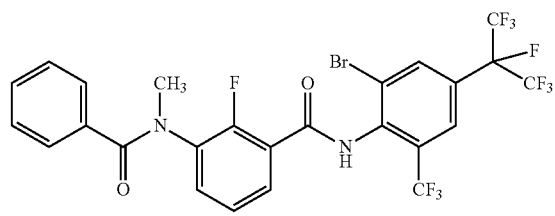

(I)

Compound i) of formula (I) is also named Compound I of formula (I).

Moreover, it has been found that simultaneous, that is joint or separate, application of one active carboxamide compound (I) and one or more biopesticide(s) II or successive application (that is immediately one after another and thereby creating the mixture "in-situ" on the desired location, as e.g. the plant) of one active carboxamide compound I and one or more biopesticide(s) II allows enhanced control of pests compared to the control rates that are possible with the individual compounds. Therefore, the term "mixture" as used herein is intended to include also combinations.

The present invention also relates to a seed treatment composition comprising a mixture of the active carboxamide compound I and at least one biopesticide II as defined above as well as at least one auxiliary.

The present invention also relates to the use of the mixture of the active carboxamide compound I and at least one biopesticide II for protecting a plant, plant propagation material, or soil or water, in which the plants are growing, against the attack or infestation by invertebrate pests. In particular, the present invention relates to the use of the mixture of the active carboxamide compound I and at least one biopesticide II for protecting plant propagation material, preferably seeds, from soil insects and the seedlings' roots and shoots from soil and foliar insects, wherein the plant propagation material as e.g. the seeds are contacted with a pesticidally effective amount of the mixture before sowing and/or after pregermination.

The present invention further relates to a method for controlling invertebrate pests, which method comprises contacting the plant or the plant propagation material or the soil; the pests or their food supply, habitat or breeding grounds, with a pesticidally effective amount of the mixture of the active carboxamide compound I and at least one biopesticide II.

The present invention further relates to a method for controlling nematodes, which method comprises contacting the plant or the plant propagation material, such as the seeds, or the soil; the pests or their food supply, habitat or breeding grounds, with a pesticidally effective amount of the mixture of the active carboxamide compound I and at least one biopesticide II with nematicidal activity.

The invention also provides seeds comprising the mixture of at least one active compound I and at least one biopesticide II.

The mixture(s) of at least one active compound selected from compound i) of formula I, compound ii) of formula Ia or mixtures comprising i) and ii) with at least one biopesticide II are herein referred to as "mixture(s) according to the invention" or "mixture(s) of the invention", wherein the compounds selected from compound i) of formula I, compound ii) of formula Ia or mixtures comprising i) and ii) are understood to include their stereoisomers, salts, tautomers or N-oxides, or a polymorphic crystalline form, a co-crystal or a solvate of a compound or a stereoisomer, salt, tautomer or N-oxide thereof.

In a specific embodiment, the mixture according to the invention is a mixture of one active compound selected from compound i) of formula I, compound ii) of formula Ia or mixtures comprising i) and ii), preferably compound i) of formula I with one biopesticide II (binary mixture).

In another embodiment, the mixture according to the invention is a mixture of one active compound selected from compound i) of formula I, compound ii) of formula Ia or mixtures comprising i) and ii), preferably compound i) of formula I with at least one biopesticide II.

In yet another embodiment, the mixture according to the invention is a mixture of one active compound selected from compound i) of formula I, compound ii) of formula Ia or mixtures comprising i) and ii), preferably compound i) of formula I with one biopesticide II and another insecticidal active compound III (ternary mixture).

In yet another embodiment, the mixture according to the invention is a mixture of one active compound selected from compound i) of formula I, compound ii) of formula Ia or mixtures comprising i) and ii), preferably compound i) of formula I with one biopesticide II and one fungicidal active compound III (ternary mixture).

The term "composition(s) according to the invention or composition(s) of the present invention" encompasses composition(s) comprising the mixtures of the invention, i.e. mixtures of the compounds selected from compound i) of formula I, compound ii) of formula Ia or mixtures comprising i) and ii), preferably compound i) of formula I with at least one biopesticide II for being used and/or applied in methods according to the invention as defined herein, wherein the compounds selected from compound i) of formula I, compound ii) of formula Ia or mixtures comprising i) and ii), preferably compound i) of formula I are understood to include their stereoisomers, salts, tautomers or N-oxides, or a polymorphic crystalline form, a co-crystal or a solvate of a compound or a stereoisomer, salt, tautomer or N-oxide thereof.

Compound I

Carboxamide derivatives showing generally pesticidal activity have been described previously. WO200573165 and WO2010018714 describe carboxamide compounds, their preparation and their use as pest control agents. WO2007013150, JP2011-157294, JP2011-157295 and JP2011-157296 describe mixtures of carboxamides with other active ingredients.

Preparation of the carboxamide compound of formula I can further be accomplished according to standard methods of organic chemistry, e.g. by the methods or working examples described in WO 2010/018857 without being limited to the routes given therein.

The carboxamide compound i of formula I, which has been provisionally approved under the common name broflanilide, has been described in combination with fungicidal active compounds in PCT/EP2014/072189 or with insecticidal active compounds in PCT/EP2014/072183.

The synthesis of carboxamide compound ii of formula Ia, which is also known under the name desmethyl-broflanilide, and/or similar compounds has been described in U.S. Pat. No. 8,686,044 (inter alia columns 75 to 76) and EP1714958A1.

However, individual mixtures of the carboxamide compound I of formula I with selected biopesticides have not been described previously.

The prior art does not disclose pesticidal mixtures comprising such selected carboxamide compound according to the present invention showing unexpected and synergistic effects in combination with biopestiocides.

The compound selected from compound i) of formula I, compound ii) of formula Ia or mixtures comprising i) and ii), preferably compound i) of formula I includes its tautomers, racemic mixtures, individual pure enantiomers and diastereomers and the optically active mixtures.

The term compound of formula I or "compound I according to the invention" or "component 1" comprises the compound as defined herein as well as a stereoisomer, salt, tautomer or N-oxide thereof. The term "compound of the present invention" is to be understood as equivalent to the term "compound according to the invention", therefore also comprising a stereoisomer, salt, tautomer or possibly N-oxide thereof.

Compounds II

Biopesticides have been defined as a form of pesticides based on micro-organisms (bacteria, fungi, viruses, nematodes, etc.) or natural products (compounds, such as metabolites, proteins, or extracts from biological or other natural sources) (U.S. Environmental Protection Agency: www.epa.gov/pesticides/biopesticides/). Biopesticides fall into two major classes, microbial and biochemical pesticides:

(1) Microbial pesticides consist of bacteria, fungi or viruses (and often include the metabolites that bacteria and fungi produce). Entomopathogenic nematodes are also classified as microbial pesticides, even though they are multicellular.

(2) Biochemical pesticides are naturally occurring substances or structurally-similar and functionally identical to a naturally-occurring substance and extracts from biological sources that control pests or provide other crop protection uses as defined below, but have non-toxic mode of actions (such as growth or developmental regulation, attractants, repellents or defence activators (e.g. induced resistance) and are relatively non-toxic to mammals.

The biopesticides from group L1) and/or L2) may also have insecticidal, acaricidal, molluscidal, pheromone, nematicidal, plant stress reducing, plant growth regulator, plant growth promoting and/or yield enhancing activity. The biopesticides from group L3) and/or L4) may also have fungicidal, bactericidal, viricidal, plant defense activator, plant stress reducing, plant growth regulator, plant growth promoting and/or yield enhancing activity. The biopesticides from group L5) may also have fungicidal, bactericidal, viricidal, plant defense activator, insecticidal, acaricidal, molluscidal, pheromone and/or nematicidal activity.

Many of these biopesticides have been deposited under deposition numbers mentioned herein (the prefices such as ATCC or DSM refer to the acronym of the respective culture collection, for details see e. g. here: www.wfcc.info/ccinfo/collection/by_acronym/), are referred to in literature, registered and/or are commercially available: mixtures of *Aureobasidium pullulans* DSM 14940 and DSM 14941 isolated in 1989 in Konstanz, Germany (e. g. blastospores in BlossomProtect® from bio-ferm GmbH, Austria), *Bacillus amyloliquefaciens* strain AP-188 (NRRL B-50615 and B-50331; U.S. Pat. No. 8,445,255); *B. amyloliquefaciens* spp. *plantarum* D747 isolated from air in Kikugawa-shi, Japan (US 20130236522 A1; FERM BP-8234; e. g. Double Nickel™ 55 WDG from Certis LLC, USA), *B. amyloliquefaciens* spp. *plantarum* FZB24 isolated from soil in Brandenburg, Germany (also called SB3615; DSM 96-2; J. Plant Dis. Prot. 105, 181-197, 1998; e. g. Taegro® from Novozyme Biologicals, Inc., USA), *B. amyloliquefaciens* ssp. *plantarum* FZB42 isolated from soil in Brandenburg, Germany (DSM 23117; J. Plant Dis. Prot. 105, 181-197, 1998; e. g. RhizoVital® 42 from AbiTEP GmbH, Germany), *B. amyloliquefaciens* ssp. *plantarum* MBI600 isolated from faba bean in Sutton Bonington, Nottinghamshire, U.K. at least before 1988 (also called 1430; NRRL B-50595; US 2012/0149571 A1; e. g. Integral® from BASF Corp., USA), *B. amyloliquefaciens* spp. *plantarum* QST-713 isolated from peach orchard in 1995 in California, U.S.A. (NRRL B-21661; e. g. Serenade® MAX from Bayer Crop Science LP, USA), *B. amyloliquefaciens* spp. *plantarum* TJ1000 isolated in 1992 in South Dakota, U.S.A. (also called 1BE; ATCC BAA-390; CA 2471555 A1; e. g. QuickRoots™ from TJ Technologies, Watertown, S.D., USA), *B. firmus* CNCM I-1582, a variant of parental strain EIP-N1 (CNCM I-1556) isolated from soil of central plain area of Israel (WO 2009/126473, U.S. Pat. No. 6,406,690; e. g. Votivo® from Bayer CropScience LP, USA), *B. pumilus* GHA 180 isolated from apple tree rhizosphere in Mexico (IDAC 260707-01; e. g. PRO-MIX® BX from Premier Horticulture, Quebec, Canada), *B. pumilus* INR-7 otherwise referred to as BU-F22 and BU-F33 isolated at least before 1993 from cucumber infested by *Erwinia tracheiphila* (NRRL B-50185, NRRL B-50153; U.S. Pat. No. 8,445,255), *B. pumilus* KFP9F isolated from the rhizosphere of grasses in South Africa at least before 2008 (NRRL B-50754; WO 2014/029697; e. g. BAC-UP or FUSION-P from BASF Agricultural Specialities (Pty) Ltd., South Africa), *B. pumilus* QST 2808 was isolated from soil collected in Pohnpei, Federated States of Micronesia, in 1998 (NRRL B-30087; e. g. Sonata® or Ballad® Plus from Bayer Crop Science LP, USA), *B. simplex* ABU 288 (NRRL B-50304; U.S. Pat. No. 8,445,255), *B. subtilis* FB17 also called UD 1022 or UD10-22 isolated from red beet roots in North America (ATCC PTA-11857; System. Appl. Microbiol. 27, 372-379, 2004; US 2010/0260735; WO 2011/109395); *B. thuringiensis* ssp. *aizawai* ABTS-1857 isolated from soil taken from a lawn in Ephraim, Wis., U.S.A., in 1987 (also called ABG-6346; ATCC SD-1372; e. g. XenTari® from BioFa AG, Münsingen, Germany), *B. t.* ssp. *kurstaki* ABTS-351 identical to HD-1 isolated in 1967 from diseased Pink Bollworm black larvae in Brownsville, Tex., U.S.A. (ATCC SD-1275; e. g. Dipel® DF from Valent BioSciences, Ill., USA), *B. t.* ssp. *kurstaki* SB4 isolated from *E. saccharina* larval cadavers (NRRL B-50753; e. g. Beta Pro® from BASF Agricultural Specialities (Pty) Ltd., South Africa), *B. t.* ssp. *tenebrionis* NB-176-1, a mutant of strain NB-125, a wild type strain isolated in 1982 from a dead pupa of the beetle Tenebrio molitor (DSM 5480; EP 585 215 B1; e. g. Novodor® from Valent BioSciences, Switzerland), *Beauveria bassiana* GHA (ATCC 74250; e. g. BotaniGard® 22WGP from Laverlam Int. Corp., USA), *B. bassiana* JW-1 (ATCC 74040; e. g. Naturalis® from CBC (Europe) S.r.l., Italy), *B. bassiana* PPRI 5339 isolated from the larva of the tortoise beetle *Conchyloctenia punctata* (NRRL 50757; e. g. BroadBand® from BASF Agricultural Specialities (Pty) Ltd., South Africa), *Burkholderia* sp. A396 isolated from soil in Nikko, Japan, in 2008 (NRRL B-50319; WO 2013/032693; Marrone Bio Innovations, Inc., USA), *Coniothyrium minitans* CON/M/91-08 isolated from oilseed rape (WO 1996/021358; DSM 9660; e. g. Contans® WG, Intercept® WG from Bayer CropScience AG, Germany), harpin (alpha-beta) protein (Science 257, 85-88, 1992; e. g. Messenger™ or HARP-N-Tek from Plant Health Care plc, U.K.), *Helicoverpa armigera* nucleopolyhedrovirus (HearNPV) (J. Invertebrate Pathol. 107, 112-126, 2011; e. g. Helicovex® from Adermatt Biocontrol, Switzerland; Diplomata® from Koppert, Brazil; Vivus® Max from AgBiTech Pty Ltd., Queensland, Australia), *Helicoverpa zea* single capsid nucleopolyhedrovirus (HzSNPV) (e. g. Gemstar® from Certis LLC, USA), *Helicoverpa zea* nucleopolyhedrovirus ABA-NPV-U (e. g. Heligen® from AgBiTech Pty Ltd., Queensland, Australia), *Heterorhabditis bacteriophora* (e. g. Nemasys® G from BASF Agricultural Specialities Limited, UK), *Isaria fumosorosea* Apopka-97 isolated from mealy bug on gynura in Apopka, Fla., U.S.A. (ATCC 20874; Biocontrol Science Technol. 22(7), 747-761, 2012; e. g. PFR-97™ or PreFeRal® from Certis LLC, USA), *Metarhizium anisopliae* var. *anisopliae* F52 also called 275 or V275 isolated from codling moth in Austria (DSM 3884, ATCC 90448; e. g. Met52® Novozymes Biologicals BioAg Group, Canada), *Metschnikowia fructicola* 277 isolated from grapes in the central part of Israel (U.S. Pat. No. 6,994,849; NRRL Y-30752; e. g. formerly Shemer® from Agrogreen, Israel), *Paecilomyces ilacinus* 251 isolated from infected nematode eggs in the Philippines (AGAL 89/030550; WO1991/02051; Crop Protection 27, 352-361, 2008; e. g. BioAct® from Bayer CropScience AG, Germany and MeloCon® from Certis, USA), *Paenibacillus alvei* NAS6G6 isolated from the rhizosphere of grasses in South Africa at least before 2008 (WO 2014/029697; NRRL B-50755; e.g. BAC-UP from BASF Agricultural Specialities (Pty) Ltd., South Africa), *Pasteuria nishizawae* Pn1 isolated from a soybean field in the mid-2000s in Illinois, U.S.A. (ATCC SD-5833; Federal Register 76(22), 5808, Feb. 2, 2011; e.g. Clariva™ PN from Syngenta Crop Protection, LLC, USA), *Penicillium bilaiae* (also called *P. bilaii*) strains ATCC 18309 (=ATCC 74319), ATCC 20851 and/or ATCC 22348 (=ATCC 74318) originally isolated from soil in Alberta, Canada (Fertilizer Res. 39, 97-103, 1994; Can. J. Plant Sci. 78(1), 91-102, 1998; U.S. Pat. No. 5,026,417, WO 1995/017806; e. g. Jump Start®, Provide® from Novozymes Biologicals BioAg Group, Canada), *Reynoutria sachalinensis* extract (EP 0307510 B1; e. g. Regalia® SC from Marrone BioInnovations, Davis, Calif., USA or Milsana® from BioFa AG, Germany), *Steinemema carpocapsae* (e. g. Millenium® from BASF Agricultural Specialities Limited, UK), *S. feltiae* (e. g. Nemashield® from BioWorks, Inc., USA; Nemasys® from BASF Agricultural Specialities Limited, UK), *Streptomyces microflavus* NRRL B-50550 (WO 2014/124369; Bayer CropScience, Germany), *Trichoderma asperelloides* JM41R isolated in South Africa (NRRL 50759; also referred to as *T. fertile*; e. g. Trichoplus® from BASF Agricultural Specialities (Pty) Ltd., South Africa), *T. harzianum* T-22 also called KRL-AG2 (ATCC 20847; BioControl 57, 687-696, 2012; e. g. Plantshield® from BioWorks Inc., USA or SabrEx™ from Advanced Biological Marketing Inc., Van Wert, Ohio, USA).

Preferred biopesticides, which have been deposited under deposition numbers mentioned herein (the prefices such as ATCC or DSM refer to the acronym of the respective culture collection, for details see e. g. here: www.wfcc.info/ccinfo/collection/by_acronym/), are referred to in literature, registered and/or are commercially available: mixtures of *Aureobasidium pullulans* DSM 14940 and DSM 14941 isolated in 1989 in Konstanz, Germany (e. g. blastospores in BlossomProtect® from bio-ferm GmbH, Austria), *Bacillus amyloliquefaciens* strain AP-188 (NRRL B-50615 and B-50331; U.S. Pat. No. 8,445,255); *B. amyloliquefaciens* spp. *plantarum* D747 isolated from air in Kikugawa-shi, Japan (US 20130236522 A1; FERM BP-8234; e. g. Double Nickel™ 55 WDG from Certis LLC, USA), *B. amyloliquefaciens* spp. *plantarum* FZB24 isolated from soil in Brandenburg, Germany (also called SB3615; DSM 96-2; J. Plant Dis. Prot. 105, 181-197, 1998; e. g. Taegro® from Novozyme Biologicals, Inc., USA), *B. amyloliquefaciens* ssp. *plantarum* FZB42 isolated from soil in Brandenburg, Germany (DSM 23117; J. Plant Dis. Prot. 105, 181-197, 1998; e. g. RhizoVital® 42 from AbiTEP GmbH, Germany), *B. amyloliquefaciens* ssp. *plantarum* MBI600 isolated from faba bean in Sutton Bonington, Nottinghamshire, U.K. at least before 1988 (also called 1430; NRRL B-50595; US 2012/0149571 A1; e. g. Integral® from BASF Corp., USA), *B. amyloliquefaciens* spp. *plantarum* QST-713 isolated from peach orchard in 1995 in California, U.S.A. (NRRL B-21661; e. g. Serenade® MAX from Bayer Crop Science LP, USA), *B. amyloliquefaciens* spp. *plantarum* TJ1000 isolated in 1992 in South Dakoda, U.S.A. (also called 1BE; ATCC BAA-390; CA 2471555 A1; e. g. QuickRoots™ from TJ Technologies, Watertown, S.D., USA), *B. firmus* CNCM 1-1582, a variant of parental strain EIP-N1 (CNCM 1-1556) isolated from soil of central plain area of Israel (WO 2009/126473, U.S. Pat. No. 6,406,690; e. g. Votivo® from Bayer CropScience LP, USA), *B. pumilus* GHA 180 isolated from apple tree rhizosphere in Mexico (IDAC 260707-01; e. g. PRO-MIX® BX from Premier Horticulture, Quebec, Canada), *B. pumilus* INR-7 otherwise referred to as BU-F22 and BU-F33 isolated at least before 1993 from cucumber infested by Erwinia tracheiphila (NRRL B-50185, NRRL B-50153; U.S. Pat. No. 8,445,255), *B. pumilus* QST 2808 was isolated from soil collected in Pohnpei, Federated States of Micronesia, in 1998 (NRRL B-30087; e. g. Sonata® or Ballad® Plus from Bayer Crop Science LP, USA), *B. simplex* ABU 288 (NRRL B-50304; U.S. Pat. No. 8,445, 255), *B. subtilis* FB17 also called UD 1022 or UD10-22 isolated from red beet roots in North America (ATCC PTA-11857; System. Appl. Microbiol. 27, 372-379, 2004; US 2010/0260735; WO 2011/109395); *B. thuringiensis* ssp. *aizawai* ABTS-1857 isolated from soil taken from a lawn in Ephraim, Wis., U.S.A., in 1987 (also called ABG-6346; ATCC SD-1372; e. g. XenTari® from BioFa AG, Münsingen, Germany), *B. t.* ssp. *kurstaki* ABTS-351 identical to HD-1 isolated in 1967 from diseased Pink Bollworm black larvae in Brownsville, Tex., U.S.A. (ATCC SD-1275; e. g. Dipel® DF from Valent BioSciences, Ill., USA), *B. t.* ssp. *tenebrionis* NB-176-1, a mutant of strain NB-125, a wild type strain isolated in 1982 from a dead pupa of the beetle Tenebrio molitor (DSM 5480; EP 585 215 B1; e. g. Novodor® from Valent BioSciences, Switzerland), *Beauveria bassiana* GHA (ATCC 74250; e. g. BotaniGard® 22WGP from Laverlam Int. Corp., USA), *B. bassiana* JW-1 (ATCC 74040; e. g. Naturalis® from CBC (Europe) S.r.I., Italy), *Burkholderia* sp. A396 isolated from soil in Nikko, Japan, in 2008 (NRRL B-50319; WO 2013/032693; Marrone Bio Innovations, Inc., USA), *Coniothyrium minitans* CON/M/91-08 isolated from oilseed rape (WO 1996/021358; DSM 9660; e. g. Contans® WG, Intercept® WG from Bayer CropScience AG, Germany), harpin (alpha-beta) protein (Science 257, 85-88, 1992; e. g. Messenger™ or HARP-N-Tek from Plant Health Care plc, U.K.), *Helicoverpa armigera* nucleopolyhedrovirus (HearNPV) (J. Invertebrate Pathol. 107, 112-126, 2011; e. g. Helicovex® from Adermatt Biocontrol, Switzerland; Diplomata® from Koppert, Brazil; Vivus® Max from AgBiTech Pty Ltd., Queensland, Australia), *Helicoverpa zea* single capsid nucleopolyhedrovirus (HzSNPV) (e. g. Gemstar® from Certis LLC, USA), *Helicoverpa zea* nucleopolyhedrovirus ABA-NPV-U (e. g. Heligen® from AgBiTech Pty Ltd., Queensland, Australia), *Heterorhabditis bacteriophora* (e. g. Nemasys® G from BASF Agricultural Specialities Limited, UK), *Isaria fumosorosea* Apopka-97 isolated from mealy bug on gynura in Apopka, Fla., U.S.A. (ATCC 20874; Biocontrol Science Technol. 22(7), 747-761, 2012; e. g. PER-97™ or PreFeRal® from Certis LLC, USA), *Metarhizium anisopliae* var. *anisopliae* F52 also called 275 or V275 isolated from codling moth in Austria (DSM 3884, ATCC 90448; e. g. Met52® Novozymes Biologicals BioAg Group, Canada), *Metschnikowia fructicola* 277 isolated from grapes in the central part of Israel (U.S. Pat. No. 6,994,849; NRRL Y-30752; e. g. formerly Shemer® from Agrogreen, Israel), *Paecilomyces ilacinus* 251 isolated from infected nematode eggs in the Philippines (AGAL 89/030550; WO1991/02051; Crop Protection 27, 352-361, 2008; e. g. BioAct®from Bayer CropScience AG, Germany and MeloCon® from Certis, USA), *Pasteuria nishizawae* Pn1 isolated from a soybean field in the mid-2000s in Illinois, U.S.A. (ATCC SD-5833; Federal Register 76(22), 5808, Feb. 2, 2011; e.g. Clariva™ PN from Syngenta Crop Protection, LLC, USA), *Penicillium bilaiae* (also called *P. bilaii*) strains ATCC 18309 (=ATCC 74319), ATCC 20851 and/or ATCC 22348 (=ATCC 74318) originally isolated from soil in Alberta, Canada (Fertilizer Res. 39, 97-103, 1994; Can. J. Plant Sci. 78(1), 91-102, 1998; U.S. Pat. No. 5,026,417, WO 1995/017806; e. g. Jump Start®, Provide® from Novozymes Biologicals BioAg Group, Canada), *Reynoutria sachalinensis* extract (EP 0307510 B1; e. g. Regalia® SC from Marrone BioInnovations, Davis, Calif., USA or Milsana® from BioFa AG, Germany), *Steinemema carpocapsae* (e. g. Millenium® from BASF Agricultural Specialities Limited, UK), *S. feltiae* (e. g. Nemashield® from BioWorks, Inc., USA; Nemasys® from BASF Agricultural Specialities Limited, UK), *Streptomyces microflavus* NRRL B-50550 (WO 2014/124369; Bayer CropScience, Germany), *T. harzianum* T-22 also called KRL-AG2 (ATCC 20847; BioControl 57, 687-696, 2012; e. g. Plantshield® from BioWorks Inc., USA or SabrEx™ from Advanced Biological Marketing Inc., Van Wert, Ohio, USA).

Preferred biopesticides on strain level are selected from the following groups L1) to L5):

L1) Microbial pesticides with fungicidal, bactericidal, viricidal and/or plant defense activator activity: *Aureobasidium pullulans* DSM 14940 and DSM 14941 (L1.1), Bacillus *amyloliquefaciens* AP-188 (L.1.2), *B. amyloliquefaciens* ssp. *plantarum* D747 (L.1.3), *B. amyloliquefaciens* ssp. *plantarum* FZB24 (L.1.4), *B. amyloliquefaciens* ssp. *plantarum* FZB42 (L.1.5), *B. amyloliquefaciens* ssp. *plantarum* MBI600 (L.1.6), *B. amyloliquefaciens* ssp. *plantarum* QST-713 (L.1.7), *B. amyloliquefaciens* ssp. *plantarum* TJ1000 (L.1.8), *B. pumilus* GB34 (L.1.9), *B. pumilus* GHA 180 (L.1.10), *B. pumilus* INR-7 (L.1.11), *B. pumilus* KFP9F (L.1.12), *B. pumilus* QST 2808 (L.1.13), *B. simplex* ABU 288 (L.1.14), *B. subtilis* FB17 (L.1.15), *Coniothyrium minitans* CON/M/91-08 (L.1.16), *Metschnikowia fructicola* NRRL Y-30752 (L.1.17), *Paenibacillus alvei* NAS6G6 (L.1.18), *Penicillium bilaiae* ATCC 22348 (L.1.19), *P. bilaiae* ATCC 20851 (L.1.20), *Penicillium bilaiae* ATCC 18309 (L.1.21), *Streptomyces microflavus* NRRL B-50550 (L.1.22), *Trichoderma asperelloides* JM41R (L.1.23), *T. harzianum* T-22 (L.1.24);

L2) Biochemical pesticides with fungicidal, bactericidal, viricidal and/or plant defense activator activity: harpin protein (L.2.1), *Reynoutria sachalinensis* extract (L.2.2);

L3) Microbial pesticides with insecticidal, acaricidal, molluscidal and/or nematicidal activity: *Bacillus firmus* 1-1582 (L.3.1); *B. thuringiensis* ssp. *aizawai* ABTS-1857 (L.3.2), *B. t.* ssp. *kurstaki* ABTS-351 (L.3.3), *B. t.* ssp. *kurstaki* SB4 (L.3.4), *B. t.* ssp. *tenebrionis* NB-176-1 (L.3.5), *Beauveria bassiana* GHA (L.3.6), *B. bassiana* JW-1 (L.3.7), *B. bassiana* PPRI 5339 (L.3.8), *Burkholderia* sp. A396 (L.3.9), *Helicoverpa armigera* nucleopolyhedrovirus (HearNPV) (L.3.10), *Helicoverpa zea* nucleopolyhedrovirus (HzNPV) ABA-NPV-U (L.3.11), *Helicoverpa zea* single capsid nucleopolyhedrovirus (HzSNPV) (L.3.12), *Heterohabdits bacteriophora* (L.3.13), *Isaria fumosorosea* Apopka-97 (L.3.14), *Metarhizium anisopliae* var. *anisopliae* F52 (L.3.15), *Paecilomyces lilacinus* 251 (L.3.16), *Pasteuria nishizawae* Pn1 (L.3.17), *Steinernema carpocapsae* (L.3.18), *S. feltiae* (L.3.19);

L4) Biochemical pesticides with insecticidal, acaricidal, molluscidal, pheromone and/or nematicidal activity: cis-jasmone (L.4.1), methyl jasmonate (L.4.2), Quillay extract (L.4.3);

L5) Microbial pesticides with plant stress reducing, plant growth regulator, plant growth promoting and/or yield enhancing activity in particular from
L1) Microbial pesticides with fungicidal, bactericidal, viricidal and/or plant defense activator activity: *Aureobasidium pullulans* DSM 14940 and DSM 14941 (L1.1), *Bacillus amyloliquefaciens* AP-188 (L.1.2), *B. amyloliquefaciens* ssp. *plantarum* D747 (L.1.3), *B. amyloliquefaciens* ssp. *plantarum* FZB24 (L.1.4), *B. amyloliquefaciens* ssp. *plantarum* FZB42 (L.1.5), *B. amyloliquefaciens* ssp. *plantarum* MBI600 (L.1.6), *B. amyloliquefaciens* ssp. *plantarum* QST-713 (L.1.7), *B. amyloliquefaciens* ssp. *plantarum* TJ1000 (L.1.8), *B. pumilus* GB34 (L.1.9), *B. pumilus* GHA 180 (L.1.10), *B. pumilus* INR-7 (L.1.11), *B. pumilus* QST 2808 (L.1.13), *B. simplex* ABU 288 (L.1.14), *B. subtilis* FB17 (L.1.15), *Coniothyrium minitans* CON/M/91-08 (L.1.16), *Metschnikowia fructicola* NRRL Y-30752 (L.1.17), *Penicillium bilaiae* ATCC 22348 (L.1.19), *P. bilaiae* ATCC 20851 (L.1.20), *Penicillium bilaiae* ATCC 18309 (L.1.21), *Streptomyces microflavus* NRRL B-50550 (L.1.22), *T. harzianum* T-22 (L.1.24);

L2) Biochemical pesticides with fungicidal, bactericidal, viricidal and/or plant defense activator activity: harpin protein (L.2.1), *Reynoutria sachalinensis* extract (L.2.2);

L3) Microbial pesticides with insecticidal, acaricidal, molluscidal and/or nematicidal activity: *Bacillus firmus* I-1582 (L.3.1); *B. thuringiensis* ssp. *aizawai* ABTS-1857 (L.3.2), *B. t.* ssp. *kurstaki* ABTS-351 (L.3.3), *B. t.* ssp. *tenebrionis* NB-176-1 (L.3.5), *Beauveria bassiana* GHA (L.3.6), *B. bassiana* JW-1 (L.3.7), *Burkholderia* sp. A396 (L.3.9), *Helicoverpa armigera* nucleopolyhedrovirus (HearNPV) (L.3.10), *Helicoverpa zea* nucleopolyhedrovirus (HzNPV) ABA-NPV-U (L.3.11), *Helicoverpa zea* single capsid nucleopolyhedrovirus (HzSNPV) (L.3.12), *Heterohabditis bacteriophora* (L.3.13), *Isaria fumosorosea* Apopka-97 (L.3.14), *Metarhizium anisopliae* var. *anisopliae* F52 (L.3.15), *Paecilomyces lilacinus* 251 (L.3.16), *Pasteuria nishizawae* Pn1 (L.3.17), *Steinernema carpocapsae* (L.3.18), *S. feltiae* (L.3.19);

L4) Biochemical pesticides with insecticidal, acaricidal, molluscidal, pheromone and/or nematicidal activity: cis-jasmone (L.4.1), methyl jasmonate (L.4.2), Quillay extract (L.4.3).

Preference is also given to mixtures comprising as pesticide II (component 2) a biopesticide selected from the groups L1), L3) and L5), preferably selected from strains denoted above as (L.1.2), (L.1.3), (L.1.4), (L.1.5), (L.1.6), (L.1.7), (L.1.8), (L.1.10), (L.1.11), (L.1.12), (L.1.13), (L.1.14), (L.1.15), (L.1.17), (L.1.18), (L.1.19), (L.1.20), (L.1.21), (L.3.1); (L.3.9), (L.3.16), (L.3.17), (L.5.1), (L.5.2), (L.5.3), (L.5.4), (L.5.5), (L.5.6), (L.5.7), (L.5.8); (L.4.2), and (L.4.1); even more preferably selected from (L.1.2), (L.1.6), (L.1.7), (L.1.8), (L.1.11), (L.1.12), (L.1.13), (L.1.14), (L.1.15), (L.1.18), (L.1.19), (L.1.20), (L.1.21), (L.3.1); (L.3.9), (L.3.16), (L.3.17), (L.5.1), (L.5.2), (L.5.5), (L.5.6), (L.4.2), and (L.4.1). Preference is also fiven to mixtures comprising as pesticide II (component 2) a biopesticide selected from strains (L.1.2), (L.1.3), (L.1.4), (L.1.5), (L.1.6), (L.1.7), (L.1.8), (L.1.10), (L.1.11), (L.1.13), (L.1.14), (L.1.15), (L.1.17), (L.1.19), (L.1.20), (L.1.21), (L.3.1); (L.3.9), (L.3.16), (L.3.17), (L.4.2), and (L.4.1); even more preferably selected from (L.1.2), (L.1.6), (L.1.7), (L.1.8), (L.1.11), (L.1.13), (L.1.14), (L.1.15), (L.1.19), (L.1.20), (L.1.21), (L.3.1); (L.3.9), (L.3.16), (L.3.17), (L.4.2), and (L.4.1). These mixtures are particularly suitable for treatment of propagation materials, i. e. seed treatment purposes and likewise for soil treatment. These seed treatment mixtures are particularly suitable for crops such as cereals, corn and leguminous plants such as soybean.

Preference is also given to mixtures comprising as pesticide II (component 2) a biopesticide selected from the groups L1), L3) and L5), preferably selected from strains denoted above as (L1.1), (L.1.2), (L.1.3), (L.1.6), (L.1.7), (L.1.9), (L.1.11), (L.1.12), (L.1.13), (L.1.14), (L.1.15), (L.1.17), (L.1.18), (L.1.22), (L.1.23), (L.1.24), (L.2.2); (L.3.2), (L.3.3), (L.3.4), (L.3.5), (L.3.6), (L.3.7), (L.3.8), (L.3.10), (L.3.11), (L.3.12), (L.3.13), (L.3.14), (L.3.15), (L.3.18), (L.3.19); (L.4.2), even more preferably selected from (L.1.2), (L.1.7), (L.1.11), (L.1.13), (L.1.14), (L.1.15), (L.1.18), (L.1.23), (L.3.3), (L.3.4), (L.3.6), (L.3.7), (L.3.8), (L.3.10), (L.3.11), (L.3.12), (L.3.15), and (L.4.2). Preference is also fiven to mixtures comprising as pesticide II (component 2) a biopesticide selected from strains (L1.1), (L.1.2), (L.1.3), (L.1.6), (L.1.7), (L.1.9), (L.1.11), (L.1.13), (L.1.14), (L.1.15), (L.1.17), (L.1.22), (L.1.24), (L.2.2); (L.3.2), (L.3.3), (L.3.5), (L.3.6), (L.3.7), (L.3.10), (L.3.11), (L.3.12), (L.3.13), (L.3.14), (L.3.15), (L.3.18), (L.3.19); (L.4.2), even more preferably selected from (L.1.2), (L.1.7), (L.1.11), (L.1.13), (L.1.14), (L.1.15), (L.3.3), (L.3.6), (L.3.7), (L.3.10), (L.3.11), (L.3.12), (L.3.15), and (L.4.2). These mixtures are particularly suitable for foliar treatment. These mixtures for foliar treatment are particularly suitable for vegetables, fruits, vines, cereals, corn, leguminous crops such as soybeans.

For biopesticides II selected from groups L1, L3, and L5, the mixtures of the invention embrace not only the isolated, pure cultures of the respective microorganisms as defined herein, but also its cell-free extract having pesticidal activity, preferably a ketone-based extract, its suspensions in a whole broth culture or as a metabolite-containing supernatant or a purified metabolite obtained from a whole broth culture of the microorganism or microorganism strain.

"Whole broth culture" refers to a liquid culture containing both cells and media.

"Supernatant" or "culture medium" refers to the liquid broth remaining when cells grown in broth are removed by centrifugation, filtration, sedimentation, or other means well known in the art.

The term "metabolite" refers to any compound, substance or byproduct (including but not limited to small molecule secondary metabolites, polyketides, fatty acid synthase products, non-ribosomal peptides, ribosomal peptides, proteins and enzymes) produced by a microorganism (such as fungi and bacteria) that has pesticidal activity or improves plant growth, water use efficiency of the plant, plant health, plant appearance, or the population of beneficial microorganisms in the soil around the plant activity.

The term "mutant" refers to a microorganism, obtained by direct mutant selection but also includes microorganisms that have been further mutagenized or otherwise manipulated (e. g., via the introduction of a plasmid). Accordingly, embodiments include mutants, variants, and or derivatives of the respective microorganism, both naturally occurring and artificially induced mutants. For example, mutants may be induced by subjecting the microorganism to known mutagens, such as N-methyl-nitrosoguanidine, using conventional methods. Preferably such mutants retain the pesticidal activity of the respective microorganism.

Preferences

In addition to the above defined compound selected from compound i) of formula I, compound ii) of formula Ia or mixtures comprising i) and ii), preferably compound i) of formula I, the pesticidal mixtures of the invention comprise a component 2), which is a biopesticide II, which is selected from the groups L1 to L5 as defined above. Preferred biopesticides II are defined hereinafter.

The preferred embodiments regarding biopesticides II, which may be selected as component 2) of the mixtures of the invention, are to be understood as preferred on their own as well as preferably in combination with the preferred embodiments of the compounds of formula I, i.e. component 1) of the mixture of the invention, and, where applicable, as well as concerning the uses and methods according to the invention and the compositions according to the invention.

Preference is given to mixtures comprising as biopesticide II (component 2) a biopesticide selected from group L1, preferably selected from Bacillus amyloliquefaciens herein even more preferably from strains AP-136, AP-188, AP-218, AP-219, AP-295, IN937a, IT-45; *B. amyloliquefaciens* ssp. *plantarum* (formerly called *B. subtilis* or *B. subtilis* spp. *amyloliquefaciens*) herein even more preferably from strains MBI600, D747, FZB24, FZB42, GB03, QST-713 and TJ1000; *B. mojavensis* AP-209; *B. pumilus* herein even more preferably from strains GHA 180, INR-7, KFP9F and QST 2808; *B. simplex* herein more preferably strain ABU 288; *B. solisalsi* herein more preferably strain AP-217; *B. subtilis* herein even more preferably selected from strains CX-9060, FB17 and GB07; *Muscodor albus* herein more preferably strains QST 20799 and SA-13; *Paenibacillus alvei* herein more preferably strain NAS6G6, *Paenibacillus polymyxa* herein more preferably strain PKB1, *Penicillium bilaiae* herein more preferably strains ATCC 22348, ATCC 20581 and ATCC 18309; *Pseudomonas fluorescens* herein more preferably strain A506; *Sphaerodes mycoparasitica* herein more preferably strain SMCD2220; *Trichoderma fertile* herein more preferably strain JM41R; *Trichoderma harzianum* herein more preferably strain T-22; *Trichoderma virens* herein more preferably strains GI-3 and G-41.

Preference is also given to mixtures comprising as biopesticide II (component 2) a biopesticide selected from group L1, even more preferably selected from *B. amyloliquefaciens* AP-188, *B. amyloliquefaciens* ssp. *plantarum* MBI600, *B. amyloliquefaciens* ssp. *plantarum* QST-713, *B. pumilus* INR-7, *B. pumilus* QST 2808, *B. simplex* ABU 288, *B. subtilis* FB17, *Paenibacillus alvei* NAS6G6 and *Trichoderma fertile* JM41R.

According to one embodiment of the inventive mixtures, the at least one biopesticide II is *Bacillus amyloliquefaciens* ssp. *plantarum* MBI600. These mixtures are particularly suitable in soybean.

According to another embodiment of the inventive mixtures, the at least one biopesticide II is *B. pumilus* INR-7. These mixtures are particularly suitable in soybean and corn.

According to a further embodiment, the at least one biopesticide II is *Bacillus simplex,* preferably *B. simplex* ABU 288. These mixtures are particularly suitable in soybean and corn.

According to a further embodiment, the at least one biopesticide II is *Bacillus subtilis,* preferably *B. subtilis* strain FB17.

According to one embodiment of the inventive mixtures, the at least one biopesticide II is selected from *Bacillus amyloliquefaciens* AP-136, *B. amyloliquefaciens* AP-188, *B. amyloliquefaciens* AP-218, *B. amyloliquefaciens* AP-219, *B. amyloliquefaciens* AP-295, *B. amyloliquefaciens* spp. *plantarum* FZB24, *B. amyloliquefaciens* ssp. *plantarum* FZB42, *B. amyloliquefaciens* ssp. *plantarum* TJ1000, *B. amyloliquefaciens* ssp. *plantarum* D747, *B. amyloliquefaciens* ssp. *plantarum* MBI600, *B. amyloliquefaciens* spp. *plantarum* GB03, *B. amyloliquefaciens* spp. *plantarum* QST-713, *B. mojavensis* AP-209, *B. pumilus* GB34, *B. pumilus* INR-7, *B. pumilus* KFP9F, *B. pumilus* QST 2808, *B. pumilus* GHA 180, *B. simplex* ABU 288, *B. solisalsi* AP-217, *B. subtilis* CX-9060, *B. subtilis* FB17 and *B. subtilis* GB07. These mixtures are particularly suitable in soybean and corn, in particular for seed treatment.

According to a further embodiment, the at least one pesticide II is selected from *Streptomyces* spp., preferably from *S. griseoviridis, S. lydicus* and *S. violaceusniger,* in particular from strains *S. griseoviridis* K61, *S. lydicus* WYEC 108, *S. violaceusniger*XL-2 and *S. violaceusniger*YCED-9.

According to one embodiment of the inventive mixtures, the at least one biopesticide II is selected from the following fungi *Coniothyrium minitans* CON/M/91-08, *Trichoderma fertile* JM41R, *T. harzianum* T-22, *T. virens* G1-3, *T. virens* GL-21, *T. virens* G-41. These mixtures are particularly suitable for seed and/or soil treatment.

According to a further embodiment, the at least one biopesticide II is selected from *Pseudomonas* spp., preferably selected from *P. chloraphis* herein more preferably strain MA 342 and *Pseudomonas* sp. DSM 13134; *P. fluorescens* herein more preferably selected from strains A506, WCS 374 and Pf-5; and *P. putida* herein more preferably strain ATCC 202153.

The present invention also relates to mixtures wherein the at least one biopesticide II is selected from the fungal genus *Trichoderma,* preferably from the strains *T. asperellum* T34, *T. asperellum* SKT-1, *T. asperellum* ICC 012, *T. asperellum* TV1, *T. atroviride* LC52, *T. atroviride* CNCM 1-1237, *T. fertile* JM41R, *T. gamsii* ICC 080, *T. harmatum* TH 382, *T. harzianum* T-22, *T. harzianum* T-35, *T. harzianum* T-39, *T. harzianum* T-315; mixture of *T. harzianum* ICC012 and *T. gamsii* ICC080; mixture of *T. polysporum* and *T. harzianum; T. stromaticum, T. virens* GI-3, *T. virens* GL-21, *T. virens* G-41 and; in particular *T. fertile* JM41R.

The present invention also relates to mixtures wherein the at least one biopesticide II is selected from the fungal species *Muscodor albus* preferably from the strains SA-13 and QST 20799, which are particularly suitable for soil and seed treatment against soil-borne pathogens and/or nematodes.

Preference is given to mixtures comprising as biopesticide II (component 2) a biopesticide selected from group L3), preferably selected from *Bacillus firmus* herein preferably strain 1-1582, *Beauveria bassiana* herein preferably selected from strains GHA, H123, DSM 12256 and PPRI 5339; *Burkholderia* sp. and herein preferably strain A396, *Metarhizium anisopliae* var. *acridum* herein preferably strain IMI 330189, *M. anisopliae* herein preferably selected from strains FI-985, FI-1045, F52 and ICIPE 69; *Paecilomyces lilacinus* herein preferably selected from strains 251, DSM 15169 and BCP2, *Paenibacillus popilliae* herein preferably selected from strains Dutky-1940, KLN 3 and Dutky 1; *Pasteuria nishazawa* and herein preferably strain Pn1.

Preference is also given to mixtures comprising as biopesticide II (component 2) a biopesticide selected from group L3), even more preferably from *B. bassiana* DSM 12256, *B. bassiana* PPRI 5339, *Metarhizium anisopliae* var. *acridum* IMI 330189, *M. anisopliae* F1-985, *M. anisopliae* Fl-1045, *Paecilomyces lilacinus* DSM 15169, *P. lilacinus* BCP2, *P. lilacinus* 251, *Paenibacillus popilliae* Dutky-1940, *P. popilliae* KLN 3 and *P. popilliae* Dutky 1.

According to a further embodiment, the at least one biopesticide II is *Beauveria brongniartii.*

According to a further embodiment, the at least one biopesticide II is *Metarhizium anisopliae* or *M. anisopliae* var. *acridium,* preferably selected from *M. anisopliae*

FI-1045, *M. anisopliae* F52, *M. anisopliae* var. *acridum* strains FI-985 and IMI 330189; in particular strain IMI 330189. These mixtures are particularly suitable for control of arthropod pests in soybean and corn.

According to a further embodiment, the at least one biopesticide II is *Paecilomyces fumosoroseus*, preferably strain FE 9901 especially for white fly control.

According to a further embodiment, the at least one biopesticide II is selected from *Nomuraea rileyi*, preferably strains SA86101, GU87401, SR86151, CG128 and VA9101; and *P. lilacinus*, preferably strains 251, DSM 15169 or BCP2, in particular BCP2, which strains especially control the growth of plant-pathogenic nematodes.

According to a further embodiment, the at least one biopesticide II is *Bacillus firmus*, preferably spores of strain CNCM 1-1582, preferably useful for seed treatment of cereals, soybean, cotton, sugarbeets and corn against nematodes and insects.

According to a further embodiment, the at least one biopesticide II is *Pasteuria nishizawae*, preferably spores of strain Pn1, preferably useful for seed treatment of cereals, soybean, cotton, sugarbeets and corn against nematodes and insects.

According to a further embodiment, the at least one biopesticide II is *Flavobacterium* sp., preferably spores of strain H492, preferably useful for seed treatment of cereals, soybean, cotton, sugarbeets and corn against nematodes and insects. According to a further embodiment, the at least one biopesticide II is *Bacillus cereus*, preferably spores of CNCM 1-1562, preferably useful for seed treatment of soybean, cotton, cereals, and corn against nematodes and insects.

According to a further embodiment, the at least one biopesticide II is *Burkholderia* sp., preferably strain A396, preferably useful for seed treatment of soybean, cotton, cereals, and corn.

According to a further embodiment, the at least one biopesticide II is *Paecilomyces lilacinus* 251, preferably useful for seed treatment of soybean, cotton, cereals, and corn.

According to a further embodiment, the at least one biopesticide II is a mixture of spores of *B. firmus* and *B. cereus*, preferably mixtures spores of above mentioned strains CNCM 1-1582 and CNCM 1-1562, preferably useful for seed treatment of soybean, cotton, cereals, and corn against nematodes and insects.

According to one preferred embodiment of the inventive mixtures, the at least one pesticide II is selected from *Bacillus firmus* CNCM 1-1582, *Paecilomyces lilacinus* 251, *Pasteuria nishizawa* Pn1 and *Burkholderia* sp. A396 having nematicidal, acaricidal and/or insecticidal activity. These mixtures are particularly suitable in soybean, cotton, cereals, and corn, in particular for seed treatment.

Preference is also given to mixtures comprising as biopesticide II (component 2) a biopesticide selected from group L4), preferably methyl jasmonate.

Preference is also given to mixtures comprising as biopesticide II (component 2) a biopesticide selected from group L5), preferably selected from *A. lipoferum, A. irakense, A. halopraeferens, Paenibacillus alvei, Penicillium bilaiae, Rhizobium leguminosarum* bv. *phaseoli, R. l.* bv. *trifolii, R. l.* bv. *viciae,* and *Sinorhizobium meliloti.*

Preference is also given to mixtures comprising as biopesticide II (component 2) a biopesticide selected from group L5) selected from *B. japonicum* TA-11, *Paenibacillus alvei* NAS6G6, *Peniciillium bilaiae* strains ATCC 18309, ATCC 20851 and ATCC 22348; *Rhizobium leguminosarum* bv. *phaseoli* RG-B10, *R. l.* bv. *viciae* P1NP3Cst, *R. l.* bv. *viciae* R$^G$-P2, *R. l.* bv. *trifolii* RP113-7, *R. l.* bv. *viciae* SU303, *R. l.* bv. *viciae* WSM1455, and *Sinorhizobium meliloti;*

The present invention also relates to mixtures, wherein the at least one biopesticide II is selected from *A. lipoferum, A. irakense* and *A. halopraeferens,* These mixtures are particularly suitable in soybean, especially as seed treatment.

In one embodiment, component 2), i.e. the biopesticide II, of the mixtures of the invention is selected from *Azospirillum lipoferum, Azospirillum irakense, Azospirillum halopraeferens, Bradyrhizobium* spp., *Bradyrhizobium* sp. (Arachis), *Bradyrhizobium* sp. (Vigna), *Bradyrhizobium liaoningense, Bradyrhizobium lupini, Delftia acidovorans, Glomus intraradices, Mesorhizobium* sp., *Mesorhizobium ciceri, Mesorhizobium huakii, Mesorhizobium loti, Rhizobium leguminosarum* bv. *phaseoli, Rhizobium leguminosarum* bv. *trifolii, Rhizobium leguminosarum* bv. *viciae, Sinorhizobium meliloti, Bacillus altitudinis, Bacillus amyloliquefaciens, Bacillus amyloliquefaciens* ssp. *plantarum, Bacillus firmus, Bacillus megaterium, Bacillus mojavensis, Bacillus mycoides, Bacillus pumilus, Bacillus simplex, Bacillus solisalsi, Bacillus subtilis, Burkholderia* sp., *Coniothyrium minitans, Paecilomyces lilacinus, Paenibacillus alvei, Paenibacillus polymyxa, Paenibacillus popilliae, Pasteuria nishizawae, Pasteuria usgae, Penicillium bilaiae, Pseudomonas chloraphis, Pseudomonas fluorescens, Pseudomonas putida,* abscisic acid, harpin protein (alpha-beta), jasmonic acid or salts or derivatives thereof, cis-jasmone, methyl jasmonate.

In a preferred embodiment, component 2), i.e. the biopesticide II, of the mixtures of the invention is selected from *Bradyrhizobium* sp. (Arachis) CB1015, *Bradyrhizobium* sp. (Arachis) SEMIA 6144, *Bradyrhizobium* sp. (Arachis) SEMIA 6462, *Bradyrhizobium* sp. (Arachis) SEMIA 6464, *Bradyrhizobium* sp. (Vigna) PNL1, *Mesorhizobium* sp. WSM1497, *Rhizobium leguminosarum* bv. *phaseoli* RG-B10, *Rhizobium leguminosarum* bv. *trifolii* 095, *Rhizobium leguminosarum* bv. *trifolii* CB782, *Rhizobium leguminosarum* bv. *trifolii* CC1099, *Rhizobium leguminosarum* bv. *trifolii* CC275e, *Rhizobium leguminosarum* bv. *trifolii* CC283b, *Rhizobium leguminosarum* bv. *trifolii* RP113-7, *Rhizobium leguminosarum* bv. *trifolii* TA1, *Rhizobium leguminosarum* bv. *trifolii* WSM1325, *Rhizobium leguminosarum* bv. *trifolii* WSM2304, *Rhizobium leguminosarum* bv. *viciae* P1NP3Cst also referred to as 1435, *Rhizobium leguminosarum* bv. *viciae* RG-P2 also called P2, *Rhizobium leguminosarum* bv. *viciae* SU303, *Rhizobium leguminosarum* bv. *viciae* WSM1455, *Sinorhizobium meliloti* NRG185, *Sinorhizobium meliloti* RCR2011 also called 2011 or SU47, *Sinorhizobium meliloti,* RRI128, *Bacillus altitudinis* 41KF2b, *Bacillus amyloliquefaciens* AP-136, *Bacillus amyloliquefaciens* AP-188, *Bacillus amyloliquefaciens* AP-218, *Bacillus amyloliquefaciens* AP-219, *Bacillus amyloliquefaciens* AP-295, *Bacillus amyloliquefaciens* ssp. *plantarum* D747, *Bacillus amyloliquefaciens* ssp. *plantarum* FZB24 also called SB3651, *Bacillus amyloliquefaciens* ssp. *plantarum* FZB42, *Bacillus amyloliquefaciens* ssp. *plantarum* GB03 also called GBO3 formerly *B. subtilis, Bacillus amyloliquefaciens* ssp. *plantarum* MBI600 also referred to as 1430, formerly *B. subtilis, Bacillus amyloliquefaciens* ssp. *plantarum* QST-713, formerly *B. subtilis, Bacillus amyloliquefaciens* ssp. *plantarum* TJ1000, also called 1BE, *Bacillus firmus* CNCM 1-1582, *Bacillus megaterium* H491, *Bacillus megaterium* J142, *Bacillus megaterium* M018, *Bacillus mojavensis* AP-209, *Bacillus mojavensis* SR11, *Bacillus mycoides* AQ726, *Bacillus mycoides* J also called BmJ, *Bacillus pumilus* GB34, *Bacillus pumilus* GHA 180, *Bacillus pumilus* INR-7 otherwise referred to as BU F22 and BU-F33, *Bacillus pumilus* KFP9F, *Bacillus pumilus* QST 2808, *Bacillus simplex* ABU 288, *Bacillus subtilis* CX-9060, *Bacillus subtilis* FB17, *Bacillus subtilis* GB07, *Burkholderia* sp. A396, *Coniothyrium minitans* CON/M/91-08, *Paecilomyces lilacinus* 251, *Paecilomyces lilacinus* BCP2, *Paenibacillus alvei* NAS6G6, *Paenibacillus polymyxa* PKB1, *Paenibacillus popilliae*14F-D80 also called K14F-0080, *Paenibacillus popilliae* KLN 3, *Pasteuria nishizawae* Pn1, *Pasteuria* sp. Ph3, *Pasteuria* sp. Pr3, *Pasteuria* sp. ATCC PTA-9643, *Pasteuria usage* BL1, *Penicillium bilaiae* (also called *P. bilaii*) NRRL 50162, *Penicillium bilaiae* (also called *P. bilaii*) NRRL 50169, *Penicillium bilaiae* (also called *P. bilaii*) ATCC 18309 (=ATCC 74319), *Penicillium bilaiae* (also called *P. bilaii*) ATCC 20851, *Penicillium bilaiae* (also called *P. bilaii*) ATCC 22348 (=ATCC 74318), *Pseudomonas fluorescens* A506, *Pseudomonas fluorescens* ATCC 13525, *Pseudomonas fluorescens* CHAO, *Pseudomonas fluorescens* CL 145A, *Pseudomonas fluorescens* NCIB 12089, *Pseudomonas fluorescens* Pf-5, *Pseudomonas fluorescens* WCS374, *Pseudomonas putida* ATCC 202153.

In one embodiment, component 2), i.e. the biopesticide II, of the mixtures of the invention is selected from L1) Microbial pesticides with fungicidal, bactericidal, viricidal and/or plant defense activator activity: *Ampelomyces quisqualis, Aspergillus flavus, Aureobasidium pullulans, Bacillus altitudinis, B. amyloliquefaciens, B. megaterium, B. mojavensis, B. mycoides, B. pumilus, B. simplex, B. solisalsi, B. subtilis, B. subtilis var. amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea F. catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus alvei, Paenibacillus polymyxa, Pantoea vagans, Penicillium bilaiae, P.steckii, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Uloclayidum oudemansii, Verticillium dahlia*;

L2) Biochemical pesticides with fungicidal, bactericidal, viricidal and/or plant defense activator activity: harpin protein, *Reynoutria sachalinensis* extract;

L3) Microbial pesticides with insecticidal, acaricidal, molluscidal and/or nematicidal activity: *Agrobacterium radiobacter, Bacillus cereus, B. firmus, Burkholderia* sp., *Chromobacterium subtsugae, Flavobacterium* sp., *Paecilomyces fumosoroseus, P. lilacinus, Paenibacillus popilliae, Pasteuria* sp., *P. nishizawae, P. penetrans, P. ramosa, P. thornea, P. usgae, Pseudomonas fluorescens, Streptomyces galbus, S. microflavus;*

L4) Biochemical pesticides with insecticidal, acaricidal, molluscidal, pheromone and/or nematicidal activity: cis-jasmone, methyl jasmonate, jasmonic acid or salts or derivatives thereof;

L5) Microbial pesticides with plant stress reducing, plant growth regulator, plant growth promoting and/or yield enhancing activity: *A. lipoferum, A. irakense, A. halopraeferens, Bradyrhizobium* sp., *B. liaoningense, B. lupini, Delftia acidovorans, Glomus intraradices, Mesorhizobium* sp., *Rhizobium leguminosarum* bv. *phaseoli, R. l.* bv. *trifolii, R. l.* bv. *viciae, Sinorhizobium meliloti.*

In a preferred embodiment, component 2), i.e. the biopesticide II, of the mixtures of the invention is selected from the group L1, i.e. microbial pesticides with fungicidal, bactericidal, viricidal and/or plant defense activator activity: *Ampelomyces quisqualis, Aspergillus flavus, Aureobasidium pullulans, Bacillus altitudinis, B. amyloliquefaciens, B. megaterium, B. mojavensis, B. mycoides, B. pumilus, B. simplex, B. solisalsi, B. subtilis, B. subtilis var. amyloliquefaciens, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea F. catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus alvei, Paenibacillus polymyxa, Pantoea vagans, Penicillium bilaiae, P.steckii, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Uloclayidum oudemansii, Verticillium dahlia.*

In a more preferred embodiment, component 2), i.e. the biopesticide II, of the mixtures of the invention is selected from *Bacillus amyloliquefaciens, Bacillus pumilus, Bacillus simplex*, and *Bacillus subtilis*, in particular from the strains *Bacillus amyloliquefaciens* MBI600, *B. amyloliquefaciens* AP-188, *Bacillus pumilus* INR-7 (otherwise referred to as BU-F22 and BU-F33), *Bacillus simplex* ABU 288, and *Bacillus subtilis* FB17 (also called UD 1022 or UD10-22).

According to one particularly preferred embodiment, the biopesticide II of the mixtures of the invention is *Bacillus pumilus*, preferably spores of strain INR-7.

According to another particularly preferred embodiment, the biopesticide II of the mixtures of the invention is *Bacillus simplex*, preferably spores of strain ABU 288.

According to another particularly preferred embodiment, the biopesticide II of the mixtures of the invention is *Bacillus subtilis*, preferably spores of strain FB17.

In a further preferred embodiment, component 2), i.e. the biopesticide II, of the mixture of the invention is *Penicillium steckii*, preferably *Penicillium steckii* strain IBWF104-06 as deposited with DSMZ under the deposit number DSM 27859. Strain IBWF104-06 was determined to have potent antifungal activity, in particular, against infestation with plant pathogens including Phytophthora infestans, Botrytis cinerea and Alternaria solani (PCT/EP2014/074165).

In another preferred embodiment, component 2), i.e. the biopesticide II, of the mixtures of the invention is selected from the group L2, i.e. biochemical pesticides with fungicidal, bactericidal, viricidal and/or plant defense activator activity: harpin protein, *Reynoutria sachalinensis* extract.

According to one particularly preferred embodiment, the biopesticide II of the mixture of the invention is harpin protein (alpha-beta).

In another preferred embodiment, component 2), i.e. the biopesticide II, of the mixtures of the invention is selected from the group L4, i.e. biochemical pesticides with insecticidal, acaricidal, molluscidal, pheromone and/or nematicidal activity: cis-jasmone, methyl jasmonate, jasmonic acid or salts or derivatives thereof.

According to one particularly preferred embodiment, the biopesticide II of the mixtures of the invention is cis-jasmone.

According to another particularly preferred embodiment, the biopesticide II of the mixture of the invention is methyl jasmonate.

According to another particularly preferred embodiment, the biopesticide II of the mixture of the invention is jasmonic acid or a salt or derivative thereof.

In a particularly preferred embodiment, component 2), i.e. the biopesticide II, of the mixtures of the invention is selected from the group L3, i.e. microbial pesticides with insecticidal, acaricidal, molluscidal and/or nematicidal activity: *Agrobacterium radiobacter, Bacillus cereus, B. firmus, Burkholderia* sp., *Chromobacterium subtsugae, Flavobacterium* sp., *Paecilomyces fumosoroseus, P. lilacinus, Paenibacillus popilliae, Pasteuria* sp., *P. nishizawae, P. penetrans, P. ramosa, P. thornea, P. usgae, Pseudomonas fluorescens, Streptomyces galbus, S. microflavus.*

In a more preferred embodiment, component 2), i.e. the biopesticide II, of the mixtures of the invention is selected from *Bacillus firmus, Pasteuria nishazawa* sp., *Flavobacterium* sp., *Paecilomyces lilacinus,* and *Burkholderia* sp, in particular from the strains *Burkholderia* sp. A396, *Paecilomyces lilacinus* 251, *Bacillus firmus* CNCM 1-1582, *Pasteuria nishizawae* Pn1, and *Flavobacterium* sp. H492.

In an even more preferred embodiment, component 2), i.e. the biopesticide II, of the mixtures of the invention is selected from *Bacillus firmus, Pasteuria nishizawa,* and *Flavobacterium* sp., in particular from the strains *Bacillus firmus* CNCM 1-1582, *Pasteuria nishizawae* Pn1, and *Flavobacterium* sp. H492.

According to one particularly preferred embodiment, the biopesticide II of the mixtures of the invention is *Bacillus cereus,* preferably spores of strain CNCM 1-1562.

According to another particularly preferred embodiment, the biopesticide II of the mixtures of the invention is *Burkholderia* sp., preferably strain A396.

According to another particularly preferred embodiment, the biopesticide II of the mixtures of the invention is *Paecilomyces lilacinus,* preferably strain 251, DSM 15169 or BCP2, particularly preferably strain 251.

With regard to one embodiment of the present invention, which is the use of mixtures according to the present invention for the control of nematodes, the compound I is preferably combined with biopesticides 11 having a nematicidal activity.

According to another particularly preferred embodiment, the biopesticide II of the mixtures of the invention is *Bacillus firmus,* preferably spores of strain CNCM 1-1582; e.g. VOTiVO® from Bayer CropScience LP, USA, which is suitable for nematode control.

According to another particularly preferred embodiment, the biopesticide II of the mixtures of the invention is *Pasteuria nishizawae,* preferably spores of strain Pn1, e.g. Clariva® PN from Syngenta Crop Protection, LLC, USA, which is suitable for nematode control.

According to yet another particularly preferred embodiment, the biopesticide II of the mixtures of the invention is *Flavobacterium* sp., preferably spores of strain H492, e.g. MBI-302 from Marrone Bio Innovations, USA, which is suitable for nematode control.

In summary, particularly preferred biopesticides II may be selected from the following biopesticides II-1 to II-14 in accordance with each row of table II, of which biopesticides II-12, II-13, and II-14 are particularly preferred.

TABLE II

| No | biopesticide |
|---|---|
| II-1 | *Bacillus amyloliquefaciens* |
| II-2 | *Bacillus pumilus* |
| II-3 | *Bacillus simplex* |
| II-4 | *Bacillus subtilis* |
| II-5 | *Penicillium steckii* |
| II-6 | harpin protein (alpha-beta) |
| II-7 | cis-jasmone |
| II-8 | methyl jasmonate |
| II-9 | jasmonic acid or a salt or derivative thereof |
| II-10 | *Burkholderia* sp. |
| II-11 | *Paecilomyces lilacinus* |
| II-12 | *Bacillus firmus* |
| II-13 | *Pasteuria nishizawae* |
| II-14 | *Flavobacterium* sp. |

Furthermore, particularly preferred strains of biopesticides II may be selected from the following biopesticide strains IIa-1 to IIa-11 in accordance with each row of table IIa, of which the biopesticide strains IIa-9, IIa-10, and IIa-11 are particularly preferred.

TABLE IIa

| No | biopesticide |
|---|---|
| IIa-1 | *Bacillus amyloliquefaciens* MBI600 |
| IIa-2 | *Bacillus amyloliquefaciens* AP-188 |
| IIa-3 | *Bacillus pumilus* INR-7 |
| IIa-4 | *Bacillus simplex* ABU 288 |
| IIa-5 | *Bacillus subtilis* FB17 |
| IIa-6 | *Penicillium steckii* IBWF104-06 |
| IIa-7 | *Burkholderia* sp. A396 |
| IIa-8 | *Paecilomyces lilacinus* 251 |
| IIa-9 | *Bacillus firmus* CNCM I-1582 |
| IIa-10 | *Pasteuria nishizawae* Pn1 |
| IIa-11 | *Flavobacterium* sp. H492 |

Particular embodiments of the present invention

In the context of the present invention, the following mixtures of compounds I, preferably compound i of formula I, and biopesticides II as in Table A are preferred and represent embodiments of the invention:

TABLE A

| No. | Compound I | Compound II |
|---|---|---|
| A-1 | I | II-1 |
| A-2 | I | II-2 |
| A-3 | I | II-3 |
| A-4 | I | II-4 |
| A-5 | I | II-5 |
| A-6 | I | II-6 |
| A-7 | I | II-7 |
| A-8 | I | II-8 |
| A-9 | I | II-9 |
| A-10 | I | II-10 |
| A-11 | I | II-11 |
| A-12 | I | II-12 |
| A-13 | I | II-13 |
| A-14 | I | II-14 |

The mixtures A-1 to A-14 as presented in table A represents binary mixtures according to the present invention.

Furthermore, the following mixtures of compound I, preferably compound i of formula I, and biopesticide strains IIa, as in Table B are preferred and represent embodiments of the invention:

TABLE B

| No. | Compound I | Compound II |
|-----|------------|-------------|
| B-1 | I | IIa-1 |
| B-2 | I | IIa-2 |
| B-3 | I | IIa-3 |
| B-4 | I | IIa-4 |
| B-5 | I | IIa-5 |
| B-6 | I | IIa-6 |
| B-7 | I | IIa-7 |
| B-8 | I | IIa-8 |
| B-9 | I | IIa-9 |
| B-10 | I | IIa-10 |
| B-11 | I | IIa-11 |

The mixtures B-1 to B-11 as presented in table B represents binary mixtures according to the present invention.

According to the invention, the solid material (dry matter) of the biopesticides (with the exception of oils such as Neem oil) are considered as active components (e. g. to be obtained after drying or evaporation of the extraction or suspension medium in case of liquid formulations of the microbial pesticides).

In accordance with the present invention, the weight ratios and percentages used herein for a biological extract such as Quillay extract are based on the total weight of the dry content (solid material) of the respective extract(s).

The total weight ratios of compositions comprising at least one microbial pesticide in the form of viable microbial cells including dormant forms, can be determined using the amount of CFU of the respective microorganism to calculate the total weight of the respective active component with the following equation that $1 \times 10^{10}$ CFU equals one gram of total weight of the respective active component. Colony forming unit is measure of viable microbial cells, in particular fungal and bacterial cells. In addition, here "CFU" may also be understood as the number of (juvenile) individual nematodes in case of (entomopathogenic) nematode biopesticides, such as *Steinernema feltiae*.

As already indicated above, component 1), preferably compound i of formula I, and component 2) of the mixtures of the invention are present in synergistically effective amounts.

In one embodiment, component 1), preferably compound i of formula I, and component 2) of the mixtures of the invention are present in a total weight ratio of from 100:1 to 1:100, wherein the total weight of component 2) is based on the amount of the solid material (dry mater) of component 2).

In the binary mixtures and compositions according to the invention the weight ratio of the component 1), preferably compound i of formula I, and the component 2) generally depends from the properties of the active components used, usually it is in the range of from 1:10,000 to 10,000:1, often it is in the range of from 1:100 to 100:1, regularly in the range of from 1:50 to 50:1, preferably in the range of from 1:20 to 20:1, more preferably in the range of from 1:10 to 10:1, even more preferably in the range of from 1:4 to 4:1 and in particular in the range of from 1:2 to 2:1.

According to further embodiments of the binary mixtures and compositions, the weight ratio of the component 1), preferably compound i of formula I, and the component 2) usually is in the range of from 1000:1 to 1:1, often in the range of from 100:1 to 1:1, regularly in the range of from 50:1 to 1:1, preferably in the range of from 20:1 to 1:1, more preferably in the range of from 10:1 to 1:1, even more preferably in the range of from 4:1 to 1:1 and in particular in the range of from 2:1 to 1:1.

According to further embodiments of the mixtures and compositions, the weight ratio of the component 1), preferably compound i of formula I, and the component 2) usually is in the range of from 20,000:1 to 1:10, often in the range of from 10,000:1 to 1:1, regularly in the range of from 5,000:1 to 5:1, preferably in the range of from 5,000:1 to 10:1, more preferably in the range of from 2,000:1 to 30:1, even more preferably in the range of from 2,000:1 to 100:1 and in particular in the range of from 1,000:1 to 100:1.

According to a further embodiments of the binary mixtures and compositions, the weight ratio of the component 1), preferably compound i of formula I, and the component 2) usually is in the range of from 1:1 to 1:1000, often in the range of from 1:1 to 1:100, regularly in the range of from 1:1 to 1:50, preferably in the range of from 1:1 to 1:20, more preferably in the range of from 1:1 to 1:10, even more preferably in the range of from 1:1 to 1:4 and in particular in the range of from 1:1 to 1:2.

According to further embodiments of the mixtures and compositions, the weight ratio of the component 1), preferably compound i of formula I, and the component 2) usually is in the range of from 10:1 to 1:20,000, often in the range of from 1:1 to 1:10,000, regularly in the range of from 1:5 to 1:5,000, preferably in the range of from 1:10 to 1:5,000, more preferably in the range of from 1:30 to 1:2,000, even more preferably in the range of from 1:100 to 1:2,000 to and in particular in the range of from 1:100 to 1:1,000.

In the ternary mixtures, i.e. compositions according to the invention comprising the component 1), preferably compound i of formula I, and component 2) and a compound III (component 3), the weight ratio of component 1), preferably compound i of formula I, and component 2) depends from the properties of the active substances used, usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1, and the weight ratio of component 1), preferably compound i of formula I, and component 3) usually it is in the range of from 1:100 to 100:1, regularly in the range of from 1:50 to 50:1, preferably in the range of from 1:20 to 20:1, more preferably in the range of from 1:10 to 10:1 and in particular in the range of from 1:4 to 4:1.

Any further active components are, if desired, added in a ratio of from 20:1 to 1:20 to the component 1), preferably compound i of formula I.

These ratios are also suitable for inventive mixtures applied by seed treatment.

When mixtures comprising microbial pesticides are employed in crop protection, the application rates preferably range from about $1 \times 10^6$ to $5 \times 10^{15}$ (or more) CFU/ha, preferably from about $1 \times 10^8$ to about $1 \times 10^{13}$ CFU/ha, and even more preferably from about $1 \times 10^9$ to about $1 \times 10^{12}$ CFU/ha. In the case of (entomopathogenic) nematodes as microbial pesticides (e. g. *Steinernema feltiae*), the application rates preferably range inform about $1 \times 10^5$ to $1 \times 10^{12}$ (or more), more preferably from $1 \times 10^8$ to $1 \times 10^{11}$, even more preferably from $5 \times 10^8$ to $1 \times 10^{10}$ individuals (e. g. in the form of eggs, juvenile or any other live stages, preferably in an infetive juvenile stage) per ha.

When mixtures comprising microbial pesticides are employed in seed treatment, the application rates with respect to plant propagation material preferably range from about $1 \times 10^6$ to $1 \times 10^{12}$ (or more) CFU/seed. Preferably, the concentration is about $1 \times 10^6$ to about $1 \times 10^9$ CFU/seed. In the case of the microbial pesticides II, the application rates with respect to plant propagation material also preferably range from about $1 \times 10^7$ to $1 \times 10^{14}$ (or more) CFU per 100 kg of seed, preferably from $1 \times 10^9$ to about $1 \times 10^{12}$ CFU per 100 kg of seed.

Further embodiments of the present invention

Binary mixtures have been described above as one embodiment of the present invention.

Ternary or higher mixtures represent another embodiment of the present invention.

In one embodiment, the mixtures of the invention, in particular the mixtures A-1 to A-14 or B-1 to B-11, further comprise as active component 3) a further active compound III, which is selected from insecticides or fungicides.

The insecticides, which are hereinafter described by common names, are commercially available and may be found in The Pesticide Manual, 16th Edition, C. MacBean, British Crop Protection Council (2013) among other publications. The online Pesticide Manual is updated regularly and is accessible through bcpcdata.com/pesticide-manual.html. Another online data base for pesticides providing the ISO common names is www.alanwood.net/pesticides.

The fungicides, which are hereinafter described by common names, are commercially available and may be found in the database www.alanwood.net/pesticides.

In one embodiment, the mixtures of the invention further comprise as active component 3) a further active compound III, which is an insecticide, wherein said insecticide is selected from the group consisting of fipronil, clothianidin, thiamethoxam, acetamiprid, dinotefuran, imidacloprid, thiacloprid, sulfoxaflor, methiocarb, tefluthrin, bifenthrin, cypermethrin, alphacypermethrin, spinosad, cyantraniliprole, chlorantraniliprole, triflumezopyrim, flupyradifurone, abamectin, thiodicarb, tetraniliprole and tioxazafen.

In another embodiment, the mixtures of the invention further comprise as active component 3) a further active compound III, which is a fungicide, wherein said fungicide is selected from the group consisting of azoxstrobin, trifloxystrobin, picoxystrobin, pyraclostrobin, sedaxane, penthiopyrad, penflufen, fluopyram, fluxapyroxad, boscalid, oxathiapiprolin, metalaxyl, metalaxyl-M, ethaboxam, dimethomorph, cyproconazole, difenoconazole, prothioconazole, flutriafol, thiabendazole, ipconazole, tebuconazole, triadimenol, prochloraz, fluquinconazole, triticonazole, fludioxonil, carboxin, silthiofarm, ziram, thiram, carbendazim, thiophanate methyl, fenamidone, hymexazol and fluazinam.

If the active compound III is an insecticide, said insecticide is preferably selected from the insecticides as defined in the following table IIIa. The insecticides as listed in table IIIa are in the following referred to as insecticides IIIa-1 to IIIa-22.

TABLE IIIa

| No | insecticide |
| --- | --- |
| IIIa-1 | fipronil |
| IIIa-2 | clothianidin |
| IIIa-3 | thiamethoxam |
| IIIa-4 | acetamiprid |
| IIIa-5 | dinotefuran |
| IIIa-6 | imidacloprid |
| IIIa-7 | thiacloprid |
| IIIa-8 | sulfoxaflor |

TABLE IIIa-continued

| No | insecticide |
| --- | --- |
| IIIa-9 | methiocarb |
| IIIa-10 | tefluthrin |
| IIIa-11 | bifenthrin |
| IIIa-12 | cypermethrin |
| IIIa-13 | alphacypermethrin |
| IIIa-14 | spinosad |
| IIIa-15 | cyantraniliprole |
| IIIa-16 | chlorantraniliprole |
| IIIa-17 | triflumezopyrim |
| IIIa-18 | flupyradifurone |
| IIIa-19 | abamectin |
| IIIa-20 | thiodicarb |
| IIIa-21 | tetraniliprole |
| IIIa-22 | tioxazafen |

If the active compound III is a fungicide, said fungicide is preferably selected from the fungicides as defined in the following table IIIb. The fungicides as listed in table IIIb are in the following referred to as fungicides IIIb-1 to IIIb-36.

TABLE IIIb

| No | fungicide |
| --- | --- |
| IIIb-1 | azoxstrobin |
| IIIb-2 | trifloxystrobin |
| IIIb-3 | picoxystrobin |
| IIIb-4 | pyraclostrobin |
| IIIb-5 | sedaxane |
| IIIb-6 | penthiopyrad |
| IIIb-7 | penflufen |
| IIIb-8 | fluopyram |
| IIIb-9 | fluxapyroxad |
| IIIb-10 | boscalid |
| IIIb-11 | oxathiapiprolin |
| IIIb-12 | metalaxyl |
| IIIb-13 | metalaxyl-M |
| IIIb-14 | ethaboxam |
| IIIb-15 | dimethomorph |
| IIIb-16 | cyproconazole |
| IIIb-17 | difenoconazole |
| IIIb-18 | prothioconazole |
| IIIb-19 | flutriafol |
| IIIb-20 | thiabendazole |
| IIIb-21 | ipconazole |
| IIIb-22 | tebuconazole |
| IIIb-23 | triadimenol |
| IIIb-24 | prochloraz |
| IIIb-25 | fluquinconazole |
| IIIb-26 | triticonazole |
| IIIb-27 | fludioxonil |
| IIIb-28 | carboxin |
| IIIb-29 | silthiofarm |
| IIIb-30 | ziram |
| IIIb-31 | thiram |
| IIIb-32 | carbendazim |
| IIIb-33 | thiophanate methyl |
| IIIb-34 | fenamidone |
| IIIb-35 | hymexazol |
| IIIb-36 | fluazinam |

In one embodiment, the present invention relates to ternary mixtures, which comprise at least the carboxamide compound of formula I as component 1), preferably compound i of formula I, and at least one biopesticide II, which is preferably selected from the biopesticides II-1 to II-14, and at least one further active compound III, which may be preferably selected from the insecticides IIIa-1 to IIIa-22 or the fungicides IIIb-1 to IIIb-36.

Such mixtures are preferably ternary mixture comprising the carboxamide compound of formula I as component 1), preferably compound i of formula I, and one biopesticide II, which is selected from the biopesticides II-1 to II-14, in particular from the biopesticide strains IIa-1 to IIa-11, and one further active compound III, which may be selected from the insecticides IIIa-1 to IIIa-22.

Such mixtures are preferably ternary mixture comprising the carboxamide compound of formula I as component 1), preferably compound i of formula I, and one biopesticide II, which is selected from the biopesticides II-1 to II-14, in particular from the biopesticide strains IIa-1 to IIa-11, and one further active compound III, which may be selected from the fungicides IIIb-1 to IIIb-36.

In another embodiment, the present invention relates to ternary mixtures, which comprise at least the carboxamide compound of formula I as component 1), preferably compound i of formula I, and at least one biopesticide II with nematicidal activity, and at least one further nematicidal active compound III, preferably selected from abamectin or tioxazafen.

With regard to the use of mixtures according to the present invention for the control of nematodes, especially for their nematicidal activity in seed treatment, the nematicidal mixtures may comprise the carboxamide compound of formula I as component 1), preferably compound i of formula I, combined with one biopesticide II with nematicidal activity or, alternatively, with a non-biopesticide with nematicidal activity, such as abamectin or tioxazafen.

Thus for the control of nematodes, the carboxamide compound of formula I may be combined with abamectin, independently of the presence of a biopesticide.

Thus for the control of nematodes, the carboxamide compound of formula I may be combined with tioxazafen, independently of the presence of a biopesticide.

Thus the binary nematicidal mixture may comprise the carboxamide compound of formula I and tioxazafen.

Thus the binary nematicidal mixture may comprise the carboxamide compound of formula I and abamectin.

In view of the ternary mixtures described herein above, preference is given to the pesticidal mixtures compiled in the tables below.

Table 1
Pesticidal mixtures, which comprise carboxamide compound of formula I as component 1), preferably compound i of formula I, and in which the combination of components 2) and 3) corresponds in each case to the combination of a biopesticide II or biopesticide strain IIa with an active compound III according to one row of Table M said pesticidal mixtures being referred to as pesticidal mixtures I-M-1 to I-M-1453

TABLE M

| No. | II/IIa | III |
|---|---|---|
| M-1 | II-1 | IIIa-1 |
| M-2 | II-2 | IIIa-1 |
| M-3 | II-3 | IIIa-1 |
| M-4 | II-4 | IIIa-1 |
| M-5 | II-5 | IIIa-1 |
| M-6 | II-6 | IIIa-1 |
| M-7 | II-7 | IIIa-1 |
| M-8 | II-8 | IIIa-1 |
| M-9 | II-9 | IIIa-1 |
| M-10 | II-10 | IIIa-1 |
| M-11 | II-11 | IIIa-1 |
| M-12 | II-12 | IIIa-1 |
| M-13 | II-13 | IIIa-1 |
| M-14 | II-14 | IIIa-1 |
| M-15 | II-1 | IIIa-2 |
| M-16 | II-2 | IIIa-2 |
| M-17 | II-3 | IIIa-2 |
| M-18 | II-4 | IIIa-2 |
| M-19 | II-5 | IIIa-2 |
| M-20 | II-6 | IIIa-2 |
| M-21 | II-7 | IIIa-2 |
| M-22 | II-8 | IIIa-2 |
| M-23 | II-9 | IIIa-2 |
| M-24 | II-10 | IIIa-2 |
| M-25 | II-11 | IIIa-2 |
| M-26 | II-12 | IIIa-2 |
| M-27 | II-13 | IIIa-2 |
| M-28 | II-14 | IIIa-2 |
| M-29 | II-1 | IIIa-3 |
| M-30 | II-2 | IIIa-3 |
| M-31 | II-3 | IIIa-3 |
| M-32 | II-4 | IIIa-3 |
| M-33 | II-5 | IIIa-3 |
| M-34 | II-6 | IIIa-3 |
| M-35 | II-7 | IIIa-3 |
| M-36 | II-8 | IIIa-3 |
| M-37 | II-9 | IIIa-3 |
| M-38 | II-10 | IIIa-3 |
| M-39 | II-11 | IIIa-3 |
| M-40 | II-12 | IIIa-3 |
| M-41 | II-13 | IIIa-3 |
| M-42 | II-14 | IIIa-3 |
| M-43 | II-1 | IIIa-4 |
| M-44 | II-2 | IIIa-4 |
| M-45 | II-3 | IIIa-4 |
| M-46 | II-4 | IIIa-4 |
| M-47 | II-5 | IIIa-4 |
| M-48 | II-6 | IIIa-4 |
| M-49 | II-7 | IIIa-4 |
| M-50 | II-8 | IIIa-4 |
| M-51 | II-9 | IIIa-4 |
| M-52 | II-10 | IIIa-4 |
| M-53 | II-11 | IIIa-4 |
| M-54 | II-12 | IIIa-4 |
| M-55 | II-13 | IIIa-4 |
| M-56 | II-14 | IIIa-4 |
| M-57 | II-1 | IIIa-5 |
| M-58 | II-2 | IIIa-5 |
| M-59 | II-3 | IIIa-5 |
| M-60 | II-4 | IIIa-5 |
| M-61 | II-5 | IIIa-5 |
| M-62 | II-6 | IIIa-5 |
| M-63 | II-7 | IIIa-5 |
| M-64 | II-8 | IIIa-5 |
| M-65 | II-9 | IIIa-5 |
| M-66 | II-10 | IIIa-5 |
| M-67 | II-11 | IIIa-5 |
| M-68 | II-12 | IIIa-5 |
| M-69 | II-13 | IIIa-5 |
| M-70 | II-14 | IIIa-5 |
| M-71 | II-1 | IIIa-6 |
| M-72 | II-2 | IIIa-6 |
| M-73 | II-3 | IIIa-6 |
| M-74 | II-4 | IIIa-6 |
| M-75 | II-5 | IIIa-6 |
| M-76 | II-6 | IIIa-6 |
| M-77 | II-7 | IIIa-6 |
| M-78 | II-8 | IIIa-6 |
| M-79 | II-9 | IIIa-6 |
| M-80 | II-10 | IIIa-6 |
| M-81 | II-11 | IIIa-6 |
| M-82 | II-12 | IIIa-6 |
| M-83 | II-13 | IIIa-6 |
| M-84 | II-14 | IIIa-6 |
| M-85 | II-1 | IIIa-7 |
| M-86 | II-2 | IIIa-7 |
| M-87 | II-3 | IIIa-7 |
| M-88 | II-4 | IIIa-7 |
| M-89 | II-5 | IIIa-7 |
| M-90 | II-6 | IIIa-7 |
| M-91 | II-7 | IIIa-7 |
| M-92 | II-8 | IIIa-7 |
| M-93 | II-9 | IIIa-7 |
| M-94 | II-10 | IIIa-7 |
| M-95 | II-11 | IIIa-7 |

TABLE M-continued

| No. | II/IIa | III |
|---|---|---|
| M-96 | II-12 | IIIa-7 |
| M-97 | II-13 | IIIa-7 |
| M-98 | II-14 | IIIa-7 |
| M-99 | II-1 | IIIa-8 |
| M-100 | II-2 | IIIa-8 |
| M-101 | II-3 | IIIa-8 |
| M-102 | II-4 | IIIa-8 |
| M-103 | II-5 | IIIa-8 |
| M-104 | II-6 | IIIa-8 |
| M-105 | II-7 | IIIa-8 |
| M-106 | II-8 | IIIa-8 |
| M-107 | II-9 | IIIa-8 |
| M-108 | II-10 | IIIa-8 |
| M-109 | II-11 | IIIa-8 |
| M-110 | II-12 | IIIa-8 |
| M-111 | II-13 | IIIa-8 |
| M-112 | II-14 | IIIa-8 |
| M-113 | II-1 | IIIa-9 |
| M-114 | II-2 | IIIa-9 |
| M-115 | II-3 | IIIa-9 |
| M-116 | II-4 | IIIa-9 |
| M-117 | II-5 | IIIa-9 |
| M-118 | II-6 | IIIa-9 |
| M-119 | II-7 | IIIa-9 |
| M-120 | II-8 | IIIa-9 |
| M-121 | II-9 | IIIa-9 |
| M-122 | II-10 | IIIa-9 |
| M-123 | II-11 | IIIa-9 |
| M-124 | II-12 | IIIa-9 |
| M-125 | II-13 | IIIa-9 |
| M-126 | II-14 | IIIa-9 |
| M-127 | II-1 | IIIa-10 |
| M-128 | II-2 | IIIa-10 |
| M-129 | II-3 | IIIa-10 |
| M-130 | II-4 | IIIa-10 |
| M-131 | II-5 | IIIa-10 |
| M-132 | II-6 | IIIa-10 |
| M-133 | II-7 | IIIa-10 |
| M-134 | II-8 | IIIa-10 |
| M-135 | II-9 | IIIa-10 |
| M-136 | II-10 | IIIa-10 |
| M-137 | II-11 | IIIa-10 |
| M-138 | II-12 | IIIa-10 |
| M-139 | II-13 | IIIa-10 |
| M-140 | II-14 | IIIa-10 |
| M-141 | II-1 | IIIa-11 |
| M-142 | II-2 | IIIa-11 |
| M-143 | II-3 | IIIa-11 |
| M-144 | II-4 | IIIa-11 |
| M-145 | II-5 | IIIa-11 |
| M-146 | II-6 | IIIa-11 |
| M-147 | II-7 | IIIa-11 |
| M-148 | II-8 | IIIa-11 |
| M-149 | II-9 | IIIa-11 |
| M-150 | II-10 | IIIa-11 |
| M-151 | II-11 | IIIa-11 |
| M-152 | II-12 | IIIa-11 |
| M-153 | II-13 | IIIa-11 |
| M-154 | II-14 | IIIa-11 |
| M-155 | II-1 | IIIa-12 |
| M-156 | II-2 | IIIa-12 |
| M-157 | II-3 | IIIa-12 |
| M-158 | II-4 | IIIa-12 |
| M-159 | II-5 | IIIa-12 |
| M-160 | II-6 | IIIa-12 |
| M-161 | II-7 | IIIa-12 |
| M-162 | II-8 | IIIa-12 |
| M-163 | II-9 | IIIa-12 |
| M-164 | II-10 | IIIa-12 |
| M-165 | II-11 | IIIa-12 |
| M-166 | II-12 | IIIa-12 |
| M-167 | II-13 | IIIa-12 |
| M-168 | II-14 | IIIa-12 |
| M-169 | II-1 | IIIa-13 |
| M-170 | II-2 | IIIa-13 |
| M-171 | II-3 | IIIa-13 |
| M-172 | II-4 | IIIa-13 |
| M-173 | II-5 | IIIa-13 |
| M-174 | II-6 | IIIa-13 |
| M-175 | II-7 | IIIa-13 |
| M-176 | II-8 | IIIa-13 |
| M-177 | II-9 | IIIa-13 |
| M-178 | II-10 | IIIa-13 |
| M-179 | II-11 | IIIa-13 |
| M-180 | II-12 | IIIa-13 |
| M-181 | II-13 | IIIa-13 |
| M-182 | II-14 | IIIa-13 |
| M-183 | II-1 | IIIa-14 |
| M-184 | II-2 | IIIa-14 |
| M-185 | II-3 | IIIa-14 |
| M-186 | II-4 | IIIa-14 |
| M-187 | II-5 | IIIa-14 |
| M-188 | II-6 | IIIa-14 |
| M-189 | II-7 | IIIa-14 |
| M-190 | II-8 | IIIa-14 |
| M-191 | II-9 | IIIa-14 |
| M-192 | II-10 | IIIa-14 |
| M-193 | II-11 | IIIa-14 |
| M-194 | II-12 | IIIa-14 |
| M-195 | II-13 | IIIa-14 |
| M-196 | II-14 | IIIa-14 |
| M-197 | II-1 | IIIa-15 |
| M-198 | II-2 | IIIa-15 |
| M-199 | II-3 | IIIa-15 |
| M-200 | II-4 | IIIa-15 |
| M-201 | II-5 | IIIa-15 |
| M-202 | II-6 | IIIa-15 |
| M-203 | II-7 | IIIa-15 |
| M-204 | II-8 | IIIa-15 |
| M-205 | II-9 | IIIa-15 |
| M-206 | II-10 | IIIa-15 |
| M-207 | II-11 | IIIa-15 |
| M-208 | II-12 | IIIa-15 |
| M-209 | II-13 | IIIa-15 |
| M-210 | II-14 | IIIa-15 |
| M-211 | II-1 | IIIa-16 |
| M-212 | II-2 | IIIa-16 |
| M-213 | II-3 | IIIa-16 |
| M-214 | II-4 | IIIa-16 |
| M-215 | II-5 | IIIa-16 |
| M-216 | II-6 | IIIa-16 |
| M-217 | II-7 | IIIa-16 |
| M-218 | II-8 | IIIa-16 |
| M-219 | II-9 | IIIa-16 |
| M-220 | II-10 | IIIa-16 |
| M-221 | II-11 | IIIa-16 |
| M-222 | II-12 | IIIa-16 |
| M-223 | II-13 | IIIa-16 |
| M-224 | II-14 | IIIa-16 |
| M-225 | II-1 | IIIa-17 |
| M-226 | II-2 | IIIa-17 |
| M-227 | II-3 | IIIa-17 |
| M-228 | II-4 | IIIa-17 |
| M-229 | II-5 | IIIa-17 |
| M-230 | II-6 | IIIa-17 |
| M-231 | II-7 | IIIa-17 |
| M-232 | II-8 | IIIa-17 |
| M-233 | II-9 | IIIa-17 |
| M-234 | II-10 | IIIa-17 |
| M-235 | II-11 | IIIa-17 |
| M-236 | II-12 | IIIa-17 |
| M-237 | II-13 | IIIa-17 |
| M-238 | II-14 | IIIa-17 |
| M-239 | II-1 | IIIa-18 |
| M-240 | II-2 | IIIa-18 |
| M-241 | II-3 | IIIa-18 |
| M-242 | II-4 | IIIa-18 |
| M-243 | II-5 | IIIa-18 |
| M-244 | II-6 | IIIa-18 |
| M-245 | II-7 | IIIa-18 |
| M-246 | II-8 | IIIa-18 |
| M-247 | II-9 | IIIa-18 |
| M-248 | II-10 | IIIa-18 |
| M-249 | II-11 | IIIa-18 |
| M-250 | II-12 | IIIa-18 |
| M-251 | II-13 | IIIa-18 |

TABLE M-continued

| No. | II/IIa | III |
|---|---|---|
| M-252 | II-14 | IIIa-18 |
| M-253 | II-1 | IIIa-19 |
| M-254 | II-2 | IIIa-19 |
| M-255 | II-3 | IIIa-19 |
| M-256 | II-4 | IIIa-19 |
| M-257 | II-5 | IIIa-19 |
| M-258 | II-6 | IIIa-19 |
| M-259 | II-7 | IIIa-19 |
| M-260 | II-8 | IIIa-19 |
| M-261 | II-9 | IIIa-19 |
| M-262 | II-10 | IIIa-19 |
| M-263 | II-11 | IIIa-19 |
| M-264 | II-12 | IIIa-19 |
| M-265 | II-13 | IIIa-19 |
| M-266 | II-14 | IIIa-19 |
| M-267 | II-1 | IIIa-20 |
| M-268 | II-2 | IIIa-20 |
| M-269 | II-3 | IIIa-20 |
| M-270 | II-4 | IIIa-20 |
| M-271 | II-5 | IIIa-20 |
| M-272 | II-6 | IIIa-20 |
| M-273 | II-7 | IIIa-20 |
| M-274 | II-8 | IIIa-20 |
| M-275 | II-9 | IIIa-20 |
| M-276 | II-10 | IIIa-20 |
| M-277 | II-11 | IIIa-20 |
| M-278 | II-12 | IIIa-20 |
| M-279 | II-13 | IIIa-20 |
| M-280 | II-14 | IIIa-20 |
| M-281 | II-1 | IIIa-21 |
| M-282 | II-2 | IIIa-21 |
| M-283 | II-3 | IIIa-21 |
| M-284 | II-4 | IIIa-21 |
| M-285 | II-5 | IIIa-21 |
| M-286 | II-6 | IIIa-21 |
| M-287 | II-7 | IIIa-21 |
| M-288 | II-8 | IIIa-21 |
| M-289 | II-9 | IIIa-21 |
| M-290 | II-10 | IIIa-21 |
| M-291 | II-11 | IIIa-21 |
| M-292 | II-12 | IIIa-21 |
| M-293 | II-13 | IIIa-21 |
| M-294 | II-14 | IIIa-21 |
| M-295 | II-1 | IIIa-22 |
| M-296 | II-2 | IIIa-22 |
| M-297 | II-3 | IIIa-22 |
| M-298 | II-4 | IIIa-22 |
| M-299 | II-5 | IIIa-22 |
| M-300 | II-6 | IIIa-22 |
| M-301 | II-7 | IIIa-22 |
| M-302 | II-8 | IIIa-22 |
| M-303 | II-9 | IIIa-22 |
| M-304 | II-10 | IIIa-22 |
| M-305 | II-11 | IIIa-22 |
| M-306 | II-12 | IIIa-22 |
| M-307 | II-13 | IIIa-22 |
| M-308 | II-14 | IIIa-22 |
| M-309 | | |
| M-310 | II-1 | IIIb-1 |
| M-311 | II-2 | IIIb-1 |
| M-312 | II-3 | IIIb-1 |
| M-313 | II-4 | IIIb-1 |
| M-314 | II-5 | IIIb-1 |
| M-315 | II-6 | IIIb-1 |
| M-316 | II-7 | IIIb-1 |
| M-317 | II-8 | IIIb-1 |
| M-318 | II-9 | IIIb-1 |
| M-319 | II-10 | IIIb-1 |
| M-320 | II-11 | IIIb-1 |
| M-321 | II-12 | IIIb-1 |
| M-322 | II-13 | IIIb-1 |
| M-323 | II-14 | IIIb-1 |
| M-324 | II-1 | IIIb-2 |
| M-325 | II-2 | IIIb-2 |
| M-326 | II-3 | IIIb-2 |
| M-327 | II-4 | IIIb-2 |
| M-328 | II-5 | IIIb-2 |
| M-329 | II-6 | IIIb-2 |
| M-330 | II-7 | IIIb-2 |
| M-331 | II-8 | IIIb-2 |
| M-332 | II-9 | IIIb-2 |
| M-333 | II-10 | IIIb-2 |
| M-334 | II-11 | IIIb-2 |
| M-335 | II-12 | IIIb-2 |
| M-336 | II-13 | IIIb-2 |
| M-337 | II-14 | IIIb-2 |
| M-338 | II-1 | IIIb-3 |
| M-339 | II-2 | IIIb-3 |
| M-340 | II-3 | IIIb-3 |
| M-341 | II-4 | IIIb-3 |
| M-342 | II-5 | IIIb-3 |
| M-343 | II-6 | IIIb-3 |
| M-344 | II-7 | IIIb-3 |
| M-345 | II-8 | IIIb-3 |
| M-346 | II-9 | IIIb-3 |
| M-347 | II-10 | IIIb-3 |
| M-348 | II-11 | IIIb-3 |
| M-349 | II-12 | IIIb-3 |
| M-350 | II-13 | IIIb-3 |
| M-351 | II-14 | IIIb-3 |
| M-352 | II-1 | IIIb-4 |
| M-353 | II-2 | IIIb-4 |
| M-354 | II-3 | IIIb-4 |
| M-355 | II-4 | IIIb-4 |
| M-356 | II-5 | IIIb-4 |
| M-357 | II-6 | IIIb-4 |
| M-358 | II-7 | IIIb-4 |
| M-359 | II-8 | IIIb-4 |
| M-360 | II-9 | IIIb-4 |
| M-361 | II-10 | IIIb-4 |
| M-362 | II-11 | IIIb-4 |
| M-363 | II-12 | IIIb-4 |
| M-364 | II-13 | IIIb-4 |
| M-365 | II-14 | IIIb-4 |
| M-366 | II-1 | IIIb-5 |
| M-367 | II-2 | IIIb-5 |
| M-368 | II-3 | IIIb-5 |
| M-369 | II-4 | IIIb-5 |
| M-370 | II-5 | IIIb-5 |
| M-371 | II-6 | IIIb-5 |
| M-372 | II-7 | IIIb-5 |
| M-373 | II-8 | IIIb-5 |
| M-374 | II-9 | IIIb-5 |
| M-375 | II-10 | IIIb-5 |
| M-376 | II-11 | IIIb-5 |
| M-377 | II-12 | IIIb-5 |
| M-378 | II-13 | IIIb-5 |
| M-379 | II-14 | IIIb-5 |
| M-380 | II-1 | IIIb-6 |
| M-381 | II-2 | IIIb-6 |
| M-382 | II-3 | IIIb-6 |
| M-383 | II-4 | IIIb-6 |
| M-384 | II-5 | IIIb-6 |
| M-385 | II-6 | IIIb-6 |
| M-386 | II-7 | IIIb-6 |
| M-387 | II-8 | IIIb-6 |
| M-388 | II-9 | IIIb-6 |
| M-389 | II-10 | IIIb-6 |
| M-390 | II-11 | IIIb-6 |
| M-391 | II-12 | IIIb-6 |
| M-392 | II-13 | IIIb-6 |
| M-393 | II-14 | IIIb-6 |
| M-394 | II-1 | IIIb-7 |
| M-395 | II-2 | IIIb-7 |
| M-396 | II-3 | IIIb-7 |
| M-397 | II-4 | IIIb-7 |
| M-398 | II-5 | IIIb-7 |
| M-399 | II-6 | IIIb-7 |
| M-400 | II-7 | IIIb-7 |
| M-401 | II-8 | IIIb-7 |
| M-402 | II-9 | IIIb-7 |
| M-403 | II-10 | IIIb-7 |
| M-404 | II-11 | IIIb-7 |
| M-405 | II-12 | IIIb-7 |
| M-406 | II-13 | IIIb-7 |
| M-407 | II-14 | IIIb-7 |

TABLE M-continued

| No. | II/IIa | III |
|---|---|---|
| M-408 | II-1 | IIIb-8 |
| M-409 | II-2 | IIIb-8 |
| M-410 | II-3 | IIIb-8 |
| M-411 | II-4 | IIIb-8 |
| M-412 | II-5 | IIIb-8 |
| M-413 | II-6 | IIIb-8 |
| M-414 | II-7 | IIIb-8 |
| M-415 | II-8 | IIIb-8 |
| M-416 | II-9 | IIIb-8 |
| M-417 | II-10 | IIIb-8 |
| M-418 | II-11 | IIIb-8 |
| M-419 | II-12 | IIIb-8 |
| M-420 | II-13 | IIIb-8 |
| M-421 | II-14 | IIIb-8 |
| M-422 | II-1 | IIIb-9 |
| M-423 | II-2 | IIIb-9 |
| M-424 | II-3 | IIIb-9 |
| M-425 | II-4 | IIIb-9 |
| M-426 | II-5 | IIIb-9 |
| M-427 | II-6 | IIIb-9 |
| M-428 | II-7 | IIIb-9 |
| M-429 | II-8 | IIIb-9 |
| M-430 | II-9 | IIIb-9 |
| M-431 | II-10 | IIIb-9 |
| M-432 | II-11 | IIIb-9 |
| M-433 | II-12 | IIIb-9 |
| M-434 | II-13 | IIIb-9 |
| M-435 | II-14 | IIIb-9 |
| M-436 | II-1 | IIIb-10 |
| M-437 | II-2 | IIIb-10 |
| M-438 | II-3 | IIIb-10 |
| M-439 | II-4 | IIIb-10 |
| M-440 | II-5 | IIIb-10 |
| M-441 | II-6 | IIIb-10 |
| M-442 | II-7 | IIIb-10 |
| M-443 | II-8 | IIIb-10 |
| M-444 | II-9 | IIIb-10 |
| M-445 | II-10 | IIIb-10 |
| M-446 | II-11 | IIIb-10 |
| M-447 | II-12 | IIIb-10 |
| M-448 | II-13 | IIIb-10 |
| M-449 | II-14 | IIIb-10 |
| M-450 | II-1 | IIIb-11 |
| M-451 | II-2 | IIIb-11 |
| M-452 | II-3 | IIIb-11 |
| M-453 | II-4 | IIIb-11 |
| M-454 | II-5 | IIIb-11 |
| M-455 | II-6 | IIIb-11 |
| M-456 | II-7 | IIIb-11 |
| M-457 | II-8 | IIIb-11 |
| M-458 | II-9 | IIIb-11 |
| M-459 | II-10 | IIIb-11 |
| M-460 | II-11 | IIIb-11 |
| M-461 | II-12 | IIIb-11 |
| M-462 | II-13 | IIIb-11 |
| M-463 | II-14 | IIIb-11 |
| M-464 | II-1 | IIIb-12 |
| M-465 | II-2 | IIIb-12 |
| M-466 | II-3 | IIIb-12 |
| M-467 | II-4 | IIIb-12 |
| M-468 | II-5 | IIIb-12 |
| M-469 | II-6 | IIIb-12 |
| M-470 | II-7 | IIIb-12 |
| M-471 | II-8 | IIIb-12 |
| M-472 | II-9 | IIIb-12 |
| M-473 | II-10 | IIIb-12 |
| M-474 | II-11 | IIIb-12 |
| M-475 | II-12 | IIIb-12 |
| M-476 | II-13 | IIIb-12 |
| M-477 | II-14 | IIIb-12 |
| M-478 | II-1 | IIIb-13 |
| M-479 | II-2 | IIIb-13 |
| M-480 | II-3 | IIIb-13 |
| M-481 | II-4 | IIIb-13 |
| M-482 | II-5 | IIIb-13 |
| M-483 | II-6 | IIIb-13 |
| M-484 | II-7 | IIIb-13 |
| M-485 | II-8 | IIIb-13 |
| M-486 | II-9 | IIIb-13 |
| M-487 | II-10 | IIIb-13 |
| M-488 | II-11 | IIIb-13 |
| M-489 | II-12 | IIIb-13 |
| M-490 | II-13 | IIIb-13 |
| M-491 | II-14 | IIIb-13 |
| M-492 | II-1 | IIIb-14 |
| M-493 | II-2 | IIIb-14 |
| M-494 | II-3 | IIIb-14 |
| M-495 | II-4 | IIIb-14 |
| M-496 | II-5 | IIIb-14 |
| M-497 | II-6 | IIIb-14 |
| M-498 | II-7 | IIIb-14 |
| M-499 | II-8 | IIIb-14 |
| M-500 | II-9 | IIIb-14 |
| M-501 | II-10 | IIIb-14 |
| M-502 | II-11 | IIIb-14 |
| M-503 | II-12 | IIIb-14 |
| M-504 | II-13 | IIIb-14 |
| M-505 | II-14 | IIIb-14 |
| M-506 | II-1 | IIIb-15 |
| M-507 | II-2 | IIIb-15 |
| M-508 | II-3 | IIIb-15 |
| M-509 | II-4 | IIIb-15 |
| M-510 | II-5 | IIIb-15 |
| M-511 | II-6 | IIIb-15 |
| M-512 | II-7 | IIIb-15 |
| M-513 | II-8 | IIIb-15 |
| M-514 | II-9 | IIIb-15 |
| M-515 | II-10 | IIIb-15 |
| M-516 | II-11 | IIIb-15 |
| M-517 | II-12 | IIIb-15 |
| M-518 | II-13 | IIIb-15 |
| M-519 | II-14 | IIIb-15 |
| M-520 | II-1 | IIIb-16 |
| M-521 | II-2 | IIIb-16 |
| M-522 | II-3 | IIIb-16 |
| M-523 | II-4 | IIIb-16 |
| M-524 | II-5 | IIIb-16 |
| M-525 | II-6 | IIIb-16 |
| M-526 | II-7 | IIIb-16 |
| M-527 | II-8 | IIIb-16 |
| M-528 | II-9 | IIIb-16 |
| M-529 | II-10 | IIIb-16 |
| M-530 | II-11 | IIIb-16 |
| M-531 | II-12 | IIIb-16 |
| M-532 | II-13 | IIIb-16 |
| M-533 | II-14 | IIIb-16 |
| M-534 | II-1 | IIIb-17 |
| M-535 | II-2 | IIIb-17 |
| M-536 | II-3 | IIIb-17 |
| M-537 | II-4 | IIIb-17 |
| M-538 | II-5 | IIIb-17 |
| M-539 | II-6 | IIIb-17 |
| M-540 | II-7 | IIIb-17 |
| M-541 | II-8 | IIIb-17 |
| M-542 | II-9 | IIIb-17 |
| M-543 | II-10 | IIIb-17 |
| M-544 | II-11 | IIIb-17 |
| M-545 | II-12 | IIIb-17 |
| M-546 | II-13 | IIIb-17 |
| M-547 | II-14 | IIIb-17 |
| M-548 | II-1 | IIIb-18 |
| M-549 | II-2 | IIIb-18 |
| M-550 | II-3 | IIIb-18 |
| M-551 | II-4 | IIIb-18 |
| M-552 | II-5 | IIIb-18 |
| M-553 | II-6 | IIIb-18 |
| M-554 | II-7 | IIIb-18 |
| M-555 | II-8 | IIIb-18 |
| M-556 | II-9 | IIIb-18 |
| M-557 | II-10 | IIIb-18 |
| M-558 | II-11 | IIIb-18 |
| M-559 | II-12 | IIIb-18 |
| M-560 | II-13 | IIIb-18 |
| M-561 | II-14 | IIIb-18 |
| M-562 | II-1 | IIIb-19 |
| M-563 | II-2 | IIIb-19 |

TABLE M-continued

| No. | II/IIa | III |
|---|---|---|
| M-564 | II-3 | IIIb-19 |
| M-565 | II-4 | IIIb-19 |
| M-566 | II-5 | IIIb-19 |
| M-567 | II-6 | IIIb-19 |
| M-568 | II-7 | IIIb-19 |
| M-569 | II-8 | IIIb-19 |
| M-570 | II-9 | IIIb-19 |
| M-571 | II-10 | IIIb-19 |
| M-572 | II-11 | IIIb-19 |
| M-573 | II-12 | IIIb-19 |
| M-574 | II-13 | IIIb-19 |
| M-575 | II-14 | IIIb-19 |
| M-576 | II-1 | IIIb-20 |
| M-577 | II-2 | IIIb-20 |
| M-578 | II-3 | IIIb-20 |
| M-579 | II-4 | IIIb-20 |
| M-580 | II-5 | IIIb-20 |
| M-581 | II-6 | IIIb-20 |
| M-582 | II-7 | IIIb-20 |
| M-583 | II-8 | IIIb-20 |
| M-584 | II-9 | IIIb-20 |
| M-585 | II-10 | IIIb-20 |
| M-586 | II-11 | IIIb-20 |
| M-587 | II-12 | IIIb-20 |
| M-588 | II-13 | IIIb-20 |
| M-589 | II-14 | IIIb-20 |
| M-590 | II-1 | IIIb-21 |
| M-591 | II-2 | IIIb-21 |
| M-592 | II-3 | IIIb-21 |
| M-593 | II-4 | IIIb-21 |
| M-594 | II-5 | IIIb-21 |
| M-595 | II-6 | IIIb-21 |
| M-596 | II-7 | IIIb-21 |
| M-597 | II-8 | IIIb-21 |
| M-598 | II-9 | IIIb-21 |
| M-599 | II-10 | IIIb-21 |
| M-600 | II-11 | IIIb-21 |
| M-601 | II-12 | IIIb-21 |
| M-602 | II-13 | IIIb-21 |
| M-603 | II-14 | IIIb-21 |
| M-604 | II-1 | IIIb-22 |
| M-605 | II-2 | IIIb-22 |
| M-606 | II-3 | IIIb-22 |
| M-607 | II-4 | IIIb-22 |
| M-608 | II-5 | IIIb-22 |
| M-609 | II-6 | IIIb-22 |
| M-610 | II-7 | IIIb-22 |
| M-611 | II-8 | IIIb-22 |
| M-612 | II-9 | IIIb-22 |
| M-613 | II-10 | IIIb-22 |
| M-614 | II-11 | IIIb-22 |
| M-615 | II-12 | IIIb-22 |
| M-616 | II-13 | IIIb-22 |
| M-617 | II-14 | IIIb-22 |
| M-618 | II-1 | IIIb-23 |
| M-619 | II-2 | IIIb-23 |
| M-620 | II-3 | IIIb-23 |
| M-621 | II-4 | IIIb-23 |
| M-622 | II-5 | IIIb-23 |
| M-623 | II-6 | IIIb-23 |
| M-624 | II-7 | IIIb-23 |
| M-625 | II-8 | IIIb-23 |
| M-626 | II-9 | IIIb-23 |
| M-627 | II-10 | IIIb-23 |
| M-628 | II-11 | IIIb-23 |
| M-629 | II-12 | IIIb-23 |
| M-630 | II-13 | IIIb-23 |
| M-631 | II-14 | IIIb-23 |
| M-632 | II-1 | IIIb-24 |
| M-633 | II-2 | IIIb-24 |
| M-634 | II-3 | IIIb-24 |
| M-635 | II-4 | IIIb-24 |
| M-636 | II-5 | IIIb-24 |
| M-637 | II-6 | IIIb-24 |
| M-638 | II-7 | IIIb-24 |
| M-639 | II-8 | IIIb-24 |
| M-640 | II-9 | IIIb-24 |
| M-641 | II-10 | IIIb-24 |
| M-642 | II-11 | IIIb-24 |
| M-643 | II-12 | IIIb-24 |
| M-644 | II-13 | IIIb-24 |
| M-645 | II-14 | IIIb-24 |
| M-646 | II-1 | IIIb-25 |
| M-647 | II-2 | IIIb-25 |
| M-648 | II-3 | IIIb-25 |
| M-649 | II-4 | IIIb-25 |
| M-650 | II-5 | IIIb-25 |
| M-651 | II-6 | IIIb-25 |
| M-652 | II-7 | IIIb-25 |
| M-653 | II-8 | IIIb-25 |
| M-654 | II-9 | IIIb-25 |
| M-655 | II-10 | IIIb-25 |
| M-656 | II-11 | IIIb-25 |
| M-657 | II-12 | IIIb-25 |
| M-658 | II-13 | IIIb-25 |
| M-659 | II-14 | IIIb-25 |
| M-660 | II-1 | IIIb-26 |
| M-661 | II-2 | IIIb-26 |
| M-662 | II-3 | IIIb-26 |
| M-663 | II-4 | IIIb-26 |
| M-664 | II-5 | IIIb-26 |
| M-665 | II-6 | IIIb-26 |
| M-666 | II-7 | IIIb-26 |
| M-667 | II-8 | IIIb-26 |
| M-668 | II-9 | IIIb-26 |
| M-669 | II-10 | IIIb-26 |
| M-670 | II-11 | IIIb-26 |
| M-671 | II-12 | IIIb-26 |
| M-672 | II-13 | IIIb-26 |
| M-673 | II-14 | IIIb-26 |
| M-674 | II-1 | IIIb-27 |
| M-675 | II-2 | IIIb-27 |
| M-676 | II-3 | IIIb-27 |
| M-677 | II-4 | IIIb-27 |
| M-678 | II-5 | IIIb-27 |
| M-679 | II-6 | IIIb-27 |
| M-680 | II-7 | IIIb-27 |
| M-681 | II-8 | IIIb-27 |
| M-682 | II-9 | IIIb-27 |
| M-683 | II-10 | IIIb-27 |
| M-684 | II-11 | IIIb-27 |
| M-685 | II-12 | IIIb-27 |
| M-686 | II-13 | IIIb-27 |
| M-687 | II-14 | IIIb-27 |
| M-688 | II-1 | IIIb-28 |
| M-689 | II-2 | IIIb-28 |
| M-690 | II-3 | IIIb-28 |
| M-691 | II-4 | IIIb-28 |
| M-692 | II-5 | IIIb-28 |
| M-693 | II-6 | IIIb-28 |
| M-694 | II-7 | IIIb-28 |
| M-695 | II-8 | IIIb-28 |
| M-696 | II-9 | IIIb-28 |
| M-697 | II-10 | IIIb-28 |
| M-698 | II-11 | IIIb-28 |
| M-699 | II-12 | IIIb-28 |
| M-700 | II-13 | IIIb-28 |
| M-701 | II-14 | IIIb-28 |
| M-702 | II-1 | IIIb-29 |
| M-703 | II-2 | IIIb-29 |
| M-704 | II-3 | IIIb-29 |
| M-705 | II-4 | IIIb-29 |
| M-706 | II-5 | IIIb-29 |
| M-707 | II-6 | IIIb-29 |
| M-708 | II-7 | IIIb-29 |
| M-709 | II-8 | IIIb-29 |
| M-710 | II-9 | IIIb-29 |
| M-711 | II-10 | IIIb-29 |
| M-712 | II-11 | IIIb-29 |
| M-713 | II-12 | IIIb-29 |
| M-714 | II-13 | IIIb-29 |
| M-715 | II-14 | IIIb-29 |
| M-716 | II-1 | IIIb-30 |
| M-717 | II-2 | IIIb-30 |
| M-718 | II-3 | IIIb-30 |
| M-719 | II-4 | IIIb-30 |

TABLE M-continued

| No. | II/IIa | III |
|---|---|---|
| M-720 | II-5 | IIIb-30 |
| M-721 | II-6 | IIIb-30 |
| M-722 | II-7 | IIIb-30 |
| M-723 | II-8 | IIIb-30 |
| M-724 | II-9 | IIIb-30 |
| M-725 | II-10 | IIIb-30 |
| M-726 | II-11 | IIIb-30 |
| M-727 | II-12 | IIIb-30 |
| M-728 | II-13 | IIIb-30 |
| M-729 | II-14 | IIIb-30 |
| M-730 | II-1 | IIIb-31 |
| M-731 | II-2 | IIIb-31 |
| M-732 | II-3 | IIIb-31 |
| M-733 | II-4 | IIIb-31 |
| M-734 | II-5 | IIIb-31 |
| M-735 | II-6 | IIIb-31 |
| M-736 | II-7 | IIIb-31 |
| M-737 | II-8 | IIIb-31 |
| M-738 | II-9 | IIIb-31 |
| M-739 | II-10 | IIIb-31 |
| M-740 | II-11 | IIIb-31 |
| M-741 | II-12 | IIIb-31 |
| M-742 | II-13 | IIIb-31 |
| M-743 | II-14 | IIIb-31 |
| M-744 | II-1 | IIIb-32 |
| M-745 | II-2 | IIIb-32 |
| M-746 | II-3 | IIIb-32 |
| M-747 | II-4 | IIIb-32 |
| M-748 | II-5 | IIIb-32 |
| M-749 | II-6 | IIIb-32 |
| M-750 | II-7 | IIIb-32 |
| M-751 | II-8 | IIIb-32 |
| M-752 | II-9 | IIIb-32 |
| M-753 | II-10 | IIIb-32 |
| M-754 | II-11 | IIIb-32 |
| M-755 | II-12 | IIIb-32 |
| M-756 | II-13 | IIIb-32 |
| M-757 | II-14 | IIIb-32 |
| M-758 | II-1 | IIIb-33 |
| M-759 | II-2 | IIIb-33 |
| M-760 | II-3 | IIIb-33 |
| M-761 | II-4 | IIIb-33 |
| M-762 | II-5 | IIIb-33 |
| M-763 | II-6 | IIIb-33 |
| M-764 | II-7 | IIIb-33 |
| M-765 | II-8 | IIIb-33 |
| M-766 | II-9 | IIIb-33 |
| M-767 | II-10 | IIIb-33 |
| M-768 | II-11 | IIIb-33 |
| M-769 | II-12 | IIIb-33 |
| M-770 | II-13 | IIIb-33 |
| M-771 | II-14 | IIIb-33 |
| M-772 | II-1 | IIIb-34 |
| M-773 | II-2 | IIIb-34 |
| M-774 | II-3 | IIIb-34 |
| M-775 | II-4 | IIIb-34 |
| M-776 | II-5 | IIIb-34 |
| M-777 | II-6 | IIIb-34 |
| M-778 | II-7 | IIIb-34 |
| M-779 | II-8 | IIIb-34 |
| M-780 | II-9 | IIIb-34 |
| M-781 | II-10 | IIIb-34 |
| M-782 | II-11 | IIIb-34 |
| M-783 | II-12 | IIIb-34 |
| M-784 | II-13 | IIIb-34 |
| M-785 | II-14 | IIIb-34 |
| M-786 | II-1 | IIIb-35 |
| M-787 | II-2 | IIIb-35 |
| M-788 | II-3 | IIIb-35 |
| M-789 | II-4 | IIIb-35 |
| M-790 | II-5 | IIIb-35 |
| M-791 | II-6 | IIIb-35 |
| M-792 | II-7 | IIIb-35 |
| M-793 | II-8 | IIIb-35 |
| M-794 | II-9 | IIIb-35 |
| M-795 | II-10 | IIIb-35 |
| M-796 | II-11 | IIIb-35 |
| M-797 | II-12 | IIIb-35 |
| M-798 | II-13 | IIIb-35 |
| M-799 | II-14 | IIIb-35 |
| M-800 | II-1 | IIIb-36 |
| M-801 | II-2 | IIIb-36 |
| M-802 | II-3 | IIIb-36 |
| M-803 | II-4 | IIIb-36 |
| M-804 | II-5 | IIIb-36 |
| M-805 | II-6 | IIIb-36 |
| M-806 | II-7 | IIIb-36 |
| M-807 | II-8 | IIIb-36 |
| M-808 | II-9 | IIIb-36 |
| M-809 | II-10 | IIIb-36 |
| M-810 | II-11 | IIIb-36 |
| M-811 | II-12 | IIIb-36 |
| M-812 | II-13 | IIIb-36 |
| M-813 | II-14 | IIIb-36 |
| M-814 | | |
| M-815 | IIa-1 | IIIa-1 |
| M-816 | IIa-2 | IIIa-1 |
| M-817 | IIa-3 | IIIa-1 |
| M-818 | IIa-4 | IIIa-1 |
| M-819 | IIa-5 | IIIa-1 |
| M-820 | IIa-6 | IIIa-1 |
| M-821 | IIa-7 | IIIa-1 |
| M-822 | IIa-8 | IIIa-1 |
| M-823 | IIa-9 | IIIa-1 |
| M-824 | IIa-10 | IIIa-1 |
| M-825 | IIa-11 | IIIa-1 |
| M-826 | IIa-1 | IIIa-2 |
| M-827 | IIa-2 | IIIa-2 |
| M-828 | IIa-3 | IIIa-2 |
| M-829 | IIa-4 | IIIa-2 |
| M-830 | IIa-5 | IIIa-2 |
| M-831 | IIa-6 | IIIa-2 |
| M-832 | IIa-7 | IIIa-2 |
| M-833 | IIa-8 | IIIa-2 |
| M-834 | IIa-9 | IIIa-2 |
| M-835 | IIa-10 | IIIa-2 |
| M-836 | IIa-11 | IIIa-2 |
| M-837 | IIa-1 | IIIa-3 |
| M-838 | IIa-2 | IIIa-3 |
| M-839 | IIa-3 | IIIa-3 |
| M-840 | IIa-4 | IIIa-3 |
| M-841 | IIa-5 | IIIa-3 |
| M-842 | IIa-6 | IIIa-3 |
| M-843 | IIa-7 | IIIa-3 |
| M-844 | IIa-8 | IIIa-3 |
| M-845 | IIa-9 | IIIa-3 |
| M-846 | IIa-10 | IIIa-3 |
| M-847 | IIa-11 | IIIa-3 |
| M-848 | IIa-1 | IIIa-4 |
| M-849 | IIa-2 | IIIa-4 |
| M-850 | IIa-3 | IIIa-4 |
| M-851 | IIa-4 | IIIa-4 |
| M-852 | IIa-5 | IIIa-4 |
| M-853 | IIa-6 | IIIa-4 |
| M-854 | IIa-7 | IIIa-4 |
| M-855 | IIa-8 | IIIa-4 |
| M-856 | IIa-9 | IIIa-4 |
| M-857 | IIa-10 | IIIa-4 |
| M-858 | IIa-11 | IIIa-4 |
| M-859 | IIa-1 | IIIa-5 |
| M-860 | IIa-2 | IIIa-5 |
| M-861 | IIa-3 | IIIa-5 |
| M-862 | IIa-4 | IIIa-5 |
| M-863 | IIa-5 | IIIa-5 |
| M-864 | IIa-6 | IIIa-5 |
| M-865 | IIa-7 | IIIa-5 |
| M-866 | IIa-8 | IIIa-5 |
| M-867 | IIa-9 | IIIa-5 |
| M-868 | IIa-10 | IIIa-5 |
| M-869 | IIa-11 | IIIa-5 |
| M-870 | IIa-1 | IIIa-6 |
| M-871 | IIa-2 | IIIa-6 |
| M-872 | IIa-3 | IIIa-6 |
| M-873 | IIa-4 | IIIa-6 |
| M-874 | IIa-5 | IIIa-6 |
| M-875 | IIa-6 | IIIa-6 |

TABLE M-continued

| No. | II/IIa | III |
|---|---|---|
| M-876 | IIa-7 | IIIa-6 |
| M-877 | IIa-8 | IIIa-6 |
| M-878 | IIa-9 | IIIa-6 |
| M-879 | IIa-10 | IIIa-6 |
| M-880 | IIa-11 | IIIa-6 |
| M-881 | IIa-1 | IIIa-7 |
| M-882 | IIa-2 | IIIa-7 |
| M-883 | IIa-3 | IIIa-7 |
| M-884 | IIa-4 | IIIa-7 |
| M-885 | IIa-5 | IIIa-7 |
| M-886 | IIa-6 | IIIa-7 |
| M-887 | IIa-7 | IIIa-7 |
| M-888 | IIa-8 | IIIa-7 |
| M-889 | IIa-9 | IIIa-7 |
| M-890 | IIa-10 | IIIa-7 |
| M-891 | IIa-11 | IIIa-7 |
| M-892 | IIa-1 | IIIa-8 |
| M-893 | IIa-2 | IIIa-8 |
| M-894 | IIa-3 | IIIa-8 |
| M-895 | IIa-4 | IIIa-8 |
| M-896 | IIa-5 | IIIa-8 |
| M-897 | IIa-6 | IIIa-8 |
| M-898 | IIa-7 | IIIa-8 |
| M-899 | IIa-8 | IIIa-8 |
| M-900 | IIa-9 | IIIa-8 |
| M-901 | IIa-10 | IIIa-8 |
| M-902 | IIa-11 | IIIa-8 |
| M-903 | IIa-1 | IIIa-9 |
| M-904 | IIa-2 | IIIa-9 |
| M-905 | IIa-3 | IIIa-9 |
| M-906 | IIa-4 | IIIa-9 |
| M-907 | IIa-5 | IIIa-9 |
| M-908 | IIa-6 | IIIa-9 |
| M-909 | IIa-7 | IIIa-9 |
| M-910 | IIa-8 | IIIa-9 |
| M-911 | IIa-9 | IIIa-9 |
| M-912 | IIa-10 | IIIa-9 |
| M-913 | IIa-11 | IIIa-9 |
| M-914 | IIa-1 | IIIa-10 |
| M-915 | IIa-2 | IIIa-10 |
| M-916 | IIa-3 | IIIa-10 |
| M-917 | IIa-4 | IIIa-10 |
| M-918 | IIa-5 | IIIa-10 |
| M-919 | IIa-6 | IIIa-10 |
| M-920 | IIa-7 | IIIa-10 |
| M-921 | IIa-8 | IIIa-10 |
| M-922 | IIa-9 | IIIa-10 |
| M-923 | IIa-10 | IIIa-10 |
| M-924 | IIa-11 | IIIa-10 |
| M-925 | IIa-1 | IIIa-11 |
| M-926 | IIa-2 | IIIa-11 |
| M-927 | IIa-3 | IIIa-11 |
| M-928 | IIa-4 | IIIa-11 |
| M-929 | IIa-5 | IIIa-11 |
| M-930 | IIa-6 | IIIa-11 |
| M-931 | IIa-7 | IIIa-11 |
| M-932 | IIa-8 | IIIa-11 |
| M-933 | IIa-9 | IIIa-11 |
| M-934 | IIa-10 | IIIa-11 |
| M-935 | IIa-11 | IIIa-11 |
| M-936 | IIa-1 | IIIa-12 |
| M-937 | IIa-2 | IIIa-12 |
| M-938 | IIa-3 | IIIa-12 |
| M-939 | IIa-4 | IIIa-12 |
| M-940 | IIa-5 | IIIa-12 |
| M-941 | IIa-6 | IIIa-12 |
| M-942 | IIa-7 | IIIa-12 |
| M-943 | IIa-8 | IIIa-12 |
| M-944 | IIa-9 | IIIa-12 |
| M-945 | IIa-10 | IIIa-12 |
| M-946 | IIa-11 | IIIa-12 |
| M-947 | IIa-1 | IIIa-13 |
| M-948 | IIa-2 | IIIa-13 |
| M-949 | IIa-3 | IIIa-13 |
| M-950 | IIa-4 | IIIa-13 |
| M-951 | IIa-5 | IIIa-13 |
| M-952 | IIa-6 | IIIa-13 |
| M-953 | IIa-7 | IIIa-13 |
| M-954 | IIa-8 | IIIa-13 |
| M-955 | IIa-9 | IIIa-13 |
| M-956 | IIa-10 | IIIa-13 |
| M-957 | IIa-11 | IIIa-13 |
| M-958 | IIa-1 | IIIa-14 |
| M-959 | IIa-2 | IIIa-14 |
| M-960 | IIa-3 | IIIa-14 |
| M-961 | IIa-4 | IIIa-14 |
| M-962 | IIa-5 | IIIa-14 |
| M-963 | IIa-6 | IIIa-14 |
| M-964 | IIa-7 | IIIa-14 |
| M-965 | IIa-8 | IIIa-14 |
| M-966 | IIa-9 | IIIa-14 |
| M-967 | IIa-10 | IIIa-14 |
| M-968 | IIa-11 | IIIa-14 |
| M-969 | IIa-1 | IIIa-15 |
| M-970 | IIa-2 | IIIa-15 |
| M-971 | IIa-3 | IIIa-15 |
| M-972 | IIa-4 | IIIa-15 |
| M-973 | IIa-5 | IIIa-15 |
| M-974 | IIa-6 | IIIa-15 |
| M-975 | IIa-7 | IIIa-15 |
| M-976 | IIa-8 | IIIa-15 |
| M-977 | IIa-9 | IIIa-15 |
| M-978 | IIa-10 | IIIa-15 |
| M-979 | IIa-11 | IIIa-15 |
| M-980 | IIa-1 | IIIa-16 |
| M-981 | IIa-2 | IIIa-16 |
| M-982 | IIa-3 | IIIa-16 |
| M-983 | IIa-4 | IIIa-16 |
| M-984 | IIa-5 | IIIa-16 |
| M-985 | IIa-6 | IIIa-16 |
| M-986 | IIa-7 | IIIa-16 |
| M-987 | IIa-8 | IIIa-16 |
| M-988 | IIa-9 | IIIa-16 |
| M-989 | IIa-10 | IIIa-16 |
| M-990 | IIa-11 | IIIa-16 |
| M-991 | IIa-1 | IIIa-17 |
| M-992 | IIa-2 | IIIa-17 |
| M-993 | IIa-3 | IIIa-17 |
| M-994 | IIa-4 | IIIa-17 |
| M-995 | IIa-5 | IIIa-17 |
| M-996 | IIa-6 | IIIa-17 |
| M-997 | IIa-7 | IIIa-17 |
| M-998 | IIa-8 | IIIa-17 |
| M-999 | IIa-9 | IIIa-17 |
| M-1000 | IIa-10 | IIIa-17 |
| M-1001 | IIa-11 | IIIa-17 |
| M-1002 | IIa-1 | IIIa-18 |
| M-1003 | IIa-2 | IIIa-18 |
| M-1004 | IIa-3 | IIIa-18 |
| M-1005 | IIa-4 | IIIa-18 |
| M-1006 | IIa-5 | IIIa-18 |
| M-1007 | IIa-6 | IIIa-18 |
| M-1008 | IIa-7 | IIIa-18 |
| M-1009 | IIa-8 | IIIa-18 |
| M-1010 | IIa-9 | IIIa-18 |
| M-1011 | IIa-10 | IIIa-18 |
| M-1012 | IIa-11 | IIIa-18 |
| M-1013 | IIa-1 | IIIa-19 |
| M-1014 | IIa-2 | IIIa-19 |
| M-1015 | IIa-3 | IIIa-19 |
| M-1016 | IIa-4 | IIIa-19 |
| M-1017 | IIa-5 | IIIa-19 |
| M-1018 | IIa-6 | IIIa-19 |
| M-1019 | IIa-7 | IIIa-19 |
| M-1020 | IIa-8 | IIIa-19 |
| M-1021 | IIa-9 | IIIa-19 |
| M-1022 | IIa-10 | IIIa-19 |
| M-1023 | IIa-11 | IIIa-19 |
| M-1024 | IIa-1 | IIIa-20 |
| M-1025 | IIa-2 | IIIa-20 |
| M-1026 | IIa-3 | IIIa-20 |
| M-1027 | IIa-4 | IIIa-20 |
| M-1028 | IIa-5 | IIIa-20 |
| M-1029 | IIa-6 | IIIa-20 |
| M-1030 | IIa-7 | IIIa-20 |
| M-1031 | IIa-8 | IIIa-20 |

TABLE M-continued

| No. | II/IIa | III |
|---|---|---|
| M-1032 | IIa-9 | IIIa-20 |
| M-1033 | IIa-10 | IIIa-20 |
| M-1034 | IIa-11 | IIIa-20 |
| M-1035 | IIa-1 | IIIa-21 |
| M-1036 | IIa-2 | IIIa-21 |
| M-1037 | IIa-3 | IIIa-21 |
| M-1038 | IIa-4 | IIIa-21 |
| M-1039 | IIa-5 | IIIa-21 |
| M-1040 | IIa-6 | IIIa-21 |
| M-1041 | IIa-7 | IIIa-21 |
| M-1042 | IIa-8 | IIIa-21 |
| M-1043 | IIa-9 | IIIa-21 |
| M-1044 | IIa-10 | IIIa-21 |
| M-1045 | IIa-11 | IIIa-21 |
| M-1046 | IIa-1 | IIIa-22 |
| M-1047 | IIa-2 | IIIa-22 |
| M-1048 | IIa-3 | IIIa-22 |
| M-1049 | IIa-4 | IIIa-22 |
| M-1050 | IIa-5 | IIIa-22 |
| M-1051 | IIa-6 | IIIa-22 |
| M-1052 | IIa-7 | IIIa-22 |
| M-1053 | IIa-8 | IIIa-22 |
| M-1054 | IIa-9 | IIIa-22 |
| M-1055 | IIa-10 | IIIa-22 |
| M-1056 | IIa-11 | IIIa-22 |
| M-1057 | | |
| M-1058 | IIa-1 | IIIb-1 |
| M-1059 | IIa-2 | IIIb-1 |
| M-1060 | IIa-3 | IIIb-1 |
| M-1061 | IIa-4 | IIIb-1 |
| M-1062 | IIa-5 | IIIb-1 |
| M-1063 | IIa-6 | IIIb-1 |
| M-1064 | IIa-7 | IIIb-1 |
| M-1065 | IIa-8 | IIIb-1 |
| M-1066 | IIa-9 | IIIb-1 |
| M-1067 | IIa-10 | IIIb-1 |
| M-1068 | IIa-11 | IIIb-1 |
| M-1069 | IIa-1 | IIIb-2 |
| M-1070 | IIa-2 | IIIb-2 |
| M-1071 | IIa-3 | IIIb-2 |
| M-1072 | IIa-4 | IIIb-2 |
| M-1073 | IIa-5 | IIIb-2 |
| M-1074 | IIa-6 | IIIb-2 |
| M-1075 | IIa-7 | IIIb-2 |
| M-1076 | IIa-8 | IIIb-2 |
| M-1077 | IIa-9 | IIIb-2 |
| M-1078 | IIa-10 | IIIb-2 |
| M-1079 | IIa-11 | IIIb-2 |
| M-1080 | IIa-1 | IIIb-3 |
| M-1081 | IIa-2 | IIIb-3 |
| M-1082 | IIa-3 | IIIb-3 |
| M-1083 | IIa-4 | IIIb-3 |
| M-1084 | IIa-5 | IIIb-3 |
| M-1085 | IIa-6 | IIIb-3 |
| M-1086 | IIa-7 | IIIb-3 |
| M-1087 | IIa-8 | IIIb-3 |
| M-1088 | IIa-9 | IIIb-3 |
| M-1089 | IIa-10 | IIIb-3 |
| M-1090 | IIa-11 | IIIb-3 |
| M-1091 | IIa-1 | IIIb-4 |
| M-1092 | IIa-2 | IIIb-4 |
| M-1093 | IIa-3 | IIIb-4 |
| M-1094 | IIa-4 | IIIb-4 |
| M-1095 | IIa-5 | IIIb-4 |
| M-1096 | IIa-6 | IIIb-4 |
| M-1097 | IIa-7 | IIIb-4 |
| M-1098 | IIa-8 | IIIb-4 |
| M-1099 | IIa-9 | IIIb-4 |
| M-1100 | IIa-10 | IIIb-4 |
| M-1101 | IIa-11 | IIIb-4 |
| M-1102 | IIa-1 | IIIb-5 |
| M-1103 | IIa-2 | IIIb-5 |
| M-1104 | IIa-3 | IIIb-5 |
| M-1105 | IIa-4 | IIIb-5 |
| M-1106 | IIa-5 | IIIb-5 |
| M-1107 | IIa-6 | IIIb-5 |
| M-1108 | IIa-7 | IIIb-5 |
| M-1109 | IIa-8 | IIIb-5 |
| M-1110 | IIa-9 | IIIb-5 |
| M-1111 | IIa-10 | IIIb-5 |
| M-1112 | IIa-11 | IIIb-5 |
| M-1113 | IIa-1 | IIIb-6 |
| M-1114 | IIa-2 | IIIb-6 |
| M-1115 | IIa-3 | IIIb-6 |
| M-1116 | IIa-4 | IIIb-6 |
| M-1117 | IIa-5 | IIIb-6 |
| M-1118 | IIa-6 | IIIb-6 |
| M-1119 | IIa-7 | IIIb-6 |
| M-1120 | IIa-8 | IIIb-6 |
| M-1121 | IIa-9 | IIIb-6 |
| M-1122 | IIa-10 | IIIb-6 |
| M-1123 | IIa-11 | IIIb-6 |
| M-1124 | IIa-1 | IIIb-7 |
| M-1125 | IIa-2 | IIIb-7 |
| M-1126 | IIa-3 | IIIb-7 |
| M-1127 | IIa-4 | IIIb-7 |
| M-1128 | IIa-5 | IIIb-7 |
| M-1129 | IIa-6 | IIIb-7 |
| M-1130 | IIa-7 | IIIb-7 |
| M-1131 | IIa-8 | IIIb-7 |
| M-1132 | IIa-9 | IIIb-7 |
| M-1133 | IIa-10 | IIIb-7 |
| M-1134 | IIa-11 | IIIb-7 |
| M-1135 | IIa-1 | IIIb-8 |
| M-1136 | IIa-2 | IIIb-8 |
| M-1137 | IIa-3 | IIIb-8 |
| M-1138 | IIa-4 | IIIb-8 |
| M-1139 | IIa-5 | IIIb-8 |
| M-1140 | IIa-6 | IIIb-8 |
| M-1141 | IIa-7 | IIIb-8 |
| M-1142 | IIa-8 | IIIb-8 |
| M-1143 | IIa-9 | IIIb-8 |
| M-1144 | IIa-10 | IIIb-8 |
| M-1145 | IIa-11 | IIIb-8 |
| M-1146 | IIa-1 | IIIb-9 |
| M-1147 | IIa-2 | IIIb-9 |
| M-1148 | IIa-3 | IIIb-9 |
| M-1149 | IIa-4 | IIIb-9 |
| M-1150 | IIa-5 | IIIb-9 |
| M-1151 | IIa-6 | IIIb-9 |
| M-1152 | IIa-7 | IIIb-9 |
| M-1153 | IIa-8 | IIIb-9 |
| M-1154 | IIa-9 | IIIb-9 |
| M-1155 | IIa-10 | IIIb-9 |
| M-1156 | IIa-11 | IIIb-9 |
| M-1157 | IIa-1 | IIIb-10 |
| M-1158 | IIa-2 | IIIb-10 |
| M-1159 | IIa-3 | IIIb-10 |
| M-1160 | IIa-4 | IIIb-10 |
| M-1161 | IIa-5 | IIIb-10 |
| M-1162 | IIa-6 | IIIb-10 |
| M-1163 | IIa-7 | IIIb-10 |
| M-1164 | IIa-8 | IIIb-10 |
| M-1165 | IIa-9 | IIIb-10 |
| M-1166 | IIa-10 | IIIb-10 |
| M-1167 | IIa-11 | IIIb-10 |
| M-1168 | IIa-1 | IIIb-11 |
| M-1169 | IIa-2 | IIIb-11 |
| M-1170 | IIa-3 | IIIb-11 |
| M-1171 | IIa-4 | IIIb-11 |
| M-1172 | IIa-5 | IIIb-11 |
| M-1173 | IIa-6 | IIIb-11 |
| M-1174 | IIa-7 | IIIb-11 |
| M-1175 | IIa-8 | IIIb-11 |
| M-1176 | IIa-9 | IIIb-11 |
| M-1177 | IIa-10 | IIIb-11 |
| M-1178 | IIa-11 | IIIb-11 |
| M-1179 | IIa-1 | IIIb-12 |
| M-1180 | IIa-2 | IIIb-12 |
| M-1181 | IIa-3 | IIIb-12 |
| M-1182 | IIa-4 | IIIb-12 |
| M-1183 | IIa-5 | IIIb-12 |
| M-1184 | IIa-6 | IIIb-12 |
| M-1185 | IIa-7 | IIIb-12 |
| M-1186 | IIa-8 | IIIb-12 |
| M-1187 | IIa-9 | IIIb-12 |

TABLE M-continued

| No. | II/IIa | III |
| --- | --- | --- |
| M-1188 | IIa-10 | IIIb-12 |
| M-1189 | IIa-11 | IIIb-12 |
| M-1190 | IIa-1 | IIIb-13 |
| M-1191 | IIa-2 | IIIb-13 |
| M-1192 | IIa-3 | IIIb-13 |
| M-1193 | IIa-4 | IIIb-13 |
| M-1194 | IIa-5 | IIIb-13 |
| M-1195 | IIa-6 | IIIb-13 |
| M-1196 | IIa-7 | IIIb-13 |
| M-1197 | IIa-8 | IIIb-13 |
| M-1198 | IIa-9 | IIIb-13 |
| M-1199 | IIa-10 | IIIb-13 |
| M-1200 | IIa-11 | IIIb-13 |
| M-1201 | IIa-1 | IIIb-14 |
| M-1202 | IIa-2 | IIIb-14 |
| M-1203 | IIa-3 | IIIb-14 |
| M-1204 | IIa-4 | IIIb-14 |
| M-1205 | IIa-5 | IIIb-14 |
| M-1206 | IIa-6 | IIIb-14 |
| M-1207 | IIa-7 | IIIb-14 |
| M-1208 | IIa-8 | IIIb-14 |
| M-1209 | IIa-9 | IIIb-14 |
| M-1210 | IIa-10 | IIIb-14 |
| M-1211 | IIa-11 | IIIb-14 |
| M-1212 | IIa-1 | IIIb-15 |
| M-1213 | IIa-2 | IIIb-15 |
| M-1214 | IIa-3 | IIIb-15 |
| M-1215 | IIa-4 | IIIb-15 |
| M-1216 | IIa-5 | IIIb-15 |
| M-1217 | IIa-6 | IIIb-15 |
| M-1218 | IIa-7 | IIIb-15 |
| M-1219 | IIa-8 | IIIb-15 |
| M-1220 | IIa-9 | IIIb-15 |
| M-1221 | IIa-10 | IIIb-15 |
| M-1222 | IIa-11 | IIIb-15 |
| M-1223 | IIa-1 | IIIb-16 |
| M-1224 | IIa-2 | IIIb-16 |
| M-1225 | IIa-3 | IIIb-16 |
| M-1226 | IIa-4 | IIIb-16 |
| M-1227 | IIa-5 | IIIb-16 |
| M-1228 | IIa-6 | IIIb-16 |
| M-1229 | IIa-7 | IIIb-16 |
| M-1230 | IIa-8 | IIIb-16 |
| M-1231 | IIa-9 | IIIb-16 |
| M-1232 | IIa-10 | IIIb-16 |
| M-1233 | IIa-11 | IIIb-16 |
| M-1234 | IIa-1 | IIIb-17 |
| M-1235 | IIa-2 | IIIb-17 |
| M-1236 | IIa-3 | IIIb-17 |
| M-1237 | IIa-4 | IIIb-17 |
| M-1238 | IIa-5 | IIIb-17 |
| M-1239 | IIa-6 | IIIb-17 |
| M-1240 | IIa-7 | IIIb-17 |
| M-1241 | IIa-8 | IIIb-17 |
| M-1242 | IIa-9 | IIIb-17 |
| M-1243 | IIa-10 | IIIb-17 |
| M-1244 | IIa-11 | IIIb-17 |
| M-1245 | IIa-1 | IIIb-18 |
| M-1246 | IIa-2 | IIIb-18 |
| M-1247 | IIa-3 | IIIb-18 |
| M-1248 | IIa-4 | IIIb-18 |
| M-1249 | IIa-5 | IIIb-18 |
| M-1250 | IIa-6 | IIIb-18 |
| M-1251 | IIa-7 | IIIb-18 |
| M-1252 | IIa-8 | IIIb-18 |
| M-1253 | IIa-9 | IIIb-18 |
| M-1254 | IIa-10 | IIIb-18 |
| M-1255 | IIa-11 | IIIb-18 |
| M-1256 | IIa-1 | IIIb-19 |
| M-1257 | IIa-2 | IIIb-19 |
| M-1258 | IIa-3 | IIIb-19 |
| M-1259 | IIa-4 | IIIb-19 |
| M-1260 | IIa-5 | IIIb-19 |
| M-1261 | IIa-6 | IIIb-19 |
| M-1262 | IIa-7 | IIIb-19 |
| M-1263 | IIa-8 | IIIb-19 |
| M-1264 | IIa-9 | IIIb-19 |
| M-1265 | IIa-10 | IIIb-19 |
| M-1266 | IIa-11 | IIIb-19 |
| M-1267 | IIa-1 | IIIb-20 |
| M-1268 | IIa-2 | IIIb-20 |
| M-1269 | IIa-3 | IIIb-20 |
| M-1270 | IIa-4 | IIIb-20 |
| M-1271 | IIa-5 | IIIb-20 |
| M-1272 | IIa-6 | IIIb-20 |
| M-1273 | IIa-7 | IIIb-20 |
| M-1274 | IIa-8 | IIIb-20 |
| M-1275 | IIa-9 | IIIb-20 |
| M-1276 | IIa-10 | IIIb-20 |
| M-1277 | IIa-11 | IIIb-20 |
| M-1278 | IIa-1 | IIIb-21 |
| M-1279 | IIa-2 | IIIb-21 |
| M-1280 | IIa-3 | IIIb-21 |
| M-1281 | IIa-4 | IIIb-21 |
| M-1282 | IIa-5 | IIIb-21 |
| M-1283 | IIa-6 | IIIb-21 |
| M-1284 | IIa-7 | IIIb-21 |
| M-1285 | IIa-8 | IIIb-21 |
| M-1286 | IIa-9 | IIIb-21 |
| M-1287 | IIa-10 | IIIb-21 |
| M-1288 | IIa-11 | IIIb-21 |
| M-1289 | IIa-1 | IIIb-22 |
| M-1290 | IIa-2 | IIIb-22 |
| M-1291 | IIa-3 | IIIb-22 |
| M-1292 | IIa-4 | IIIb-22 |
| M-1293 | IIa-5 | IIIb-22 |
| M-1294 | IIa-6 | IIIb-22 |
| M-1295 | IIa-7 | IIIb-22 |
| M-1296 | IIa-8 | IIIb-22 |
| M-1297 | IIa-9 | IIIb-22 |
| M-1298 | IIa-10 | IIIb-22 |
| M-1299 | IIa-11 | IIIb-22 |
| M-1300 | IIa-1 | IIIb-23 |
| M-1301 | IIa-2 | IIIb-23 |
| M-1302 | IIa-3 | IIIb-23 |
| M-1303 | IIa-4 | IIIb-23 |
| M-1304 | IIa-5 | IIIb-23 |
| M-1305 | IIa-6 | IIIb-23 |
| M-1306 | IIa-7 | IIIb-23 |
| M-1307 | IIa-8 | IIIb-23 |
| M-1308 | IIa-9 | IIIb-23 |
| M-1309 | IIa-10 | IIIb-23 |
| M-1310 | IIa-11 | IIIb-23 |
| M-1311 | IIa-1 | IIIb-24 |
| M-1312 | IIa-2 | IIIb-24 |
| M-1313 | IIa-3 | IIIb-24 |
| M-1314 | IIa-4 | IIIb-24 |
| M-1315 | IIa-5 | IIIb-24 |
| M-1316 | IIa-6 | IIIb-24 |
| M-1317 | IIa-7 | IIIb-24 |
| M-1318 | IIa-8 | IIIb-24 |
| M-1319 | IIa-9 | IIIb-24 |
| M-1320 | IIa-10 | IIIb-24 |
| M-1321 | IIa-11 | IIIb-24 |
| M-1322 | IIa-1 | IIIb-25 |
| M-1323 | IIa-2 | IIIb-25 |
| M-1324 | IIa-3 | IIIb-25 |
| M-1325 | IIa-4 | IIIb-25 |
| M-1326 | IIa-5 | IIIb-25 |
| M-1327 | IIa-6 | IIIb-25 |
| M-1328 | IIa-7 | IIIb-25 |
| M-1329 | IIa-8 | IIIb-25 |
| M-1330 | IIa-9 | IIIb-25 |
| M-1331 | IIa-10 | IIIb-25 |
| M-1332 | IIa-11 | IIIb-25 |
| M-1333 | IIa-1 | IIIb-26 |
| M-1334 | IIa-2 | IIIb-26 |
| M-1335 | IIa-3 | IIIb-26 |
| M-1336 | IIa-4 | IIIb-26 |
| M-1337 | IIa-5 | IIIb-26 |
| M-1338 | IIa-6 | IIIb-26 |
| M-1339 | IIa-7 | IIIb-26 |
| M-1340 | IIa-8 | IIIb-26 |
| M-1341 | IIa-9 | IIIb-26 |
| M-1342 | IIa-10 | IIIb-26 |
| M-1343 | IIa-11 | IIIb-26 |

TABLE M-continued

| No. | II/IIa | III |
|---|---|---|
| M-1344 | IIa-1 | IIIb-27 |
| M-1345 | IIa-2 | IIIb-27 |
| M-1346 | IIa-3 | IIIb-27 |
| M-1347 | IIa-4 | IIIb-27 |
| M-1348 | IIa-5 | IIIb-27 |
| M-1349 | IIa-6 | IIIb-27 |
| M-1350 | IIa-7 | IIIb-27 |
| M-1351 | IIa-8 | IIIb-27 |
| M-1352 | IIa-9 | IIIb-27 |
| M-1353 | IIa-10 | IIIb-27 |
| M-1354 | IIa-11 | IIIb-27 |
| M-1355 | IIa-1 | IIIb-28 |
| M-1356 | IIa-2 | IIIb-28 |
| M-1357 | IIa-3 | IIIb-28 |
| M-1358 | IIa-4 | IIIb-28 |
| M-1359 | IIa-5 | IIIb-28 |
| M-1360 | IIa-6 | IIIb-28 |
| M-1361 | IIa-7 | IIIb-28 |
| M-1362 | IIa-8 | IIIb-28 |
| M-1363 | IIa-9 | IIIb-28 |
| M-1364 | IIa-10 | IIIb-28 |
| M-1365 | IIa-11 | IIIb-28 |
| M-1366 | IIa-1 | IIIb-29 |
| M-1367 | IIa-2 | IIIb-29 |
| M-1368 | IIa-3 | IIIb-29 |
| M-1369 | IIa-4 | IIIb-29 |
| M-1370 | IIa-5 | IIIb-29 |
| M-1371 | IIa-6 | IIIb-29 |
| M-1372 | IIa-7 | IIIb-29 |
| M-1373 | IIa-8 | IIIb-29 |
| M-1374 | IIa-9 | IIIb-29 |
| M-1375 | IIa-10 | IIIb-29 |
| M-1376 | IIa-11 | IIIb-29 |
| M-1377 | IIa-1 | IIIb-30 |
| M-1378 | IIa-2 | IIIb-30 |
| M-1379 | IIa-3 | IIIb-30 |
| M-1380 | IIa-4 | IIIb-30 |
| M-1381 | IIa-5 | IIIb-30 |
| M-1382 | IIa-6 | IIIb-30 |
| M-1383 | IIa-7 | IIIb-30 |
| M-1384 | IIa-8 | IIIb-30 |
| M-1385 | IIa-9 | IIIb-30 |
| M-1386 | IIa-10 | IIIb-30 |
| M-1387 | IIa-11 | IIIb-30 |
| M-1388 | IIa-1 | IIIb-31 |
| M-1389 | IIa-2 | IIIb-31 |
| M-1390 | IIa-3 | IIIb-31 |
| M-1391 | IIa-4 | IIIb-31 |
| M-1392 | IIa-5 | IIIb-31 |
| M-1393 | IIa-6 | IIIb-31 |
| M-1394 | IIa-7 | IIIb-31 |
| M-1395 | IIa-8 | IIIb-31 |
| M-1396 | IIa-9 | IIIb-31 |
| M-1397 | IIa-10 | IIIb-31 |
| M-1398 | IIa-11 | IIIb-31 |
| M-1399 | IIa-1 | IIIb-32 |
| M-1400 | IIa-2 | IIIb-32 |
| M-1401 | IIa-3 | IIIb-32 |
| M-1402 | IIa-4 | IIIb-32 |
| M-1403 | IIa-5 | IIIb-32 |
| M-1404 | IIa-6 | IIIb-32 |
| M-1405 | IIa-7 | IIIb-32 |
| M-1406 | IIa-8 | IIIb-32 |
| M-1407 | IIa-9 | IIIb-32 |
| M-1408 | IIa-10 | IIIb-32 |
| M-1409 | IIa-11 | IIIb-32 |
| M-1410 | IIa-1 | IIIb-33 |
| M-1411 | IIa-2 | IIIb-33 |
| M-1412 | IIa-3 | IIIb-33 |
| M-1413 | IIa-4 | IIIb-33 |
| M-1414 | IIa-5 | IIIb-33 |
| M-1415 | IIa-6 | IIIb-33 |
| M-1416 | IIa-7 | IIIb-33 |
| M-1417 | IIa-8 | IIIb-33 |
| M-1418 | IIa-9 | IIIb-33 |
| M-1419 | IIa-10 | IIIb-33 |
| M-1420 | IIa-11 | IIIb-33 |
| M-1421 | IIa-1 | IIIb-34 |
| M-1422 | IIa-2 | IIIb-34 |
| M-1423 | IIa-3 | IIIb-34 |
| M-1424 | IIa-4 | IIIb-34 |
| M-1425 | IIa-5 | IIIb-34 |
| M-1426 | IIa-6 | IIIb-34 |
| M-1427 | IIa-7 | IIIb-34 |
| M-1428 | IIa-8 | IIIb-34 |
| M-1429 | IIa-9 | IIIb-34 |
| M-1430 | IIa-10 | IIIb-34 |
| M-1431 | IIa-11 | IIIb-34 |
| M-1432 | IIa-1 | IIIb-35 |
| M-1433 | IIa-2 | IIIb-35 |
| M-1434 | IIa-3 | IIIb-35 |
| M-1435 | IIa-4 | IIIb-35 |
| M-1436 | IIa-5 | IIIb-35 |
| M-1437 | IIa-6 | IIIb-35 |
| M-1438 | IIa-7 | IIIb-35 |
| M-1439 | IIa-8 | IIIb-35 |
| M-1440 | IIa-9 | IIIb-35 |
| M-1441 | IIa-10 | IIIb-35 |
| M-1442 | IIa-11 | IIIb-35 |
| M-1443 | IIa-1 | IIIb-36 |
| M-1444 | IIa-2 | IIIb-36 |
| M-1445 | IIa-3 | IIIb-36 |
| M-1446 | IIa-4 | IIIb-36 |
| M-1447 | IIa-5 | IIIb-36 |
| M-1448 | IIa-6 | IIIb-36 |
| M-1449 | IIa-7 | IIIb-36 |
| M-1450 | IIa-8 | IIIb-36 |
| M-1451 | IIa-9 | IIIb-36 |
| M-1452 | IIa-10 | IIIb-36 |
| M-1453 | IIa-11 | IIIb-36 |

For illustration of a ternary mixture according to the present invention and described in table M, the combination of the carboxamide compound of formula I with the biopesticide *Pasteuria nishizawae* Pn1 (coded as IIa-10) and with chemical pesticide tioxazafen (coded as IIIa-22) is represented in table M by the mixture M-1055.

Agricultural Compositions

In a further embodiment, the present invention relates to agricultural compositions comprising a mixture of the invention, in particular any one of the mixtures A-1 to A-14 or B-1 to B-11 or I-M-1 to I-M-1453.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

Preferences regarding suitable formulations and auxiliaries, which may be present in such agricultural compositions are defined below.

According to one embodiment, individual components of the composition according to the invention such as parts of a kit or parts of a binary or ternary mixture may be mixed by the user himself in a spray tank or any other kind of vessel used for applications (e. g. seed treater drums, seed pelleting machinery, knapsack sprayer) and further auxiliaries may be added, if appropriate.

When living microorganisms, such as microbial pesticides from groups L1), L3) and L5), form part of such kit, it must be taken care that choice and amounts of the components (e. g. chemical pesticides) and of the further auxiliaries should not influence the viability of the microbial pesticides in the composition mixed by the user. Especially for bactericides and solvents, compatibility with the respective microbial pesticide has to be taken into account.

Consequently, one embodiment of the invention is a kit for preparing a usable pesticidal composition, the kit comprising a) a composition comprising component 1), preferably compound i of formula I as defined herein and at least one auxiliary; and b) a composition comprising component 2) as defined herein and at least one auxiliary; and optionally c) a composition comprising at least one auxiliary and optionally a further active component 3) as defined herein.

In a further embodiment, the present invention relates to a seed treatment composition comprising an auxiliary and a mixture of the invention, preferably any one of the mixtures A-1 to A-14 or B-1 to B-11 or I-M-1 to I-M-1453, wherein the auxiliary is preferably selected from the group consisting of surfactants, antifreezing agents, binders, and pigments, and is particularly preferably a surfactant or a binder.

In a preferred embodiment, the seed treatment composition is in the form of a flowable concentrate FS, a solution LS, a powder for dry treatment DS, a water dispersible powder for slurry treatment WS, a water-soluble powder SS, an emulsion ES or EC, or a gel formulation, and is preferably in the form of a flowable concentrate.

Further preferences regarding seed treatment compositions of the invention are defined below.

In one embodiment, the present invention relates to the use of a mixture of the invention, in particular a mixture selected from the mixtures A-1 to A-14 or B-1 to B-11 or I-M-1 to I-M-1453, or a seed treatment composition as defined above, for protecting a plant, plant propagation material, or soil or water, in which the plants are growing, against the attack or infestation by invertebrate pests.

In another embodiment, the present invention relates to a method for controlling invertebrate pests, which method comprises contacting the plant or the plant propagation material or the soil;
the pests or their food supply, habitat or breeding grounds, with a pesticidally effective amount of a mixture of the invention, in particular a mixture selected from the mixtures A-1 to A-14 or B-1 to B-11, or a seed treatment composition as defined above.

Preferences regarding plants, pests and application methods are defined below.

In one embodiment, the present invention relates to seeds comprising the mixture of the invention, in particular a mixture selected from the mixtures A-1 to A-14 or B-1 to B-11 or I-M-1 to I-M-1453, or a seed treatment composition as defined above in an amount of from 0.01 g to 10000 g per 100 kg of seeds.

It is noted that the amount per 100 kg seeds is based on the weight of the pesticidal mixture irrespective of whether it is referred to the mixture as such or the seed treatment composition thereof.

Preferred seeds are seeds selected from wheat, maize, barley, oat, rye, rice, soybean, cotton, sugarbeet, rapeseed, and potato.

With regard to all the mixtures of the invention as defined herein, the following embodiments are additionally preferred.

Additional Mixing Partners

The mixtures of the present invention may be combined and applied in agriculture in mixture with other active ingredients, for example with other pesticides, insecticides, nematicides, fungicides, herbicides, safeners, fertilizers such as ammonium nitrate, urea, potash, and superphosphate, phytotoxicants and plant growth regulators.

These additional ingredients may be used sequentially or in combination with the mixtures of the invention, if appropriate also added only immediately prior to use (tank mix). For example, the plant(s) may be sprayed with a mixture of this invention either before or after being treated with other active ingredients.

Formulations

The invention also relates to agrochemical compositions comprising an auxiliary and at least one mixture of the present invention.

An agrochemical composition comprises a pesticidally effective amount of a mixture of the present invention. The term "pesticidally effective amount" is defined below.

The mixtures of the present invention can be converted into customary types of agro-chemical compositions, e. g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Mono-graph No. 2, 6th Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cycloihexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the mixtures of the present invention on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:

i) Water-soluble concentrates (SL, LS)

10-60 wt % of the mixture according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible concentrates (DC)

5-25 wt % of the mixture according to the invention and 1-10 wt % dispersant (e. g. polyvinylpyrrolidone) are dissolved in up to 100 wt % organic solvent (e.g. cyclohexanone). Dilution with water gives a dispersion.

iii) Emulsifiable concentrates (EC)

15-70 wt % of the mixture according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)

5-40 wt % of the mixture according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)

In an agitated ball mill, 20-60 wt % of the mixture according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active sub-stance. For FS type composition up to 40 wt % binder (e.g. polyvinylalcohol) is added.

vi) Water-dispersible granules and water-soluble granules (WG, SG)

50-80 wt % of the mixture according to the invention are ground finely with addition of up to 100 wt % dispersants and wetting agents (e.g. sodium lignosulfonate and alcohol ethoxylate) and prepared as water-dispersible or water-soluble granules by means of technical appliances (e. g. extrusion, spray tower, fluidized bed). Dilution with water gives a stable dispersion or solution of the active substance.

vii) Water-dispersible powders and water-soluble powders (WP, SP, WS)

50-80 wt % of the mixture according to the invention are ground in a rotor-stator mill with addition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dispersion or solution of the active substance.

viii) Gel (GW, GF)

In an agitated ball mill, 5-25 wt % of the mixture according to the invention are comminuted with addition of 3-10 wt % dispersants (e.g. sodium lignosulfonate), 1-5 wt % thickener (e.g. carboxymethylcellulose) and up to 100 wt % water to give a fine suspension of the active sub-stance. Dilution with water gives a stable suspension of the active substance.

ix) Microemulsion (ME)

5-20 wt % of the mixture according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

x) Microcapsules (CS)

An oil phase comprising 5-50 wt % of the mixture according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of the mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt %. The wt % relate to the total CS composition.

xi) Dustable powders (DP, DS)

1-10 wt % of a the mixture according to the invention are ground finely and mixed intimately with up to 100 wt % solid carrier, e.g. finely divided kaolin.

xii) Granules (GR, FG)

0.5-30 wt % of the mixture according to the invention is ground finely and associated with up to 100 wt % solid carrier (e.g. silicate). Granulation is achieved by extrusion, spray-drying or the fluidized bed.

xiii) Ultra-low volume liquids (UL)

1-50 wt % of the mixture according to the invention are dissolved in up to 100 wt % organic solvent, e.g. aromatic hydrocarbon.

The compositions types i) to xi) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably be-tween 0.1 and 90%, and most preferably between 0.5 and 75%, by weight of active substance. The active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage de-vice, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank and further auxiliaries may be added, if appropriate.

In a further embodiment, either individual components of the composition according to the invention or partially premixed components, e.g. components comprising mixtures of the present invention, may be mixed by the user in a spray tank and further auxiliaries and additives may be added, if appropriate.

In a further embodiment, either individual components of the composition according to the invention or partially premixed components, e. g. components comprising mixtures of the present invention, can be applied jointly (e.g. after tank mix) or consecutively.

Application Methods

The mixtures of the present invention are suitable for use in protecting crops, plants, plant propagation materials, such as seeds, or soil or water, in which the plants are growing, from attack or infestation by animal pests. Therefore, the present invention also relates to a plant protection method, which comprises contacting crops, plants, plant propagation materials, such as seeds, or soil or water, in which the plants are growing, to be protected from attack or infestation by animal pests, with a pesticidally effective amount of a mixture of the present invention.

The mixtures of the present invention are also suitable for use in combating or controlling animal pests. Therefore, the present invention also relates to a method of combating or controlling animal pests, which comprises contacting the animal pests, their habitat, breeding ground, or food supply, or the crops, plants, plant propagation materials, such as seeds, or soil, or the area, material or environment in which the animal pests are growing or may grow, with a pesticidally effective amount of a mixture of the present invention.

The mixtures of the present invention are effective through both contact and ingestion. Furthermore, the mixtures of the present invention can be applied to any and all developmental stages, such as egg, larva, pupa, and adult.

The mixtures of the present invention can be applied as such or in form of compositions comprising them as defined above. Furthermore, the mixtures of the present invention can be applied together with a mixing partner as defined above or in form of compositions comprising said mixtures as defined above. The components of said mixture can be applied simultaneously, jointly or separately, or in succession, that is immediately one after another and thereby creating the mixture "in situ" on the desired location, e.g. the plant, the sequence, in the case of separate application, generally not having any effect on the result of the control measures.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active mixture to the furrow, and closing the furrow.

Foliar application refers to the application of the pesticidally active mixture to plant foliage, e.g. through spray equipment. For foliar applications, it can be advantageous to modify the behavior of the pests by use of pheromones in combination with the mixtures of the present invention. Suitable pheromones for specific crops and pests are known to a skilled person and publicly available from databases of pheromones and semiochemicals, such as www.pherobase.com.

As used herein, the term "contacting" includes both direct contact (applying the mixtures/compositions directly on the animal pest or plant—typically to the foliage, stem or roots of the plant) and indirect contact (applying the mixtures/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods, preferably insects and arachnids, in particular insects. Insects, which are of particular relevance for crops, are typically referred to as crop insect pests.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called Stevia); natural rubber plants or ornamental and forestry plants, such as flowers (e.g. carnation, petunias, geranium/pelargoniums, pansies and impatiens), shrubs, broad-leaved trees (e.g. poplar) or evergreens, e.g. conifers; eucalyptus; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

The term "plant" is to be understood as including wild type plants and plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, eucalyptus, flax, lentil, maize, melon, papaya, petunia, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is performed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and LibertyLink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under trade names including WideStrike®, Bollgard®, Agrisure®, Herculex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agri-biotech Applications (ISAAA)" (www.isaaa.org/gmapprovaldatabase) and "Center for Environmental Risk Assessment (CERA)" (cera-gmc.org/GMCropDatabase).

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection mixture either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the compositions will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The mixtures of the present invention are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a mixture of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active mixture is carried out by spraying or by dusting the seeds before sowing of the plants and before emergence of the plants. The present invention also comprises seeds coated with or containing the active mixture. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the active mixture may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the mixtures of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the mixtures of the invention are generally from 0.1 g to 10 kg per 100 kg of seed, preferably from 1 g to 5 kg per 100 kg of seed, more preferably from 1 g to 1000 g per 100 kg of seed and in particular from 1 g to 200 g per 100 kg of seed, e.g. from 1 g to 100 g or from 5 g to 100 g per 100 kg of seed.

The invention therefore also relates to seed comprising a mixture of the present invention, or an agriculturally useful salt thereof, as defined herein. The amount of the mixture of the present invention or the agriculturally useful salt thereof will in general vary from 0.1 g to 10 kg per 100 kg of seed, preferably from 1 g to 5 kg per 100 kg of seed, in particular from 1 g to 1000 g per 100 kg of seed. For specific crops such as lettuce the rate can be higher.

The mixtures of the present invention may also be used for improving the health of a plant. Therefore, the present invention also relates to a method for improving plant health by treating a plant, plant propagation material and/or the locus where the plant is growing or is to grow with an effective and non-phytotoxic amount of a mixture of the present invention.

As used herein "an effective and non-phytotoxic amount" means that the mixture is used in a quantity which allows to obtain the desired effect but which does not give rise to any phytotoxic symptom on the treated plant or on the plant grown from the treated propagule or treated soil.

The terms "plant" and "plant propagation material" are defined above.

"Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect")), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The mixtures of the invention are also suitable for use against non-crop insect pests. For use against said non-crop pests, mixtures of the present invention can be used as bait composition, gel, general insect spray, aerosol, as ultra-low volume application and bed net (impregnated or surface applied). Furthermore, drenching and rodding methods can be used.

As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. www.pherobase.com), and are known to those skilled in the art.

For use in bait compositions, the typical content of active ingredient is from 0.001 weight % to 15 weight %, desirably from 0.001 weight % to 5% weight % of active mixture.

Formulations of the mixtures of the present invention as aerosols (e.g in spray cans), oil sprays or pump sprays are highly suitable for the non-professional user for controlling pests such as flies, fleas, ticks, mosquitos or cockroaches. Aerosol recipes are preferably composed of the active mixture, solvents, furthermore auxiliaries such as emulsifiers, perfume oils, if appropriate stabilizers, and, if required, propellants.

The oil spray formulations differ from the aerosol recipes in that no propellants are used.

For use in spray compositions, the content of active ingredient is from 0.001 to 80 weights %, preferably from 0.01 to 50 weight % and most preferably from 0.01 to 15 weight %.

The mixtures of the present invention and its respective compositions can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with mixtures of the present invention and its respective compositions also comprise treating surfaces of huts and houses, air spraying and impregnation of curtains, tents, clothing items, bed nets, tsetse-fly trap or the like. Insecticidal compositions for application to fibers, fabric, knitgoods, nonwovens, netting material or foils and tarpaulins preferably comprise a mixture including the insecticide, optionally a repellent and at least one binder.

The mixtures of the present invention and its compositions can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active mixture per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

Pests

The mixtures of the present invention are especially suitable for efficiently combating animal pests such as arthropods, gastropods and nematodes including but not limited to:

insects from the order of Lepidoptera, for example *Achroia grisella, Acleris* spp. such as *A. fimbriana, A. gloverana, A. variana; Acrolepiopsis assectella, Acronicta major, Adoxophyes* spp. such as *A. cyrtosema, A. orana; Aedia leucomelas, Agrotis* spp. such as *A. exclamationis, A. fucosa, A. Ipsilon, A. orthogoma, A. segetum, A. subterranea; Alabama argillacea, Aleurodicus dispersus, Alsophila pometaria, Ampelophaga rubiginosa, Amyelois transitella, Anacampsis sarcitella, Anagasta kuehniella, Anarsia Anisota senatoria, Antheraea pernyi, Anticarsia* (=*Thermesia*) spp. such as *A. gemmatalis; Apamea* spp., *Aproaerema modicella, Archips* spp. such as *A. argyrospila, A. fuscocupreanus, A. rosana, A. xyloseanus; Argyresthia conjugella, Argyroploce* spp., *Argyrotaenia* spp. such as *A. velutinana; Athetis mindara, Austroasca viridigrisea, Autographa gamma, Autographa nigrisigna, Barathra brassicae, Bedellia* spp., *Bonagota salubricola, Borbo cinnara, Bucculatrix thurberiella, Bupalus piniarius, Busseola* spp., *Cacoecia* spp. such as *C. murinana, C. podana; Cactoblastis cactorum, Cadra cautella, Calingo braziliensis, Caloptilis theivora, Capua reticulana, Carposina* spp. such as *C. niponensis, C. sasakii; Cephus* spp., *Chaetocnema aridula, Cheimatobia brumata, Chilo* spp. such as *C. lndicus, C. suppressalis, C. partellus; Choreutis pariana, Choristoneura* spp. such as *C. conflictana, C. fumiferana, C. longicellana, C. murinana, C. occidentalis, C. rosaceana; Chrysodebds* (=*Pseudoplusia*) spp. such as *C. eriosoma, C. includens; Cirphis unipuncta, Clysia ambiguella, Cnaphalocerus* spp., *Cnaphalocrocis medinalis, Cnephasia* spp., *Cochylis hospes, Coleophora* spp., *Collas eurytheme, Conopomorpha* spp., *Conotrachelus* spp., *Copitarsia* spp., *Corcyra cephalonica, Crambus caliginosellus, Crambus teterrellus, Crocidosema* (=*Epinotia*) *aporema, Cydalima* (=*Diaphania*) *perspectalis, Cydia* (=*Carpocapsa*) spp. such as *C. pomonella, C. latiferreana; Dalaca noctuides, Datana integerrima, Dasychira pinlcola, Dendrolimus* spp. such as *D. pini, D. spectabilis, D. sibiricus; Desmia funeralis, Diaphania* spp. such as *D. nitidalis, D. hyalinata; Diatraea grandiosella, Diatraea saccharalis, Diphthera festiva, Earias* spp. such as *E insulana, E. vittella; Ecdytolopha aurantianu, Egira* (=*Xylomyges*) *curilis, Elasmopalpus lignosellus, Eldana saccharina, Endopiza viteana, Ennomos* subsignaria, Eoreuma Ephestia spp. such as *E. cautella, E. elutella, E. kuehniella*; *Epinotia aporema, Epiphyas postvittana, Erannis tiliaria, Erionota thrax, Etiella* spp., *Eulia* spp., *Eupoecilia ambiguella, Euproctis chrysorrhoea, Euxoa* spp., *Evetria bouliana, Faronta albIllnea, Feltia* spp. such as *F. subterranean*; *Galleria mellonella, Gracillaria* spp., *Grapholita* spp. such as *G. funebrana, G. molesta, G. inopinata*; *Halysidota* spp., *Harrisina americana, Hedylepta* spp., *Helicoverpa* spp. such as *H. armigera* (=*Heliothis armigera*), *H. zea* (=*Heliothis zea*); *Heliothis* spp. such as *H. assulta, H. subflexa, H. virescens*; *Hellula* spp. such as *H. undalis, H. rogatalis*; *Helocoverpa gelotopoeon, Hemileuca ollvlae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma sallcls Leucoptera* spp. such as *L. coffeella, L. scitella*; *Leuminivora lycinivorella, Lithocolletis blancardella, Lithophane antennata, Llattia octo* (=*Amyna axis*), *Lobesia botrana, Lophocampa* spp., *Loxagrotis albicosta, Loxostege* spp. such as *L. sticticalis, L. cereralis*; *Lymantria* spp. such as *L. dispar, L. monacha*; *Lyonetia clerkella, Lyonetia prunifoliella, Malacosoma* spp. such as *M. americanum, M. califomicum, M. constrictum, M. neustria*; *Mamestra* spp. such as *M. brassicae, M. configurata*; *Mamstra brassicae, Manduca* spp. such as *M. quinquemaculata, M. sexta*; *Marasmia* spp, *Marmara* spp., *Maruca testulalis, Megalopyge lanata, Melanchra picta, Melanitis leda, Mocis* spp. such as *M. lapites, M. repanda*; *Mocis latipes, Monochroa fragariae, Mythimna separata, Nemapogon cloacella, Neoleucinodes elegantalis, Nepytia* spp., *Nymphula* spp., *Oiketicus* spp., *Omiodes indicata, Omphisa anastomosalis, Operophtera brumata, Orgyia pseudotsugata, Oria* spp., *Orthaga thyrisalis, Ostrinia* spp. such as *O. nubilalis*; *Oulema oryzae, Paleacrita vernata, Panolis flammea, Parnara* spp., *Papaipema nebris, Papilio cresphontes, Paramyelois transitella, Paranthrene regalis, Paysandisia archon, Pectinophora* spp. such as *P. gossypiella*; *Peridroma saucia, Perileucoptera* spp., such as *P. coffeella*; *Phalera bucephala, Phryganidia califomica, Phthorimaea* spp. such as *P. operculella*; *Phyllocnistis citrella, Phyllonorycter* spp. such as *P. blancardella, P. crataegella, P. issikii, P. ringoniella*; *Pieris* spp. such as *P. brassicae, P. rapae, P. napi*; *Pilocrocis tripunctata, Plathypena scabra, Plaiynota* spp. such as *P. flavedana, P. idaeusalis, P. stultana*; *Platyptilia carduidactyla, Plebejus argus, Plodia interpunctella, Plusia* spp, *Plutella maculipennis, Plutella xylostella, Pontia protodica, Prays* spp., *Prodenia* spp., *Proxenus lepigone, Pseudaletia* spp. such as *P. sequax, P. unipuncta*; *Pyrausta nubilalis, Rachiplusia nu, Richia albicosta, Rhizobius ventralis, Rhyacionia frustrana, Sabulodes aegrotata, Schizura concinna, Schoenobius* spp., *Schreckensteinia festaliella, Scirpophaga* spp. such as *S. incertulas, S. innotata*; *Scotia segetum, Sesamia* spp. such as *S. inferens, Seudyra subflava, Sitotroga cerealella, Sparganothis pilleriana, Spilonota lechriaspis, S. ocellana, Spodoptera* (=*Lamphygma*) spp. such as *S. eridania, S. exigua, S. frugiperda, S. latisfascia, S. littoralis, S. litura, S. omithogalk Stigmella* spp., *Stomopteryx subsecivella, Strymon bazochii, Sylepta derogata, Synanthedon* spp. such as *S. exitiosa, Tecia solanivora, Telehin llcus, Thaumatopoea pityocampa, Thaumatotibia* (=*Cryptophlebia*) *leucotreta, Thaumetopoea pityocampa, Thecla* spp., *Theresimima ampelophaga, Thyrinteina* spp, *Tildenia inconspicuella,*

*Tinea* spp. such as *T. cloacella, T. pellionella*; *Tineola bisselliella, Tortrix* spp. such as *T. viridana*; *Trichophaga tapetzella, Trichoplusia* spp. such as T. ni; *Tuta* (=*Scrobipalpula*) *absoluta, Udea* spp. such as *U. rubigalis, U. rubigalis*; *Virachola* spp., *Yponomeuta padella,* and *Zeiraphera canadensis*;

insects from the order of Coleoptera, for example *Acalymma vittatum, Acanthoscehdes obtectus, Adoretus* spp., *Agelastica alni, Agrilus* spp. such as *A. anxius, A. planipennis, A. sinuatus*; *Agriotes* spp. such as *A. fuscicollis, A. lineatus, A. obscurus*; *Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabnpennis*; *Anthonomus* spp. such as *A. eugenir, A. grandis, A. pomorum*; *Anthrenus* spp., *Aphthona euphoridae, Apion* spp., *Apogonia* spp., *Athous haemorrhoidalis, Atomaria* spp. such as *A. linearis*; *Attagenus* spp., *Aulacophora femoralis, Blastophagus piniperda, Blitophaga undata, Bruchidius obtectus, Bruchus* spp. such as *B. lentis, B. pisorum, B. rufimanus*; *Byctiscus betulae, Callidiellum rufipenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C. napi*; *Chaetocnema tibialis, Cleonus mendicus, Conoderus* spp. such as *C. vespertinus*; *Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor*; *Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicomis, D. semipunctata, D. virgifera*; *Diaprepes abbreviates, Dichocrocis* spp., *Dicladispa armigera, Diloboderus abderus, Diocalandra frumenti* (*Diocalandra stigmaticollis*), *Enaphalodes rufulus, Epilachna* spp. such as *E. varivestis, E. vigintioctomaculata*; *Epitrixspp*. such as *E. hirtipennis, E. similaris*; *Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus, Hypera* spp. such as *H. brunneipennis, H. postica*; *Hypomeces squamosus, Hypothenemus* spp., *Ips typographus, Lachnosterna consanguinea, Lasioderma serricorne, Latheticus oryzae, Lathridius* spp., *Lema* spp. such as *L. bilineata, L. melanopus*; *Leptinotarsa* spp. such as *L. decemlineata*; *Leptispa pygmaea, Limonius califomicus, Lissorhoptrus oryzophilus, Lixus* spp., *Luperodes* spp., *Lyctus* spp. such as *L. bruneus*; *Liogenys fuscus, Macrodactylus* spp. such as *M. subspinosus*; *Maladera matrida, Megaplatypus mutates, Megascelis* spp., *Melanotus communis, Meligethes* spp. such as *M. aeneus*; *Melolontha* spp. such as *M. hippocastani, M. melolontha*; *Metamasius hemipterus, Microtheca* spp., *Migdolus* spp. such as *M. fryanus, Monochamus* spp. such as *M. altematus*; *Naupactus xanthographus, Niptus hololeucus, Oberia brevis, Oemona hirta, Oryctes rhinoceros, Oryzaephilus surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae*; *Phoracantha recurva, Phyllobius pyri, Phyllopertha horticola, Phyllophaga* spp. such as *P. helleri, Phyllotreta* spp. such as *P. chrysocephala, P. nemorum, P. striolata, P. vittula*; *Phyllopertha horticola, Popillia japonica, Premnotrypes* spp., *Psacothea hilaris, Psylliodes chrysocephala, Prostephanus truncates, Psylliodes* spp., *Ptinus* spp., *Pulga saltona, Rhizopertha dominica, Rhynchophorus* spp. such as *R. billineatus, R. ferrugineus, R. pal-* marum, R. phoenicis, R. vulneratus; Saperda candida, Scolytus schevyrewi, Scyphophorus acupunctatus, Sitona lineatus, Sitophilus spp. such as S. granaria, S. oryzae, S. zeamais; Sphenophorus spp. such as S. levis; Stegobium paniceum, Sternechus spp. such as S. subsignatus; Strophomorphus ctenotus, Symphyletes spp., Tanymecus spp., Tenebrio molitor, Tenebrioides mauretanicus, Tribolium spp. such as T. castaneum; Trogoderma spp., Tychius spp., Xylotrechus spp. such as X. pyrrhoderus; and, Zabrus spp. such as Z. tenebrioides;

insects from the order of Diptera for example Aedes spp. such as A. aegypti, A. albopictus, A. vexans; Anastrepha ludens, Anopheles spp. such as A. albimanus, A. crucians, A. freeborni, A. gambiae, A. leucosphyrus, A. maculipennis, A. minimus, A. quadrimaculatus, A. sinensis; Bactrocera invadens, Bibio hortulanus, Calliphora erythrocephala, Calliphora vscsna, Ceratitis capitata, Chrysomyia spp. such as C. bezziana, C. hominivorax, C. macellaria; Chrysops atlanticus, Chrysops discalis, Chrysops silacea, Cochliomyia spp. such as C. hominivorax; Contarinia spp. such as C. sorghicola; Cordylobia anthropophaga, Culex spp. such as C. nigripalpus, C. pipiens, C. quinquefasciatus, C. tarsalis, C. tritaeniorhynchus; Culicoides furens, Culiseta inomata, Culiseta melanura, Cuterebra spp., Dacus cucurbitae, Dacus oleae, Dasineura brassicae, Dasineura oxycoccana, Delia spp. such as D. antique, D. coarctata, D. platura, D. radicum; Dermatobia hominis, Drosophila spp. such as D. suzukii, Fannia spp. such as F. canicularis; Gastraphilus spp. such as G. intestinalis; Geomyza tipunctata, Glossina spp. such as G. fuscipes, G. morsitans, G. palpalis, G. tachinoides; Haematobia irritans, Haplodiplosis equestris, Hippelates spp., Hylemyia spp. such as H. platura; Hypoderma spp. such as H. lineata; Hyppobosca spp., Hydrellia philippina, Leptoconops torrens, Liriomyza spp. such as L. sativae, L. trifolii, Lucilia spp. such as L. caprina, L. cuprina, L. sericata; Lycoria pectoralis, Mansonia titillanus, Mayetiola spp. such as M. destructor; Musca spp. such as M. autumnalis, M. domestica; Muscina stabulans, Oestrus spp. such as O. ovis; Opomyza forum, Oscinella spp. such as O. frit; Orseolia oryzae, Pegomya hysocyami, Phlebotomus argentipes, Phorbia spp. such as P. antiqua, P. brassicae, P. coarctata; Phytomyza gymnostoma, Prosimulium mixtum, Psila rosae, Psorophora columbiae, Psorophora discolor, Rhagoletis spp. such as R. cerasi, R. cingulate, R. indifferens, R. mendax, R. pomonella; Rivellia quadrifasciata, Sarcophaga spp. such as S. haemorrhoidalis; Simulium vittatum, Sitodiplosis mosellana, Stomoxys spp. such as S. calcitrans; Tabanus spp. such as T. atratus, T. bovinus, T. lineola, T. similis; Tannia spp., Thecodiplosis japonensis, Tipula oleracea, Tipula paludosa, and Wohlfahrtia spp;

insects from the order of Thysanoptera for example, Baliothnps biformis, Dichromothnps corbetti, Dichromothnps ssp., Echinothnps americanus, Enneothnps flavens, Frankliniella spp. such as F. fusca, F. occidentalis, F. tritici, Heliothnps spp., Hercinothrips femoralis, Kakothrips spp., Microcephalothnps abdominalis, Neohydatothrips samayunkur, Pezothrips kellyanus, Rhippiphorothrips cruentatus, Scirtothrips spp. such as S. citri, S. dorsalis, S. perseae; Stenchaetothnps spp, Taeniothrips cardamoni, Taeniothrips inconsequens, Thrips spp. such as T. imagines, T. hawaiiensis, T. oryzae, T. palmi, T. parvispinus, T. tabaci;

insects from the order of Hemiptera for example, Acizzia jamatonica, Acrosternum spp. such as A. hilare; Acyrthosipon spp. such as A. onobrychis, A. pisum; Adelges laricis, Adelges tsugae, Adelphocoris spp. such as A. rapidus, A. superbus; Aeneolamia spp., Agonoscena spp., Aulacorthum solani, Aleurocanthus woglumi, Aleurodes spp., Aleurodicus disperses, Aleurolobus barodensis, Aleurothrbos spp., Amrasca spp., Anasa tristis, Antestiopsis spp., Anuraphis cardui, Aonidiella spp., Aphanostigma piri, Aphidula nasturtii, Aphis spp. such as A. craccivora, A. fabae, A. forbesi, A. gossypii, A. grossulariae, A. maidiradicis, A. pomi, A. sambuci, A. schneideri, A. spiraecola; Arboridia apicalis, Arilus critatus, Aspidiella spp., Aspidiotus spp., Atanus spp., Aulacaspis yasumatsui, Aulacorthum solani, Bactericera cockerelli (Paratrioza cockerelli), Bemisia spp. such as B. argentifolii, B. tabaci (Aleurodes tabaci); Blissus spp. such as B. leucopterus; Brachycaudus spp. such as B. cardui, B. helichrysi, B. persicae, B. prunicola; Brachycolus spp., Brachycorynella asparagi, Brevicoryne brassicae, Cacopsylla spp. such as C. fulguralis, C. pyricola (Psylla piri); Calligypona marginata, Calocoris spp., Campylomma livida, Capitophorus horni, Cameocephala fulgida, Caveleius spp., Ceraplastes spp., Ceratovacuna lanigera, Ceroplastes ceriferus, Cerosipha gossypii, Chaetosiphon fragaefolii, Chionaspis tegalensis, Chlorita onukii, Chromaphis juglandicola, Chrysomphalus ficus, Cicadulina mbsla, Cimex spp. such as C. hemipterus, C. lectularius; Coccomytilus halli, Coccus spp. such as C. hesperidum, C. pseudomagnoliarum; Colythucha arcuata, Creontiades dilutus, Cryptomyzus ribis, Chrysomphalus aonidum, Cryptomyzus ribis, Ctenalytaina spatulata, Cyrtopeltis notatus, Dalbulus spp., Dasynus piperis, Dialeurodes spp. such as D. citrifolii; Dalbulus maidis, Diaphorina spp. such as D. citri; Diaspis spp. such as D. bromeliae; Dichelops furcatus, Diconocoris hewetti, Doralis spp., Dreyfusia nordmannianae, Dreyfusia piceae, Drosicha spp., Dysaphis spp. such as D. plantaginea, D. pyri, D. radicola; Dysaulacorthum pseudosolani, Dysdercus spp. such as D. cingulatus, D. intermedius; Dysmicoccus spp., Edessa spp., Geocoris spp., Empoasca spp. such as E. fabae, E. solana; Epidiaspis leperii, Eriosoma spp. such as E. lanigerum, E. pyricola; Elythroneura spp., Eurygaster spp. such as E. integriceps; Euscelis bilobatus, Euschistus spp. such as E. heros, E. impictiventris, E. servus; Fiorinia theae, Geococcus coffeae, Glycaspis brimblecombei, Halyomorpha spp. such as H. halys; Heliopeltis spp., Homalodisca vitripennis (=H. coagulata), Horcias nobilellus, Hyalopterus pruni, Hyperomyzus lactucae, Icerya spp. such as I. purchase; Idiocerus spp., Idioscopus spp., Laodelphax striatellus, Lecanium spp., Lecanoideus floccissimus, Lepidosaphes spp. such as L. ulmi; Leptocorisa spp., Leptoglossus phyllopus, Lipaphis erysimi, Lygus spp. such as L. hesperus, L. lineolaris, L. pratensis; Maconellicoccus hirsutus, Marchalina hellenica, Macropes excavatus, Macrosiphum spp. such as M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella spp., Metopolophium dirhodum, Monellia costalis, Monelliopsis pecanis, Myzocallis coryli, Murgantia spp., Myzus spp. such as M. ascalonicus, M. cerasi, M. nicotianae, M. persicae, M. varians; Nasonovia ribis-nigri, Neotoxoptera formosana, Neomegalotomus spp, Nephotettix spp. such as N. malayanus, N. nigropictus, N. parvus, N. virescens; Nezara spp. such as N. viridula; Nilaparvata lugens, Nysius huttoni, Oebalus spp. such as O. pugnax; Oncometopia spp., Orthezia praelonga, Oxycaraenus hyalinipennis, Parabemisia myricae, Parlatoria spp., Parthenolecanium spp. such as P. corni, P. persicae; Pemphigus spp. such as P. bursarius, P. populivenae; Peregrinus maidis, Perkinsiella saccharicida, Phenacoccus spp. such as P. aceris, P. gossypii, Phloeomyzus passerinii, Phorodon humuli, Phylloxera spp. such as P. devastatnx, Piesma

*quadrata, Piezodorus* spp. such as *P. guildinii, Pinnaspis aspidistrae, Planococcus* spp. such as *P. citri, P. ficus; Prosapia bicincta, Protopulvinaria pyriformis, Psallus seriatus, Pseudacysta persea, Pseudaulacaspis pentagona, Pseudococcus* spp. such as *P. comstocki, Psylla* spp. such as *P. mali; Pteromalus* spp., *Pulvinaria amygdali, Pyrilla* spp., *Quadraspidiotus* spp., such as *Q. perniciosus; Quesada gigas, Rastrococcus* spp., *Reduvius senilis, Rhizoecus americanus, Rhodnius* spp., *Rhopalomyzus ascalonicus, Rhopalosiphum* spp. such as *R. pseudobrassicas, R. insertum, R. maidis, R. pack Sagatodes* spp., *Sahlbergella singularis, Saissetia* spp., *Sappaphis mala, Sappaphis mali, Scaptocoris* spp., *Scaphoides titanus, Schizaphis graminum, Schizoneura lanuginosa, Scotinophora* spp., *Selenaspidus articulatus, Sitobion avenae, Sogata* spp., *Sogatella furcifera, Solubea insularis, Spissistilus festinus* (=*Stictocephala festina*), *Stephanitis nashi, Stephanitis pyrioides, Stephanitis takeyai, Tenalaphara malayensis, Tetraleurodes perseae, Therioaphis maculate, Thyanta* spp. such as *T. accerra, T. perditor; Tibraca* spp., *Tomaspis* spp., *Toxoptera* spp. such as *T. aurantii; Trialeurodes* spp. such as *T. abutilonea, T. ricini, T. vaporariorum; Triatoma* spp., *Trioza* spp., *Typhlocyba* spp., *Unaspis* spp. such as *U. citri, U. yanonensis;* and *Viteus vitifolii,*

Insects from the order Hymenoptera for example *Acanthomyops interjectus, Athalia rosae, Atta* spp. such as *A. capiguara, A. cephalotes, A. cephalotes, A. laevigata, A. robusta, A. sexdens, A. texana, Bombus* spp., *Brachymyrmex* spp., *Camponotus* spp. such as *C. floridanus, C. pennsylvanicus, C. modoc; Cardiocondyla nuda, Chalibion* sp, *Crematogaster* spp., *Dasymutilla occidentalis, Diprion* spp., *Dolichovespula maculata, Dorymyrmex* spp., *Diyocosmus kuriphilus, Formica* spp., *Hoplocampa* spp. such as *H. minuta, H. testudinea; Iridomyrmex humilis, Lasius* spp. such as *L. niger, Linepithema humile, Liometopum* spp., *Leptocybe invasa, Monomorium* spp. such as *M. pharaonis, Monomorium, Nylandria fulva, Pachycondyla chinensis, Paratrechina longicornis, Paravespula* spp., such as *P. germanica, P. pennsylvanica, P. vulgaris; Pheidole* spp. such as *P. megacephala; Pogonomyrmex* spp. such as *P. barbatus, P. californicus, Polistes rubiginosa, Prenolepis impairs, Pseudomyrmex gracilis, Schelipron* spp., *Sirex cyaneus, Solenopsis* spp. such as *S. geminata, S. invicta, S. molesta, S. richten, S. xyloni, Sphecius speciosus, Sphex* spp., *Tapinoma* spp. such as *T. melanocephalum, T. sessile; Tetramorium* spp. such as *T. caespitum, T. bicarinatum, Vespa* spp. such as *V. crabro; Vespula* spp. such as *V. squamosal; Wasmannia auropunctata, Xylocopa* sp;

Insects from the order Orthoptera for example *Acheta domesticus, Calliptamus italicus, Chortoicetes terminifera, Ceuthophilus* spp., *Diastrammena asynamora, Dociostaurus maroccanus, Gryllotalpa* spp. such as *G. africana, G. gryllotalpa; Gryllus* spp., *Hieroglyphus daganensis, Kraussaria angulifera, Locusta* spp. such as *L. migratoria, L. pardalina; Melanoplus* spp. such as *M. bivittatus, M. femurrubrum, M. mexicanus, M. sanguinipes, M. spretus; Nomadacris septemfasciata, Oedaleus senegalensis, Scapteriscus* spp., *Schistocerca* spp. such as *S. americana, S. gregaria, Stemopelmatus* spp., *Tachycines asynamorus,* and *Zonozerus variegatus;*

Pests from the Class Arachnida for example Acari, e.g. of the families Argasidae, Ixodidae and Sarcoptidae, such as *Amblyomma* spp. (e.g. *A. americanum, A. variegatum, A. maculatum*), *Argas* spp. such as *A. persicu*), *Boophilus* spp. such as *B. annulatus, B. decoloratus, B. microplus, Dermacentor* spp. such as *D. silvarum, D. andersoni, D. variabilis, Hyalomma* spp. such as *H. truncatum, Ixodes* spp. such as *I. ricinus, I. rubicundus, I. scapularis, I. holocyclus, I. pacificus, Rhipicephalus sanguineus, Ornithodorus* spp. such as *O. moubata, O. hermsi, O. turicata, Ornithonyssus bacoti, Otobius megnini, Dermanyssus galllnae, Psoroptes* spp. such as *P. ovis, Rhipicephalus* spp. such as *R. sanguineus, R. appendiculatus, Rhipicephalus evertsi, Rhizoglyphus* spp., *Sarcoptes* spp. such as *S. scabiei;* and Family Eriophyidae including *Aceria* spp. such as *A. sheldoni, A. anthocoptes, Acallitus* spp., *Aculops* spp. such as *A. lycopersici, A. pelekassi, Aculus* spp. such as *A. schlechtendali; Colomerus vitis, Epitrimerus pyri, Phyllocoptruta oleivora; Eriophytes ribis* and *Eriophyes* spp. such as *Eriophyes sheldoni;* Family Tarsonemidae including *Hemitarsonemus* spp., *Phytonemus pallidus* and *Polyphagotarsonemus latus, Stenotarsonemus* spp. *Steneotarsonemus spini,* Family Tenuipalpidae including *Brevipalpus* spp. such as *B. phoenicis;* Family Tetranychidae including *Eotetranychus* spp., *Eutetranychus* spp., *Oligonychus* spp., *Petrobia latens, Tetranychus* spp. such as *T. cinnabarinus, T. evansi, T. kanzawai, T. pacificus, T. phaseulus, T. telarius* and *T. urticae; Bryobia praetiosa; Panonychus* spp. such as *P. ulmi, P. citri, Metatetranychus* spp. and *Oligonychus* spp. such as *O. pratensis, O. perseae, Vasates lycopersici; Raoiella indica,* Family Carpoglyphidae including *Carpoglyphus* spp.; *Penthaleidae* spp. such as *Halotydeus destructor,* Family Demodicidae with species such as *Demodex* spp.; Family Trombicidea including *Trombicula* spp.; Family Macronyssidae including *Ornothonyssus* spp.; Family Pyemotidae including *Pyemotes tritici, Tyrophagus putrescentiae;* Family Acaridae including *Acarus siro;* Family Araneida including *Latrodectus mactans, Tegenaria agrestis, Chiracanthium* sp, *Lycosa* sp *Achaearanea tepidariorum* and *Loxosceles reclusa;*

Pests from the Phylum Nematoda, for example, plant parasitic nematodes such as root-knot nematodes, *Meloidogyne* spp. such as *M. hapla, M. incognita, M. javanica;* cyst-forming nematodes, *Globodera* spp. such as *G. rostochiensis; Heterodera* spp. such as *H. avenae, H. glycines, H. schachtii, H. trifolii;* Seed gall nematodes, *Anguina* spp.; Stem and foliar nematodes, *Aphelenchoides* spp. such as *A. besseyi;* Sting nematodes, *Belonolaimus* spp. such as *B. longicaudatus;* Pine nematodes, *Bursaphelenchus* spp. such as *B. lignicolus, B. xylophilus;* Ring nematodes, *Criconema* spp., *Criconemella* spp. such as *C. xenoplax* and *C. ornata;* and, *Criconemoides* spp. such as *Criconemoides informis; Mesocriconema* spp.; Stem and bulb nematodes, *Ditylenchus* spp. such as *D. destructor, D. dipsaci;* Awl nematodes, *Dolichodorus* spp.; Spiral nematodes, *Heliocotylenchus multicinctus;* Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus;* Lesion nematodes, *Pratylenchus* spp. such as *P. brachyurus, P. neglectus, P. penetrans, P. curvitatus, P. goodeyi;* Burrowing nematodes, *Radopholus* spp. such as *R. similis; Rhadopholus* spp.; *Rhodopholus* spp.; Reniform nematodes, *Rotylenchus* spp. such as *R. robustus, R. reniformis; Scutellonema* spp.; Stubby-root nematode, *Trichodorus* spp. such as *T. obtusus, T. primitivus; Paratrichodorus* spp. such as *P. minor;* Stunt nematodes, *Tylenchorhynchus* spp. such as *T. claytoni, T. dubius;* Citrus nematodes, *Tylenchulus* spp. such as *T. semipenetrans;* Dagger nematodes, *Xiphinema* spp.; and other plant parasitic nematode species;

Insects from the order Isoptera for example *Calotermes flaicollis, Coptotermes* spp. such as *C. formosanus, C. gestroi, C. acinaciformis; Cornitermes cumulans, Cryptotermes* spp. such as *C. brevis, C. cavifrons; Globitermes*

*sulfureus,* Heterotermes spp. such as *H. aureus, H. longiceps, H. tenuis;* Leucotermes flavipes, Odontotermes spp., Incisitermes spp. such as *I. minor, I. Snyder,* Marginitermes hubbardi, Mastotermes spp. such as *M. darwiniensis* Neocapritermes spp. such as *N. opacus, N. parvus;* Neotermes spp., Procornitermes spp., Zootermopsis spp. such as *Z. angusticollis, Z. nevadensis,* Reticulitermes spp. such as *R. hesperus, R. tibialis, R. speratus, R. flavipes, R. grassei, R. lucifugus, R. santonensis, R. virginicus;* Termes natalensis, Insects from the order Blattaria for example Blatta spp. such as *B. orientalis, B. lateralis;* Blattella spp. such as *B. asahinae, B. germanica;* Leucophaea maderae, Panchlora nivea, Periplaneta spp. such as *P. americana, P. australasiae, P. brunnea, P. fuligginosa, P. japonica;* Supella longipalpa, Parcoblatta pennsylvanica, Eutycotis floridana, Pycnoscelus surinamensis, Insects from the order Siphonoptera for example *Cediopsylla simples,* Ceratophyllus spp., Ctenocephalides spp. such as *C. fells, C. canis,* Xenopsylla cheopis, Pulex irritans, Trichodectes canis, Tunga penetrans, and Nosopsyllus fasciatus, Insects from the order Thysanura for example *Lepisma saccharina, Ctenolepisma urbana,* and *Thermobia domestica,*

Pests from the class Chilopoda for example Geophilus spp., Scutigera spp. such as *Scutigera coleoptrata;*

Pests from the class Diplopoda for example *Blaniulus guttulatus,* Julus spp., Narceus spp., Pests from the class Symphyla for example *Scutigerella immaculata,*

Insects from the order Dermaptera, for example *Forficula auricularia,*

Insects from the order Collembola, for example Onychiurus spp., such as *Onychiurus armatus,*

Pests from the order Isopoda for example, *Armadillidium vulgare, Oniscus asellus, Porcellio scaber,*

Insects from the order Phthiraptera, for example Damalinia spp., Pediculus spp. such as *Pediculus humanus capitis, Pediculus humanus corporis, Pediculus humanus humanus;* Pthirus pubis, Haematopinus spp. such as *Haematopinus eurysternus, Haematopinus suis;* Linognathus spp. such as *Linognathus Bovicola bovis, Menopon gallinae, Menacanthus stramineus* and *Solenopotes capillatus,* Trichodectes spp., Examples of further pest species which may be controlled by mixtures of the invention include: from the Phylum Mollusca, class Bivalvia, for example, Dreissena spp.; class Gastropoda, for example, Arion spp., Biomphalaria spp., Bulinus spp., Deroceras spp., Galba spp., Lymnaea spp., Oncomelania spp., Pomacea canaliclata, Succinea spp.; from the class of the helminths, for example, *Ancylostoma duodenale, Ancylostoma ceylanicum, Acylostoma braziliensis,* Ancylostoma spp., Ascaris lubricoides, Ascaris spp., *Brugia malayi, Brugia timori,* Bunostomum spp., Chabertia spp., Clonorchis spp., Cooperia spp., Dicrocoelium spp., *Dictyocaulus filaria, Diphyllobothrium latum, Dracunculus medinensis, Echinococcus granulosus, Echinococcus multilocularis, Enterobius vermicularis,* Faciola spp., Haemonchus spp. such as *Haemonchus contortus;* Heterakis spp., *Hymenolepis nana, Hyostrongulus* spp., *Loa Loa,* Nematodirus spp., Oesophagostomum spp., Opisthorchis spp., *Onchocerca volvulus,* Ostertagia spp., Paragonimus spp., Schistosomen spp., Strongyloides fuellebomi, Strongyloides stercora lis, Stronyloides spp., Taenia saginata, Taenia solium, Trichinella spiralis, Trichinella nativa, Trichinella britovi, Trichinella nelsoni, Trichinella pseudopsiralis,* Trichostrongulus spp., *Trichuris trichuria, Wuchereria bancrofti.*

Plant Diseases

The mixtures of the present inventon are particularly suitable for controlling the following plant diseases:

Albugo spp. (white rust) on ornamentals, vegetables (e. g. *A. candida*) and sunflowers (e. g. *A. tragopogonis*); Alternaria spp. (Alternaria leaf spot) on vegetables, rape (*A. brassicola* or *brassicae*), sugar beets (*A. tenuis*), fruits, rice, soybeans, potatoes (e. g. *A. solani* or *A. altemata*), tomatoes (e. g. *A. solani* or *A. altemata*) and wheat; Aphanomyces spp. on sugar beets and vegetables; Ascochyta spp. on cereals and vegetables, e. g. *A. tritici* (anthracnose) on wheat and *A. hordei* on barley; Bipolaris and Drechslera spp. (teleomorph: Cochliobolus spp.), e. g. Southern leaf blight (*D. maydis*) or Northern leaf blight (*B. zeicola*) on corn, e. g. spot blotch (*B. sorokiniana*) on cereals and e. g. *B. oryzae* on rice and turfs; Blumeria (formerly Erysiphe) graminis (powdery mildew) on cereals (e. g. on wheat or barley); Botrytis cinerea (teleomorph: *Botryotinia fuckeliana:* grey mold) on fruits and berries (e. g. strawberries), vegetables (e. g. lettuce, carrots, celery and cabbages), rape, flowers, vines, forestry plants and wheat; Bremia lactucae (downy mildew) on lettuce; Ceratocystis (syn. Ophiostoma) spp. (rot or wilt) on broad-leaved trees and evergreens, e. g. *C. ulmi* (Dutch elm disease) on elms; Cercospora spp. (Cercospora leaf spots) on corn (e. g. Gray leaf spot: *C. zeae-maydis*), rice, sugar beets (e. g. *C. beticola*), sugar cane, vegetables, coffee, soybeans (e. g. *C. sofina* or *C. kikuchii*) and rice; Cladosporium spp. on tomatoes (e. g. *C. fulvum:* leaf mold) and cereals, e. g. *C. herbarum* (black ear) on wheat; Claviceps purpurea (ergot) on cereals; Cochliobolus (anamorph: Helminthosporium of Bipolaris) spp. (leaf spots) on corn (*C. carbonum*), cereals (e. g. *C. sativus,* anamorph: *B. sorokiniana*) and rice (e. g. *C. miyabeanus,* anamorph: *H. oryzae*); Colletotrichum (teleomorph: Glomerella) spp. (anthracnose) on cotton (e. g. *C. gossypii*), corn (e. g. *C. graminicola:* Anthracnose stalk rot), soft fruits, potatoes (e. g. *C. coccodes:* black dot), beans (e. g. *C. lindemuthianum*) and soybeans (e. g. *C. truncatum* or *C. gloeosporioides*); Corticium spp., e. g. *C. sasakii* (sheath blight) on rice; Corynespora cassiicola (leaf spots) on soybeans and ornamentals; Cycloconium spp., e. g. *C. oleaginum* on olive trees; Cylindrocarpon spp. (e. g. fruit tree canker or young vine decline, teleomorph: Nectria or Neonectria spp.) on fruit trees, vines (e. g. *C. liriodendri,* teleomorph: *Neonectria liriodendri:* Black Foot Disease) and ornamentals; Dematophora (teleomorph: Rosellinia) necatnix (root and stem rot) on soybeans; Diaporthe spp., e. g. *D. phaseolorum* (damping off) on soybeans; Drechslera (syn. Helminthosporium, teleomorph: Pyrenophora) spp. on corn, cereals, such as barley (e. g. *D. teres,* net blotch) and wheat (e. g. *D. tritici-repentis:* tan spot), rice and turf; Esca (dieback, apoplexy) on vines, caused by Formitiporia (syn. Phellinus) punctata, *F. mediterranea,* Phaeomoniella chlamydospora (earlier Phaeoacremonium chlamydosporum), Phaeoacremonium aleophilum and/or Botryosphaeria obtusa; Elsinoe spp. on pome fruits (*E. pyri*), soft fruits (*E. veneta:* anthracnose) and vines (*E. ampelina:* anthracnose); Entyloma oryzae (leaf smut) on rice; Epicoccum spp. (black mold) on wheat; Erysiphe spp. (powdery mildew) on sugar beets (*E. betae*), vegetables (e. g. *E. pisi*), such as cucurbits (e. g. *E. cichoracearum*), cabbages, rape (e. g. *E. cruciferarum*); Eutypa lata (Eutypa canker or dieback, anamorph: *Cytosporina lata,* syn. *Libertella blepharis*) on fruit trees, vines and ornamental woods; Exserohilum (syn. Helminthosporium) spp. on corn (e. g. *E.* turcicum); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* (f. sp. *glycines* now syn. *F. virguliforme*) and *F. tucumaniae* and *F. brasiliense* each causing sudden death syndrome on soybeans, and *F. verticillioides* on corn; *Gaeumannomyces graminis* (take-all) on cereals (e. g. wheat or barley) and corn; *Gibberella* spp. on cereals (e. g. *G. zeae*) and rice (e. g. *G. fujikuroi:* Bakanae disease); *Glomerella cingulata* on vines, pome fruits and other plants and *G. gossypii* on cotton; Grainstaining complex on rice; *Guignardia bidwellii* (black rot) on vines; *Gymnosporangium* spp. on rosaceous plants and junipers, e. g. *G. sabinae* (rust) on pears; *Helminthosporium* spp. (syn. *Drechslera,* teleomorph: *Cochliobolus*) on corn, cereals and rice; *Hemileia* spp., e. g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; *Microdochium* (syn. *Fusarium*) *nivale* (pink snow mold) on cereals (e. g. wheat or barley); *Microsphaera diffusa* (powdery mildew) on soybeans; *Monilinia* spp., e. g. *M. laxa, M. fructicola* and *M. fructigena* (bloom and twig blight, brown rot) on stone fruits and other rosaceous plants; *Mycosphaerella* spp. on cereals, bananas, soft fruits and ground nuts, such as e. g. *M. graminicola* (anamorph: *Septoria tritici, Septoria* blotch) on wheat or *M. fifiensis* (black Sigatoka disease) on bananas; *Peronospora* spp. (downy mildew) on cabbage (e. g. *P. brassicae*), rape (e. g. *P. parasitica*), onions (e. g. *P. destructor*), tobacco (*P. tabacina*) and soybeans (e. g. *P. manshurica*); *Phakopsora pachyrhizi* and *P. meibomiae* (soybean rust) on soybeans; *Phialophora* spp. e. g. on vines (e. g. *P. tracheiphila* and *P. tetraspora*) and soybeans (e. g. *P. gregata:* stem rot); *Phoma lingam* (root and stem rot) on rape and cabbage and *P. betae* (root rot, leaf spot and damping-off) on sugar beets; *Phomopsis* spp. on sunflowers, vines (e. g. *P. viticola:* can and leaf spot) and soybeans (e. g. stem rot: *P. phaseoli,* teleomorph: *Diaporthe phaseolorum*); *Physoderma maydis* (brown spots) on corn; *Phytophthora* spp. (wilt, root, leaf, fruit and stem root) on various plants, such as paprika and cucurbits (e. g. *P. capsici*), soybeans (e. g. *P. megasperma,* syn. *P. sojae*), potatoes and tomatoes (e. g. *P. infestans:* late blight) and broad-leaved trees (e. g. *P. ramorum:* sudden oak death); *Plasmodiophora brassicae* (club root) on cabbage, rape, radish and other plants; *Plasmopara* spp., e. g. *P. viticola* (grapevine downy mildew) on vines and *P. halstedii* on sunflowers; *Podosphaera* spp. (powdery mildew) on rosaceous plants, hop, pome and soft fruits, e. g. *P. leucotricha* on apples; *Polymyxa* spp., e. g. on cereals, such as barley and wheat (*P. graminis*) and sugar beets (*P. betae*) and thereby transmitted viral diseases; *Pseudocercosporella herpotrichoides* (eyespot, teleomorph: *Tapesia yallundae*) on cereals, e. g. wheat or barley; *Pseudoperonospora* (downy mildew) on various plants, e. g. *P. cubensis* on cucurbits or *P. humili* on hop; *Pseudopezicula tracheiphila* (red fire disease or, rotbrenner', anamorph: *Phialophora*) on vines; *Puccinia* spp. (rusts) on various plants, e. g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye, *P. kuehnii* (orange rust) on sugar cane and *P. asparagi* on asparagus; *Pyrenophora* (anamorph: *Drechslera*) *tritici-repentis* (tan spot) on wheat or *P. teres* (net blotch) on barley; *Pyricularia* spp., e. g. *P. oryzae* (teleomorph: *Magnaporthe grisea,* rice blast) on rice and *P. grisea* on turf and cereals; *Pythium* spp. (damping-off) on turf, rice, corn, wheat, cotton, rape, sunflowers, soybeans, sugar beets, vegetables and various other plants (e. g. *P. ultimum* or *P. aphanidermatum*); *Ramularia* spp., e. g. *R. collo-cygni* (*Ramularia* leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e. g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* (scald) on barley, rye and triticale; *Sarocladium oryzae* and *S. attenuatum* (sheath rot) on rice; *Sclerotinia* spp. (stem rot or white mold) on vegetables and field crops, such as rape, sunflowers (e. g. *S. sclerotiorum*) and soybeans (e. g. *S. rolfsii* or *S. sclerotiorum*); *Septoria* spp. on various plants, e. g. *S. glycines* (brown spot) on soybeans, *S. tritici* (*Septoria* blotch) on wheat and *S.* (syn. *Stagonospora*) *nodorum* (*Stagonospora* blotch) on cereals; *Uncinula* (syn. *Eiysiphe*) *necator* (powdery mildew, anamorph: *Oidium tuckei*) on vines; *Setospaeria* spp. (leaf blight) on corn (e. g. *S. turcicum,* syn. *Helminthosporium turcicum*) and turf; *Sphacelotheca* spp. (smut) on corn, (e. g. *S. reiliana:* head smut), sorghum and sugar cane; *Sphaerotheca fuliginea* (powdery mildew) on cucurbits; *Spongospora subterranea* (powdery scab) on potatoes and thereby transmitted viral diseases; *Stagonospora* spp. on cereals, e. g. *S. nodorum* (*Stagonospora* blotch, teleomorph: *Leptosphaeria* [syn. *Phaeosphaeria*] *nodorum*) on wheat; *Synchytrium endobioticum* on potatoes (potato wart disease); *Taphrina* spp., e. g. *T. deformans* (leaf curl disease) on peaches and *T. pruni* (plum pocket) on plums; *Thielaviopsis* spp. (black root rot) on tobacco, pome fruits, vegetables, soybeans and cotton, e. g. *T. basicola* (syn. *Chalara elegans*); *Tilletia* spp. (common bunt or stinking smut) on cereals, such as e. g. *T. tritici* (syn. *T. caries,* wheat bunt) and *T. controversa* (dwarf bunt) on wheat; *Typhula incarnata* (grey snow mold) on barley or wheat; *Urocystis* spp., e. g. *U. occulta* (stem smut) on rye; *Uromyces* spp. (rust) on vegetables, such as beans (e. g. *U. appendiculatus,* syn. *U. phaseoli*) and sugar beets (e. g. *U. betae*); *Ustilago* spp. (loose smut) on cereals (e. g. *U. nuda* and *U. avaenae*), corn (e. g. *U. maydis:* corn smut) and sugar cane; *Venturia* spp. (scab) on apples (e. g. *V. inaequalis*) and pears; and *Verticillium* spp. (wilt) on various plants, such as fruits and ornamentals, vines, soft fruits, vegetables and field crops, e. g. *V. dahliae* on strawberries, rape, potatoes and tomatoes.

EXAMPLES

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, *Weeds,* 15, 21-22):

$$E = X + Y - \frac{XY}{100}$$

When the observed combined control effect is greater than the expected combined control effect (E), then the combined effect is synergistic.

Tests may demonstrate the control efficacy of compounds, mixtures or compositions of this invention on specific pests. However, the pest control protection afforded by the compounds, mixtures or compositions is not limited to these species. In certain instances, combinations of a compound of this invention with other invertebrate pest control compounds or agents are found to exhibit synergistic effects against certain important invertebrate pests.

The analysis of synergism or antagonism between the mixtures or compositions may be determined using Colby's equation.

Pesticides Tested

The preferred Compound I, namely compound i of formula I has been provisionally approved under the common name broflanilide.

| Formulation | Description | Active Ingredient |
|---|---|---|
| Broflanilide SC | Broflanilide, GABA antagonist | 10% |
| Broadband 1019 | *Beauveria bassiana*, strain PPRI5339, EC formulation | ~4 × 10⁹ CFU/ml |
| Dipel ® Pro DF | *Bacillus thuringiensis*, subsp. *kurstaki*, strain ABTS-351, dry flowable formulation | 54% fermentation solids, spores, and toxins |

Lepidopteran Efficacy

Large leaf lima bean (southern armyworm) and radish (diamondback moth) were dipped in treatment solution and allowed to dry. The leaves were excised and placed individually into square petri dishes containing two filter paper discs moistened with 0.5 ml of reverse osmosis water. One neonate insect per dish (total of 20 dishes per treatment, grouped into 5 dishes per replicate) were infested for the test with southern armyworm. Five insects per dish (total of 5 dishes per treatment) were infested for the test with diamondback moth. The studies were held in an environmental chamber 14 L: 10 D at 30° C. and 70% RH. The number of dead and moribund insects were recorded (moribund was considered dead). Rate rundowns were conducted initially to determine sublethal rates for the combination testing.

5 replications with 5 insects are each conducted per treatment, insects are held singly.

Control mortality is less than 15% and standard treatments yielded 100% mortality.

TABLE 4

Efficacy of Broadband BB 1019 (*B. bassiana*) and broflanilide against neonate diamondback moth via radish leaf dip

| Treatment | Mean % Mortality @ Days after Treatment 2 DAT |
|---|---|
| broflanilide @ 0.01 ppm | 44.0 |
| Broadband 1019 @ 20 ul/100 ml | 16.0 |
| Combination | 96.0 |
| Synergy Factor | 1.8 |
| Synergy Observed (Colby's Formula) | yes |

The results showed that the combination of broflanilide and Broadband displayed an obvious synergistic effect against diamondback moth.

TABLE 5

Efficacy of Dipel (*B. thuringiensis*) + broflanilide against neonate southern armyworm via lima bean leaf dip

| Treatment | Mean % Mortality @ Days after Treatment 4 DAT |
|---|---|
| broflanilide @ 0.0025 ppm | 23.5 |
| Dipel @ 25 ppm | 10.3 |
| Combination | 47.1 |
| Synergy Factor | 1.5 |
| Synergy Observed (Colby's Formula) | Synergy |

Efficacy of the combination of broflanilide and Dipel against southern armyworm was numerically higher than that of individual products, and showed a synergistic effect.

The invention claimed is:

1. A pesticidal mixture comprising as active components:
component 1) a pesticidal active carboxamide compound I of formula (I)

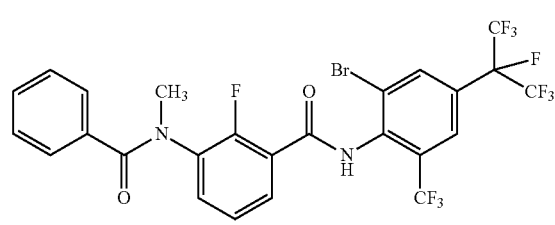

(I)

and component 2) *B. thuringiensis*, in synergistically effective amounts wherein component 1) and component 2) are present in a total weight ratio of from 1:5000 to 1:20,000, wherein the total weight of component 2) is based on the amount of the solid material (dry matter) of component 2).

2. A seed treatment composition comprising an auxiliary and a mixture as defined in claim 1, wherein the auxiliary is selected from the group consisting of surfactants, antifreezing agents, binders, and pigments.

3. The seed treatment composition according to claim 2, which is in the form of a flowable concentrate FS, a solution LS, a powder for dry treatment DS, a water dispersible powder for slurry treatment WS, a water-soluble powder SS, an emulsion ES or EC, or a gel formulation.

4. A method for controlling invertebrate pests, or protecting a plant, plant propagation material or soil or water in which the plants are growing, against the attach or infestation by invertebrate pests, comprising contacting the plant or the plant propagation material or the soil; the pests or their food supply, habitat or breeding grounds, with a pesticidally effective amount of a mixture as defined in claim 1.

5. Seeds comprising the mixture as defined in claim 1 in an amount of from 0.01 g to 10000 g per 100 kg of seeds.

* * * * *